US012747646B2

(12) United States Patent
Marshall et al.

(10) Patent No.: US 12,747,646 B2
(45) Date of Patent: Sep. 29, 2026

(54) SYSTEMS, TOOLS AND METHODS FOR WELL DECOMMISSIONING

(71) Applicant: Foro Energy, Inc., Houston, TX (US)

(72) Inventors: Scott A. Marshall, Houston, TX (US); Daryl Grubb, Houston, TX (US); Brian O. Faircloth, Evergreen, CO (US); Mark S. Zediker, Castle Rock, CO (US); Kenneth L. Havlinek, Katy, TX (US)

(73) Assignee: Foro Energy, Inc., Houston, TX (US)

( * ) Notice: Subject to any disclaimer, the term of this patent is extended or adjusted under 35 U.S.C. 154(b) by 451 days.

(21) Appl. No.: 18/217,975

(22) Filed: Jul. 3, 2023

(65) Prior Publication Data

US 2024/0167355 A1 May 23, 2024

Related U.S. Application Data

(63) Continuation of application No. 16/458,083, filed on Jun. 30, 2019, now Pat. No. 11,692,406, which is a continuation of application No. 15/218,509, filed on Jul. 25, 2016, now Pat. No. 10,337,273, which is a continuation-in-part of application No. 14/803,228, filed on Jul. 20, 2015, now Pat. No. 9,492,885, and a continuation-in-part of application No. 14/213,212, filed on Mar. 14, 2014, now Pat. No. 9,399,269, which is a continuation-in-part of application No. 14/139,680, filed on Dec. 23, 2013, now Pat. No. 10,195,687, said application No. 15/218,509 is a continuation-in-part of application No. 14/105,949, (Continued)

(51) Int. Cl.

| | |
|---|---|
| ***E21B 29/02*** | (2006.01) |
| ***B23K 26/38*** | (2014.01) |
| ***E21B 41/00*** | (2006.01) |
| ***H01S 3/00*** | (2006.01) |
| ***H01S 3/04*** | (2006.01) |
| *B23K 101/04* | (2006.01) |
| *B60P 1/54* | (2006.01) |
| *B66C 23/36* | (2006.01) |

(52) U.S. Cl.

CPC .............. *E21B 29/02* (2013.01); *B23K 26/38* (2013.01); *E21B 41/00* (2013.01); *H01S 3/0071* (2013.01); *H01S 3/04* (2013.01); *B23K 2101/04* (2018.08); *B60P 1/5423* (2013.01); *B66C 23/36* (2013.01)

(58) Field of Classification Search

CPC ................ B23K 26/4075; B23K 26/38; B23K 26/1476; B23K 26/0853; B23K 26/0838; H01S 3/04; H01S 3/0071; E21B 41/00; E21B 29/02

USPC ............ 219/121.82, 121.78, 121.69, 121.67; 166/279

See application file for complete search history.

(56) References Cited

U.S. PATENT DOCUMENTS 3,977,478 A * 8/1976 Shuck ........................ E21B 7/15 166/308.1
2011/0278270 A1* 11/2011 Braga .................... B28D 1/146 219/121.7
2014/0060930 A1* 3/2014 Zediker ................... E21B 10/60 175/16

* cited by examiner

*Primary Examiner* — Phuong T Nguyen

(57) ABSTRACT

There are provided high power laser systems for performing decommissioning of structures in land based boreholes, and wells, offshore, and other remote and hazardous locations, and using those system to perform decommissioning operations. In particular embodiments the laser system is a Class I system and reduces emission of materials created during (Continued)

laser cutting operations. The laser systems can include lifting and removal equipment for removing laser sectioned material.

11 Claims, 31 Drawing Sheets

Related U.S. Application Data filed on Dec. 13, 2013, now Pat. No. 9,664,012, and a continuation-in-part of application No. 13/966,969, filed on Aug. 14, 2013, now Pat. No. 9,669,492, which is a continuation-in-part of application No. 13/565,345, filed on Aug. 2, 2012, now Pat. No. 9,089,928, said application No. 14/213,212 is a continuation-in-part of application No. 13/565,345, filed on Aug. 2, 2012, now Pat. No. 9,089,928.

(60) Provisional application No. 62/262,870, filed on Dec. 3, 2015, provisional application No. 61/798,875, filed on Mar. 15, 2013, provisional application No. 61/745,661, filed on Dec. 24, 2012, provisional application No. 61/605,422, filed on Mar. 1, 2012, provisional application No. 61/514,391, filed on Aug. 2, 2011.

SYSTEMS, TOOLS AND METHODS FOR WELL DECOMMISSIONING

This application, is a continuation of Ser. No. 16/458,083 filed Jun. 30, 2019, which is a continuation of Ser. No. 15/218,509 filed Jul. 25, 2016, which application:

(i) claims, under 35 U.S.C. § 119(e)(1), the benefit of U.S. provisional patent application Ser. No. 62/262,870, filing date of Dec. 3, 2015;

(ii) is a continuation-in-part of U.S. patent application Ser. No. 14/213,212 filed Mar. 14, 2014: which claims, under 35 U.S.C. § 119(e)(1), the benefit of the filing date of Mar. 15, 2013, of provisional application Ser. No. 61/798,875; is a continuation-in-part of U.S. patent application Ser. No. 13/565,345 filed Aug. 2, 2012 (now U.S. Pat. No. 9,089,928); and is a continuation-in-part of U.S. patent application Ser. No. 14/139,680 filed Dec. 23, 2013, which claims under 35 U.S.C. § 119(e)(1) the benefit of the filing date of Dec. 24, 2012 of provisional application Ser. No. 61/745,661;

(iii) is a continuation-in-part of U.S. patent application Ser. No. 14/105,949 filed Dec. 13, 2013;

(iv) is a continuation-in-part of U.S. patent application Ser. No. 13/966,969 filed Aug. 14, 2013, which is a continuation-in-part of U.S. patent application Ser. No. 13/565,345 filed Aug. 2, 2012 (now U.S. Pat. No. 9,089,928), which claims under 35 U.S.C. § 119(e)(1) the benefit of the filing date of Mar. 1, 2012 of provisional application Ser. No. 61/605,422 and the benefit of the filing date of Aug. 2, 2011 of provisional application Ser. No. 61/514,391;

(v) is a continuation-in-part of U.S. patent application Ser. No. 14/803,228 filed Jul. 20, 2015, the entire disclosures of each of which are incorporated herein by reference.

BACKGROUND OF THE INVENTION

Field of the Invention

Embodiments of the present inventions relate to methods, apparatus and systems for the delivery of high power laser beams to cut and remove structures in the earth, and in particular, for surface decommissioning activities for hydrocarbon wells, among other things. The present inventions also relate to the laser welding of surfaces and materials, and in particular such surfaces and materials that are located in remote, hazardous, optically occluded and difficult to access locations, such as: oil wells, boreholes in the earth, pipelines, underground mines, natural gas wells, geothermal wells, subsea structures, or nuclear reactors. The present methods, systems and apparatus further provide for the utilization of high power laser beams at the delivered location for activities, such as, monitoring, welding, cladding, annealing, heating, cleaning and cutting.

Embodiments of the present inventions relate to methods, apparatus and systems for the use of high power laser beams and associated systems, both mechanical and fluid based, for the decommissioning of structures, including off shore structures, on shore or land based structures, oil wells, oil production equipment, ships and large vessels, factories, nuclear facilities, chemical factories, chemical facilities and other structures that can be on shore, offshore, sub-sea, land based, on the surface, sub-surface and combinations and variations of these.

As used herein, unless specified otherwise "high power laser energy" means a laser beam having at least about 1 kW (kilowatt) of power. As used herein, unless specified otherwise "great distances" means at least about 500 m (meter). As used herein, unless specified otherwise, the term "substantial loss of power," "substantial power loss" and similar such phrases, mean a loss of power of more than about 3.0 dB/km (decibel/kilometer) for a selected wavelength. As used herein the term "substantial power transmission" means at least about 50% transmittance.

As used herein, unless specified otherwise, "optical connector", "fiber optics connector", "connector" and similar terms should be given their broadest possible meaning and include any component from which a laser beam is or can be propagated, any component into which a laser beam can be propagated, and any component that propagates, receives or both a laser beam in relation to, e.g., free space, (which would include a vacuum, a gas, a liquid, a foam and other non-optical component materials), an optical component, a wave guide, a fiber, and combinations of the forgoing.

As used herein the term "pipeline" should be given its broadest possible meaning, and includes any structure that contains a channel having a length that is many orders of magnitude greater than its cross-sectional area and which is for, or capable of, transporting a material along at least a portion of the length of the channel. Pipelines may be many miles long and may be many hundreds of miles long. Pipelines may be located below the earth, above the earth, under water, within a structure, or combinations of these and other locations. Pipelines may be made from metal, steel, plastics, ceramics, composite materials, or other materials and compositions known to the pipeline arts and may have external and internal coatings, known to the pipeline arts. In general, pipelines may have internal diameters that range from about 2 to about 60 inches although larger and smaller diameters may be utilized. In general natural gas pipelines may have internal diameters ranging from about 2 to 60 inches and oil pipelines have internal diameters ranging from about 4 to 48 inches. Pipelines may be used to transmit numerous types of materials, in the form of a liquid, gas, fluidized solid, slurry or combinations thereof. Thus, for example pipelines may carry hydrocarbons; chemicals; oil; petroleum products; gasoline; ethanol; biofuels; water; drinking water; irrigation water; cooling water; water for hydroelectric power generation; water, or other fluids for geothermal power generation; natural gas; paints; slurries, such as mineral slurries, coal slurries, pulp slurries; and ore slurries; gases, such as nitrogen and hydrogen; cosmetics; pharmaceuticals; and food products, such as beer.

As used herein the term "earth" should be given its broadest possible meaning, and includes, the ground, all natural materials, such as rocks, and artificial materials, such as concrete, that are or may be found in the ground, including without limitation rock layer formations, such as, granite, basalt, sandstone, dolomite, sand, salt, limestone, rhyolite, quartzite and shale rock.

As used herein the term "borehole" should be given it broadest possible meaning and includes any opening that is created in a material, a work piece, a surface, the earth, a structure (e.g., building, protected military installation, nuclear plant, offshore platform, or ship), or in a structure in the ground, (e.g., foundation, roadway, airstrip, cave or subterranean structure) that is substantially longer than it is wide, such as a well, a well bore, a well hole, a micro hole, slimhole and other terms commonly used or known in the arts to define these types of narrow long passages. Wells would further include exploratory, production, abandoned, reentered, reworked, and injection wells. Although boreholes are generally oriented substantially vertically, they may also be oriented on an angle from vertical, to and including horizontal. Thus, using a vertical line, based upon a level as a reference point, a borehole can have orientations ranging from 0° i.e., vertical, to 90°, i.e., horizontal and greater than 90° e.g., such as a heel and toe, and combinations of these such as for example "U" and "Y" shapes. Boreholes may further have segments or sections that have different orientations, they may have straight sections and arcuate sections and combinations thereof; and for example may be of the shapes commonly found when directional drilling is employed. Thus, as used herein unless expressly provided otherwise, the "bottom" of a borehole, the "bottom surface" of the borehole and similar terms refer to the end of the borehole, i.e., that portion of the borehole furthest along the path of the borehole from the borehole's opening, the surface of the earth, or the borehole's beginning. The terms "side" and "wall" of a borehole should to be given their broadest possible meaning and include the longitudinal surfaces of the borehole, whether or not casing or a liner is present, as such, these terms would include the sides of an open borehole or the sides of the casing that has been positioned within a borehole. Boreholes may be made up of a single passage, multiple passages, connected passages and combinations thereof, in a situation where multiple boreholes are connected or interconnected each borehole would have a borehole bottom. Boreholes may be formed in the sea floor, under bodies of water, on land, in ice formations, or in other locations and settings.

As used herein the term "advancing" a borehole should be given its broadest possible meaning and includes increasing the length of the borehole. Thus, by advancing a borehole, provided the orientation is less than 90° the depth of the borehole may also increased. The true vertical depth ("TVD") of a borehole is the distance from the top or surface of the borehole to the depth at which the bottom of the borehole is located, measured along a straight vertical line. The measured depth ("MD") of a borehole is the distance as measured along the actual path of the borehole from the top or surface to the bottom. As used herein unless specified otherwise the term depth of a borehole will refer to MD. In general, a point of reference may be used for the top of the borehole, such as the rotary table, drill floor, well head or initial opening or surface of the structure in which the borehole is placed.

As used herein the terms "ream", "reaming", a borehole, or similar such terms, should be given their broadest possible meaning and includes any activity performed on the sides of a borehole, such as, e.g., smoothing, increasing the diameter of the borehole, removing materials from the sides of the borehole, such as e.g., waxes or filter cakes, and under-reaming.

As used herein the terms "drill bit", "bit", "drilling bit" or similar such terms, should be given their broadest possible meaning and include all tools designed or intended to create a borehole in an object, a material, a work piece, a surface, the earth or a structure including structures within the earth, and would include bits used in the oil, gas and geothermal arts, such as fixed cutter and roller cone bits, as well as, other types of bits, such as, rotary shoe, drag-type, fishtail, adamantine, single and multi-toothed, cone, reaming cone, reaming, self-cleaning, disc, three cone, rolling cutter, crossroller, jet, core, impreg and hammer bits, and combinations and variations of the these.

As used herein the term "drill pipe" is to be given its broadest possible meaning and includes all forms of pipe used for drilling activities; and refers to a single section or piece of pipe. As used herein the terms "stand of drill pipe," "drill pipe stand," "stand of pipe," "stand" and similar type terms should be given their broadest possible meaning and include two, three or four sections of drill pipe that have been connected, e.g., joined together, typically by joints having threaded connections. As used herein the terms "drill string," "string," "string of drill pipe," string of pipe" and similar type terms should be given their broadest definition and would include a stand or stands joined together for the purpose of being employed in a borehole. Thus, a drill string could include many stands and many hundreds of sections of drill pipe.

As used herein the term "tubular" is to be given its broadest possible meaning and includes drill pipe, casing, riser, coiled tube, composite tube, vacuum insulated tubing ("VIT), production tubing and any similar structures having at least one channel therein that are, or could be used, in the drilling industry. As used herein the term "joint" is to be given its broadest possible meaning and includes all types of devices, systems, methods, structures and components used to connect tubulars together, such as for example, threaded pipe joints and bolted flanges. For drill pipe joints, the joint section typically has a thicker wall than the rest of the drill pipe. As used herein the thickness of the wall of tubular is the thickness of the material between the internal diameter of the tubular and the external diameter of the tubular.

As used herein, unless specified otherwise the terms "blowout preventer," "BOP," and "BOP stack" should be given their broadest possible meaning, and include: (i) devices positioned at or near the borehole surface, e.g., the surface of the earth including dry land or the seafloor, which are used to contain or manage pressures or flows associated with a borehole; (ii) devices for containing or managing pressures or flows in a borehole that are associated with a subsea riser or a connector; (iii) devices having any number and combination of gates, valves or elastomeric packers for controlling or managing borehole pressures or flows; (iv) a subsea BOP stack, which stack could contain, for example, ram shears, pipe rams, blind rams and annular preventers; and, (v) other such similar combinations and assemblies of flow and pressure management devices to control borehole pressures, flows or both and, in particular, to control or manage emergency flow or pressure situations.

As used herein, unless specified otherwise, "offshore" and "offshore drilling activities" and similar such terms are used in their broadest sense and would include drilling activities on, or in, any body of water, whether fresh or salt water, whether manmade or naturally occurring, such as for example rivers, lakes, canals, inland seas, oceans, seas, bays and gulfs, such as the Gulf of Mexico. As used herein, unless specified otherwise the term "offshore drilling rig" is to be given its broadest possible meaning and would include fixed towers, tenders, platforms, barges, jack-ups, floating platforms, drill ships, dynamically positioned drill ships, semisubmersibles and dynamically positioned semi-submersibles. As used herein, unless specified otherwise the term "seafloor" is to be given its broadest possible meaning and would include any surface of the earth that lies under, or is at the bottom of, any body of water, whether fresh or salt water, whether manmade or naturally occurring.

As used herein the terms "decommissioning," "plugging" and "abandoning" and similar such terms should be given their broadest possible meanings and would include activities relating to the cutting and removal of casing and other tubulars from a well (above the surface of the earth, below the surface of the earth and both), modification or removal of structures, apparatus, and equipment from a site to return the site to a prescribed condition, the modification or removal of structures, apparatus, and equipment that would render such items in a prescribe inoperable condition, the modification or removal of structures, apparatus, and equipment to meet environmental, regulatory, or safety considerations present at the end of such items useful, economical or intended life cycle. Such activities would include for example the removal of onshore, e.g., land based, structures above the earth, below the earth and combinations of these, such as e.g., the removal of tubulars from within a well in preparation for plugging. The removal of land based tubulars at the surface of the earth, below the surface of the earth, less than 20 feet below the surface of the earth, and combinations and variations of these. The land based tubulars, would include for example, conductors and casing. The removal of offshore structures above the surface of a body of water, below the surface, and below the seafloor and combinations of these, such as fixed drilling platforms, the removal of conductors, the removal of tubulars from within a well in preparation for plugging, the removal of structures within the earth, such as a section of a conductor that is located below the seafloor and combinations of these.

As used herein the terms "workover," "completion" and "workover and completion" and similar such terms should be given their broadest possible meanings and would include activities that place at or near the completion of drilling a well, activities that take place at or the near the commencement of production from the well, activities that take place on the well when the well is producing or operating well, activities that take place to reopen or reenter an abandoned or plugged well or branch of a well, and would also include for example, perforating, cementing, acidizing, fracturing, pressure testing, the removal of well debris, removal of plugs, insertion or replacement of production tubing, forming windows in casing to drill or complete lateral or branch wellbores, cutting and milling operations in general, insertion of screens, stimulating, cleaning, testing, analyzing and other such activities. These terms would further include applying heat, directed energy, preferably in the form of a high power laser beam to heat, melt, soften, activate, vaporize, disengage, desiccate and combinations and variations of these, materials in a well, or other structure, to remove, assist in their removal, cleanout, condition and combinations and variation of these, such materials.

Generally, the term "about" as used herein, unless specified otherwise, is meant to encompass a variance or range of +10%, the experimental or instrument error associated with obtaining the stated value, and preferably the larger of these.

Prior Methodologies to Remove Land Based Structures

There are generally several methodologies that have been used to remove structures from at or near the surface of the earth. These methodologies may general be categorized as: complex saws, such as diamond saws; reciprocating saws; large mechanical cutters or shears; oxygen-arc or torch cutters; abrasive water jets; and explosives. Generally, all of these methodologies require the excavation of a large hole around the structure to be removed so that personnel and equipment can be lowered to the depth where the cut is to be made in the structure, so that the portion of the structure above the cut can then be removed. Additionally, these prior methodologies typically require that the tubular be filled with cement before it is cut. For safety and efficacy considerations, because both personnel and equipment must be lowered into these holes, which can be 6, 10, 15, 20 feet deep, or deeper, the diameter of the holes has to be considerably large, and other safety, e.g., anti-collapse, measures must be taken. Additionally, and especially when dealing with oil and gas wells, e.g., conductors or casings, the risk that natural gas may be present in the hole during cutting is present. Thus, these existing methodologies, have numerous disadvantages, including that they are expensive, require substantial earth moving equipment, place personnel in more risky positions, require safety precautions to address those risks, and are time consuming, both for the cutting process and the excavating process, among other failings.

This Background of the Invention section is intended to introduce various aspects of the art, which may be associated with embodiments of the present inventions. Thus, the forgoing discussion in this section provides a framework for better understanding the present inventions, and is not to be viewed as an admission of prior art.

SUMMARY

There is a need for faster, safer, cleaner and more efficient ways to remove structures from the earth. The present inventions, among other things, solve these and other needs by providing the articles of manufacture, devices and processes taught herein.

Thus, there is provided a system for surface decommission of wells, the system having: laser unit, the laser unit having: a chiller; a laser source, the laser source capable of generating at least a 5 kW laser beam; a control systems; and, a control counsel; a deployment crane; a laser tool having a shielding and exhaust gas collection housing; a gate door on the laser unit, the gate door having and upper and a lower section, whereby the lower section is hingidly attached to the unit; the deployment crane mounted on the upper section of the gate door, whereby when the gate door is opened the upper section is a greater distance from the unit than the lower section; and, the laser tool having: a first assembly; a second assembly; whereby the second assembly is rotatable with respect to the first assembly; and, the second assembly housing a laser beam path.

Further there are provided the systems and methods having one or more of the following features: wherein a high power optical fiber extends through the first assembly; wherein the first assembly has an optical slip ring; wherein the first assembly has an optical slip ring and wherein a high power optical fiber is in optical communication with the optical slip ring; wherein the tool as deployed during normal operation is classified as having an accessible emission limit of $2.0\times10^{-3}k_1k_2$ $Wcm^{-2}$ $sr^{-1}$ radiance or less; wherein the tool as deployed during normal operation has an accessible emission limit of $2.0\times10^{-3}k_1k_2$ $Wcm^{-2}$ $sr^{-1}$ radiance or less and wherein the first assembly has an optical slip ring; having an exhaustion gas treating assembly, the assembly having: a cap; a filtration device; and a means to transport laser cutting exhaust materials to the filtration device, whereby the assembly reduces pollutants from the exhaust gasses prior to release into the atmosphere; wherein the pollutants are selected from the group consisting of VOC, HAP, TAP and particulates; wherein the pollutants are reduced by at least 95% and wherein the tool as deployed during normal operation has an accessible emission limit of $2.0\times10^{-3}k_1k_2$ $Wcm^{-2}$ $sr^{-1}$ radiance or less; wherein the pollutants are reduced by at least 90%; wherein the pollutants are reduced by at least 99%; wherein the pollutants has VOC and are reduced by at least 95%, and wherein the tool as deployed during normal operation has an accessible emission limit of $2.0\times10^{-3}k_1k_2$ $Wcm^{-2}$ $sr^{-1}$ radiance or less; wherein the pollutants are reduced by at least 95% and wherein the tool as deployed during normal operation has an accessible emission limit of $2.0\times10^{-3}k_1k_2$ $Wcm^{-2}$ $sr^{-1}$ radiance or less; and wherein the pollutants are reduced by at least 99%.

Yet further there is provided a high power laser system having a high power laser tool for deployment in a structure to be cut, the system having: a high power laser field unit having a high power laser and a laser umbilical, the laser umbilical having a high power laser optical fiber, the high power laser optical fiber having a distal end, a proximal end, and defining a length there between, the proximal end of the optical fiber in optical communication with the high power laser; the distal end of the optical fiber in optical communication with a high power laser tool; the high power laser tool having: an upper section, a lower section and housing a laser beam path; a means for reducing pollutants from a laser exhaust material stream; and, a means to provide optical shielding.

Still additionally there are provided the methods and systems having one or more of the following features: wherein the means for reducing pollutants and the means to provide optical shielding has the same cap; wherein the tool has equal to or lower than a Class I accessible emission limit; and wherein the essentially all pollutants can be removed from the exhaust gasses prior to release into the atmosphere; wherein the pollutants are selected from the group consisting of VOC, HAP, TAP and particulates; wherein the pollutants are reduced by at least 80%; wherein the pollutants are reduced by at least 85%; wherein the pollutants are reduced by at least 95% and wherein the tool as deployed during normal operation has an accessible emission limit of $2.0\times10^{-3}k_1k_2$ $Wcm^{-2}$ $sr^{-1}$ radiance or less; and, wherein the pollutants are reduced by at least 99%.

Moreover there is provided a Class I high power laser tool system for surface and near surface deployment in a tubular to be cut, the tool having: a laser tool having a first assembly, and a second assembly; a body having a length, the body mechanically associating the second assembly and the first assembly; the second assembly having a housing, the housing having an optics assembly in optical communication with a high power optical fiber and a laser beam exit port, wherein the optics assembly defines a laser beam path exiting the housing through the laser beam exit port; a means for shielding the laser beam path, whereby the tool has equal to or lower than a Class I accessible emission limit; and, a means for reducing pollutants from a laser exhaust material stream.

Additionally there is provided a method of removing a structure located in the earth, the method having: positioning a laser decommission systems in the area of a structure to removed from the ground, the laser decommissioning system having a high power laser unit, a lifting device, and a laser decommissioning tool, and a laser exhaust material filter; the structure at least partially located in the earth, having an exterior surface, and extending down under a surface of the earth for at least 50 feet; the structure having an opening at or near the surface of the earth; placing the laser decommissioning tool in optical association with the structure, whereby a laser beam path from the laser beam tool is located at a depth below the surface of the earth; delivering the laser beam along the laser beam path to the structure in a laser beam pattern, wherein the accessible emission limit is equal to or lower than a Class I, and whereby the structure is cut; generate an exhaust material stream and removing pollutants from the stream; and, removing the structure above the cut from the earth.

In addition there are provided the methods and systems having one or more of the following features: wherein the laser beam is at least about 5 kW; wherein the laser beam is at least about 10 kW; wherein the laser beam is at least about 15 kW; wherein the laser beam is at least about 20 kW; wherein the pollutants are selected from the group consisting of VOC, HAP, TAP and particulates; and wherein the exhaust stream has an amount of pollutants and the filter system reduces those pollutants by at least x %, where x is at least 85%, at least 90%, at least 95% and at least 99%; and wherein the pollutants are reduced below at least 90%, and wherein the tool as deployed during normal operation has an accessible emission limit of $2.0\times10^{-3}k_1k_2$ $Wcm^{-2}$ $sr^{-1}$ radiance or less.

Yet additionally there are provided the systems and methods having one or more of the following features: wherein the structure is a tubular and the area is a hydrocarbon well site to be decommissioned; wherein the structure is a conductor and the area is a hydrocarbon well site to be decommissioned; wherein the structure is a multistring conductor and the area is a hydrocarbon well site to be decommissioned; wherein the decommissioning tool is at least partially within the structure and the laser cut is an inside to outside cut; wherein the earth remains adjacent to the outer surface of the structure while the structure is in the earth; wherein the earth is removed from the exterior of the structure to at or below the depth, thereby creating a space, defining a distance, between the earth and the exterior of the structure; and wherein the lifting frame has, an open frame structure defined by horizontal cross bars, a plurality of main legs, a plurality of extension legs, and a pulling device.

Still further there is provided a method of performing down hole high power laser welding operations on a target structure within a borehole in the earth, the method having: optically associating a high power laser tool with a source of a high power laser beam, whereby the laser tool can deliver a high power laser beam along a beam path; operationally associating the laser tool with a target structure in a borehole in the earth; whereby the laser beam path is through a free space partially defined by a distance between the laser beam tool to the target structure; providing a controlled and predetermined atmosphere in the free space; propagating the laser beam through the controlled and predetermined atmosphere and performing a laser cutting operation on the target structure; and, generate an exhaust material stream and removing pollutants from the stream.

Moreover there is provided a method of removing a tubular from the earth, the method having: locating a structure in the earth, the structure having a length that extends below the surface of the earth, an inner surface and an outer surface, whereby the inner surface defines a cavity and the inside of the structure and the outer surface defines the outside of the structure, the cavity extending below the surface of the earth; positioning a cutting device in the cavity below the surface of the earth; cutting the structure below the surface of the earth, with an inside to outside cut, whereby an upper and lower section are formed; and separating the upper and lower sections while they are both in the earth.

Still further there are provided methods and systems having one or more or the following features: wherein the cutting device is a non-directed energy device, such as a mechanical device, such as a water jet or particle jet; wherein the cutting device is a laser; wherein the laser has a power of at least 5 kW; wherein the laser has a power of at least 15 kW; wherein a lifting device is placed over the cavity; wherein the upper and lower sections are separated by a lifting frame placed over the cavity; and, wherein the lifting device has: an open frame structure defined by horizontal cross bars, a plurality of main legs, a plurality of extension legs, and a pulling device.

Moreover there is provided a mobile laser decommission unit, the unit having: a high power laser, capable of generating a laser beam having at least about 5 kW of power; a chiller; a laser tool; a liquid containment vessel; and, an exhaust stream filtering device.

Still further there is provided the systems and methods having one or more of the following features: having a crane; and wherein the unit has a gate having a proximal end and a distal end, whereby the proximal end remains attached to the unit when the gate is in an open position; and the crane being attached to an interior of the gate, whereby the crane is positioned on the distal end of the gate; and wherein the unit is compliant for TAP, VOC, and HAP emissions and a Class I high power laser tool system.

DESCRIPTION OF THE PREFERRED EMBODIMENTS

Figure 1:
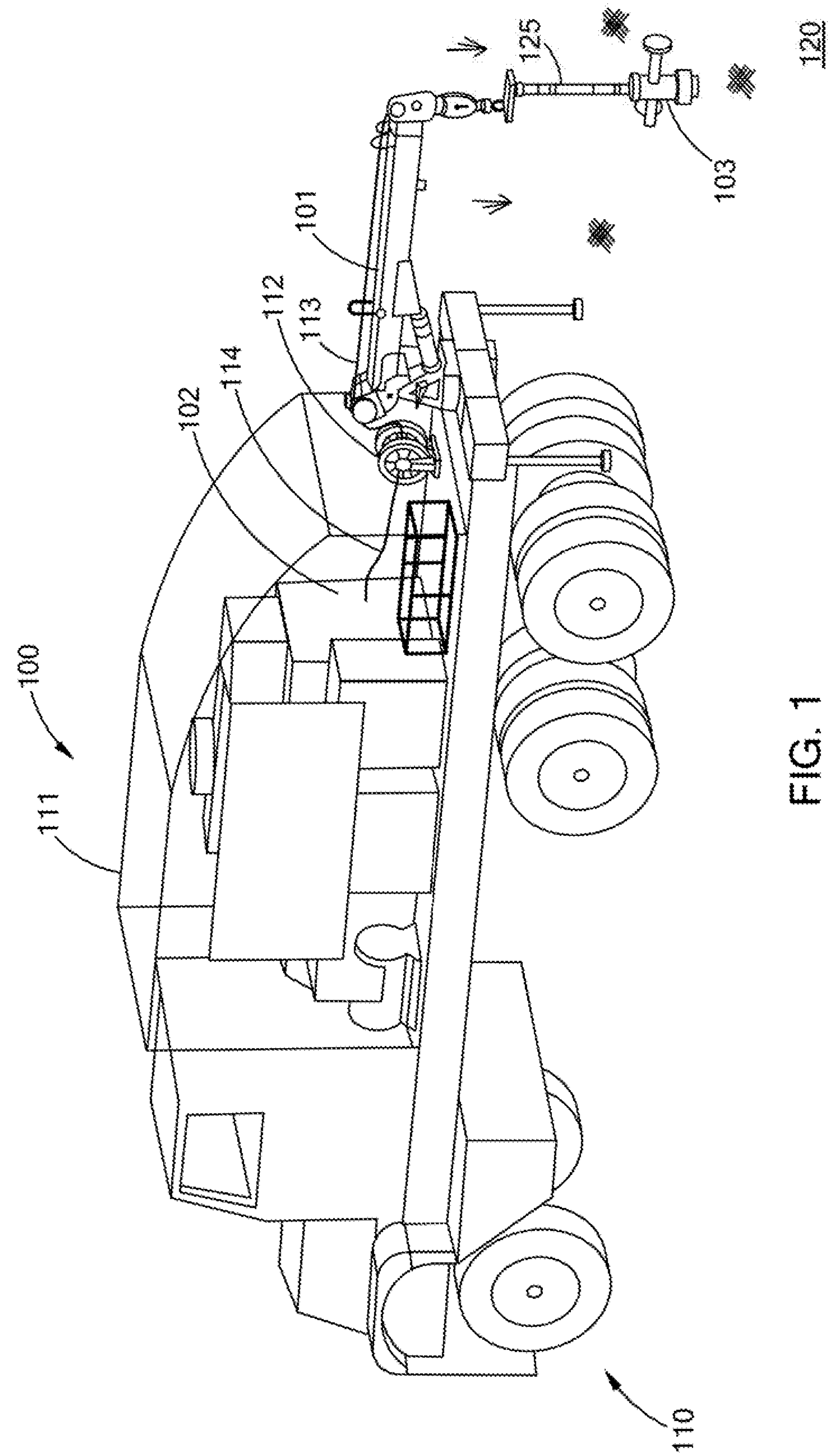
FIG. 1 is a perspective view of an embodiment of a laser unit, in accordance with the present inventions.

In general, the present inventions relate to systems, methods and tools for applying laser beams and laser energy for the cutting and removal of surface structures, and structures located in the earth but nearer to the surface, and for the welding and repairing materials, structures and objects. The present inventions thus relate to many aspects of systems, methods and tools for the delivery and use of high power laser energy in surface, near surface and within a tubular, for cutting, removing, annealing, welding, patching and repairing operations.

Embodiments of the present inventions include methods, systems and tools for performing surface, near surface and shallow decommissioning operations of hydrocarbon wells. Thus, in general, an embodiment of such a system has a high power laser that may include related field support and control equipment, such as disclosed and taught in US Patent Application Publication No. 2012/0068086, the entire disclosure of which is incorporated herein by reference. The system has a laser delivery tool assembly that has an optics assembly for shaping and directing the laser beam and a rotation means or assembly for rotating or revolving some or all of the optics assembly so that a complete cut of the target structure can be made. As this system is preferably used at or near the surface the tool should have appropriate laser shielding, and preferably sufficient shielding so that laser protective glasses are not required.

The system also has an umbilical that includes a high power optical fiber for transmitting the laser beam from the laser to the tool. The fiber may extend to the tool, or extend into the tool to the optics assembly, or may use connectors, couplers, etc. The laser beam travels along a laser beam path that typically, and in general, extends from the high power laser into the optical fiber to the optics assembly, where the laser beam is launched through free space to the intended target, e.g., the structure to be removed from at or near the surface of the earth. It being understood that there can be one of more beam shaping optics, lenses, mirrors, prisms, connectors, other optical elements or components, and free space(s) along the laser beam path in the system from the laser to the intended target. The system also may typically have a laser support fluid, which can be used to provide a jet stream into which the laser beam is launched into free space, to cool the optical assembly, or other components along the laser beam path, and combinations and variations of these and other operations.

Preferably, for the removal or decommissioning of tubulars at or near the surface of the earth, the laser tool can be lowered into the tubular, a housing can be placed over the top of the tubular exposed to the surface (or, if there is only an open borehole, at the surface of that opening) to protect from having any laser energy escape from the borehole during cutting, to monitor for the presence of any explosive gases, and also more preferably to protect from, and in general control any waste material that exits the borehole during cutting, as well as, to protect against any accidental explosion from for example natural gas being present. The laser cuts may be inside out, outside in and combinations and variations of these. The laser cuts can be circular and transverse to the longitudinal axis of the tubular, in which manner they will section the tubular. Preferably, the cuts are complete cuts, and more preferably can be complete in a single pass of the laser. However, multiple passes are contemplated and in some instances may be preferable. Also, a stitched type of cut, with uncut and cut areas, although not presently preferable, may in some instance be benefited.

Turning to FIG. 1 there is provided a perspective view of a laser decommissioning unit 100. The unit is a truck 110 based and has an outer covering, housing or box 111, (which in the drawing is show as transparent) that contains the laser system 102, which can include among other things the high power laser, a chiller, a generator, a control room or panel. There is a spool 112 for holding the umbilical 113. The umbilical 113 may be a high power optical fiber, a high power optical fiber conveyance structure, a combination of a high power optical fiber and conveyance lines or channels for fluids, data and control information. A high power optical fiber 114 connects the spool 112 with the high power laser. A lifting and positioning arm assembly 101 has the capability to raise, position and deploy the laser tool (not shown) into a well head 103 and down to a depth that is at least about 5 feet below the surface of the earth, at least about 10 feet below the surface of the earth, at least about 20 feet below the surface of the earth, and at least about 50 feet below the surface of the earth, or deeper. The system also has a pulling device 125 that is attached to the top of the well head 103. In this manner upon completion of the laser cut of the tubular below the well head, the entire cut assembly can be pulled from the ground with the arm assembly 101. The laser tool being protected within the tubular as it is removed from the ground. In this manner the deployment, cutting and removal of the tubular can be done in essentially one continuous operations.

The pulling device 125 may be separate from or integral with the laser tool. It may also have shielding to protect against the release of laser energy, waste or other materials from the borehole.

Figure 2A:
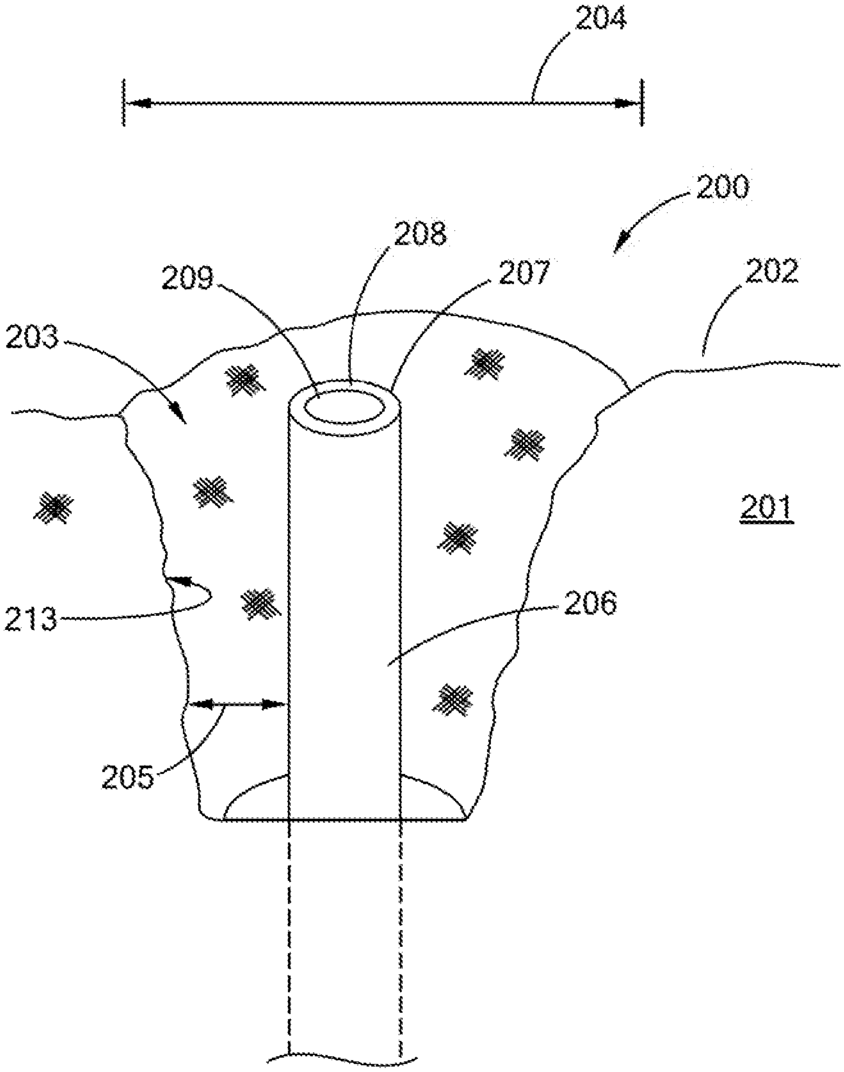
FIG. 2A is a perspective view of an embodiment of a tubular near the surface of the earth in accordance with the present inventions.

Turning to FIG. 2A there is shown a tubular 207, e.g., a conductor, for an abandoned oil well at well site 200. The tubular 207 has a face or upper end 208, an outer surface 206 and an inner surface 209. A hole 203 has been excavated below the surface 202 of the earth and into the earth 201. The lateral or radial distance from the outer surface 206 of the tubular 207 to the inner surface or wall 213 of the hole 203, is shown by double arrow 205. The diameter of the hole 203 at the surface 202 is shown by double arrow 204.

In the case of an outside to inside cut, e.g., the laser beam path leaves the laser beam tool and first strikes the outer surface 206 cutting through the tubular to, and then through, the inner surface 209, the diameter 204 and the radial distance 205 can be significantly smaller than what is required with a conventional, e.g., mechanical cutting decommissioning operation. These distances need only be large enough for the laser tool to be lower down around the tubular to the intended location, e.g., depth where the laser cut is to be made and the tubular severed and pulled. Thus, the diameter of the hole may be less than about 10 feet, less than about 5 feet and less than about 2 feet. Similarly, the radial distance may be less than about 5 feet, less than about 2½ feet and less than about 1 foot.

In the case of an inside to outside cut, e.g., the laser beam path leaves the laser beam tool and first strikes the inner surface 209 cutting through the tubular to, and then through, the outer surface 206, the diameter 204 and the radial distance 205 can be significantly smaller than what is required with a conventional decommissioning operation, and preferably can both be zero. In the inside to outside cut, earth does not have to be removed around the tubular to make room for lowering the laser tool, as the laser tool is lowered inside of the tubular. Thus, typically, a small hole, e.g., only a inch or so, larger than the outer diameter of the tubular may be needed, to reduce the amount of force required to pull the severed tubular from the earth.

It should be noted that if there is an obstruction on the inside of the tubular, restricting or limiting the ability of the laser tool to be deployed to the desired depth or location, the obstruction can be removed by directing the laser beam on that obstruction or by mechanical removal means, and combinations and variations of these.

Figure 2B:
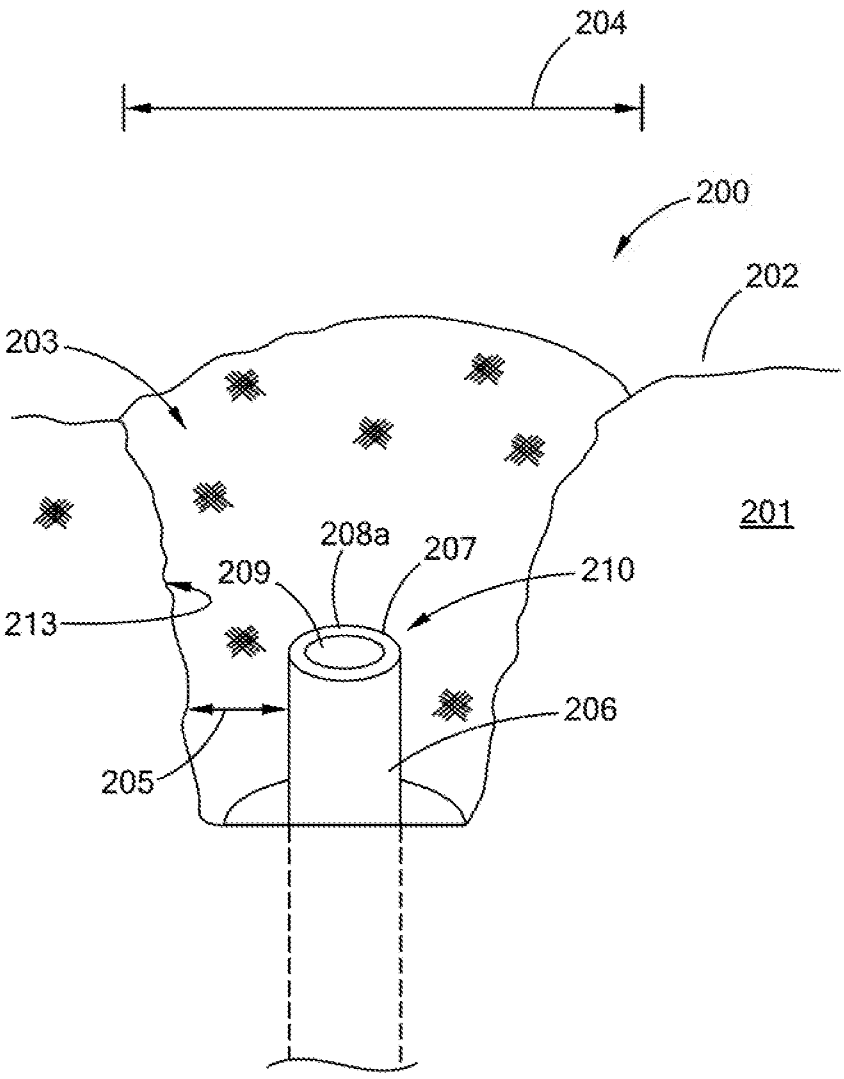
FIG. 2B is a perspective view of the embodiment of FIG. 2A after the tubular has been removed in accordance with the present inventions.

Turning to FIG. 2B the tubular 207 has been cut with a circular laser beam delivery pattern, in area 210, the severed section of the tubular has been pulled from the hole 203 and removed from the well site 200. The portion of the tubular remaining below the cut area 210 has a laser cut end or upper face 208*a*.

Figure 2C:
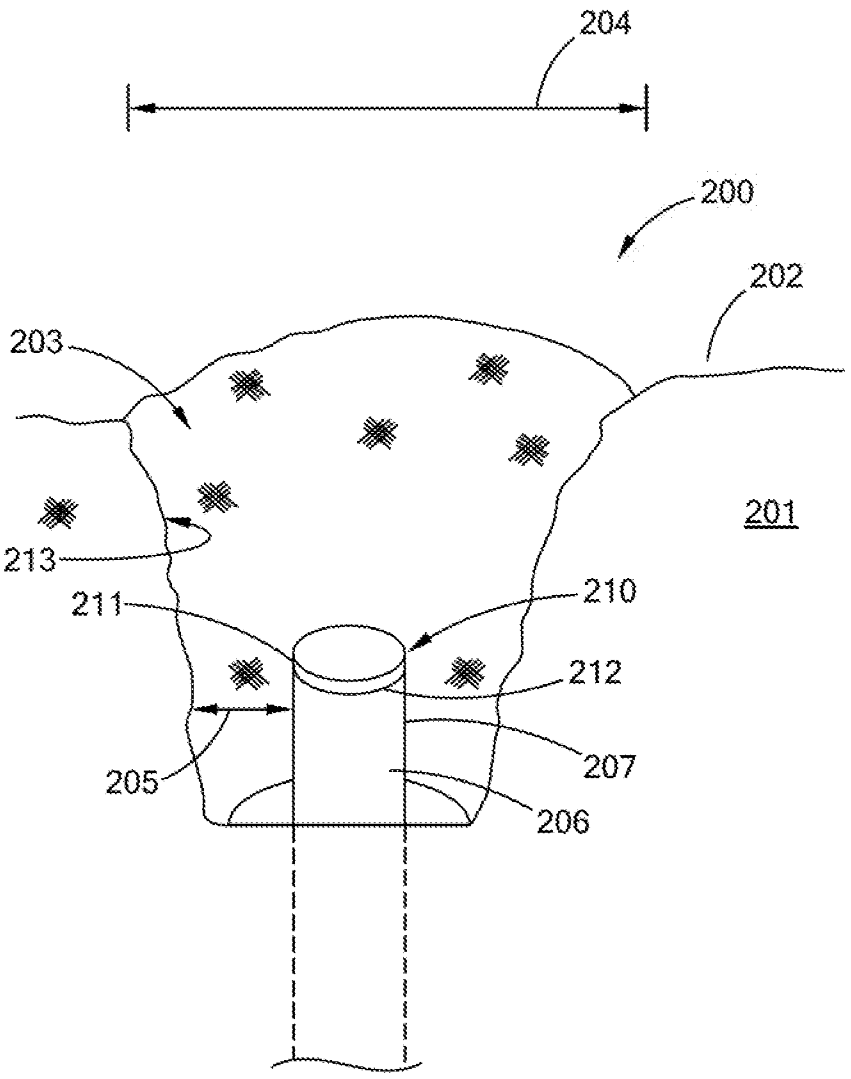
FIG. 2C is a perspective view of the embodiment of FIG. 2B after the tubular has had a cover plate added in accordance with the present inventions.

Turning to FIG. 2C a cover 211 is attached to the tubular 206. Preferably the cover 211 has a weld 212 fixing the cover the to tubular. The weld 212 may consist of one, two, three, four or more tack welds. This may be all that is required, for example if the cover's primary purpose is the identification of the well, or tubular and potentially to keep debris out of the tubular. The weld 212 may be a complete weld around the entirety of the tubular. Other methods of affixing the cover may be utilized, or may be required by rules or regulations. In other situations, a cover may not be need or otherwise utilized.

Figure 3:
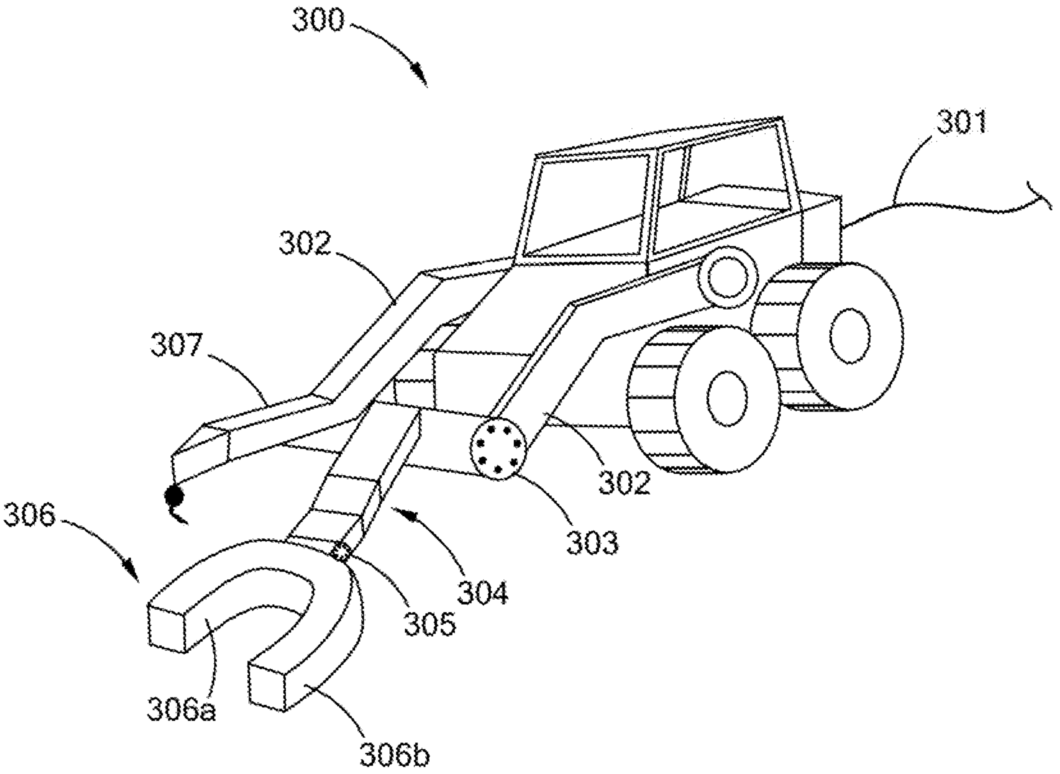
FIG. 3 is a perspective view of an embodiment of a laser unit in accordance with the present inventions.

Turning to FIG. 3, there is shown an embodiment of an outside to inside cutting tool 306, attached to a laser field decommissioning unit 300. The unit 300 has a laser umbilical 301 that extends in association with the unit to the laser tool 306. The unit 300 has a lifting arm 302 that has an articulated and extendable section 307, which can be used for pulling the severed tubular, or other purposes. The unit 302 has a lifting assembly 302, a first rotation or articulation joint 303, and extendable arm 304, and a second rotation or articulation joint 305. In this manner the laser tool can be extend to and positioned at any location and angle with respect to the tubular to be cut.

The laser cutting tool 306 has a first housing 306*a* and a second housing 306*b*. These housing contain the laser cutting heads. In operation the housings 306*a*, 306*b* are closed around the tubular to be cut. Preferably the housings 306*a*, 306*b* form a barrier to the laser energy, when closed, and may also capture any debris from the laser cutting operation. Once positioned against the outside surface of the tubular the laser cutting heads (not shown in the figure) are operated, directing the laser beams (preferably each housing contains a laser cutting head) around the tubular, severing it. During the cutting operation the arm assembly 302-307 may be holding the tubular so that once severed it does not move, slip and potentially damage the laser cutters or housings. It is understood, although not shown in FIG. 3, that high power laser fibers extend into the housings 306*a*, 306*b* and provide optical connections, associations from the high power lasers to the laser cutting tools.

Generally, when performing laser cutting operations in the field it is desirable, and at time preferable to control the free space through which the laser beam travels from the tool to the target with a laser beam support fluid, or laser fluid. These fluids can be, for example, liquids or gases, for example $D_2O$, water, saline, kerosene, nitrogen, air, oxygen, or argon. They can be used to fill the area where the laser operation is being performed or they may be part of a single or compound laser jet, or may be part of a separate jet. The choice, or selection of the laser fluid and its delivery parameters, depends upon several factors including the laser wavelength and absorptivity of the fluid at that wavelength, the stand-off distance (e.g., the distance from the last laser optics (e.g., a pressure window)) to the target, the free space environment (e.g., turbidity, fluid flow, pressure, etc.), regulations regarding the cutting operation, safety issues, efficiency consideration, and combinations and variations of these and other factors. Further, the laser fluid can be provided to the laser cutting tool or laser cutting area by way of a separate line or conduit, or by way of a line or conduit integrated into or associated with the laser umbilical. The laser fluid can also be supplied separately to the laser operations area. The laser fluid may also assist in removing debris or waste materials from the cutting area, and the cut it self.

Figure 6:
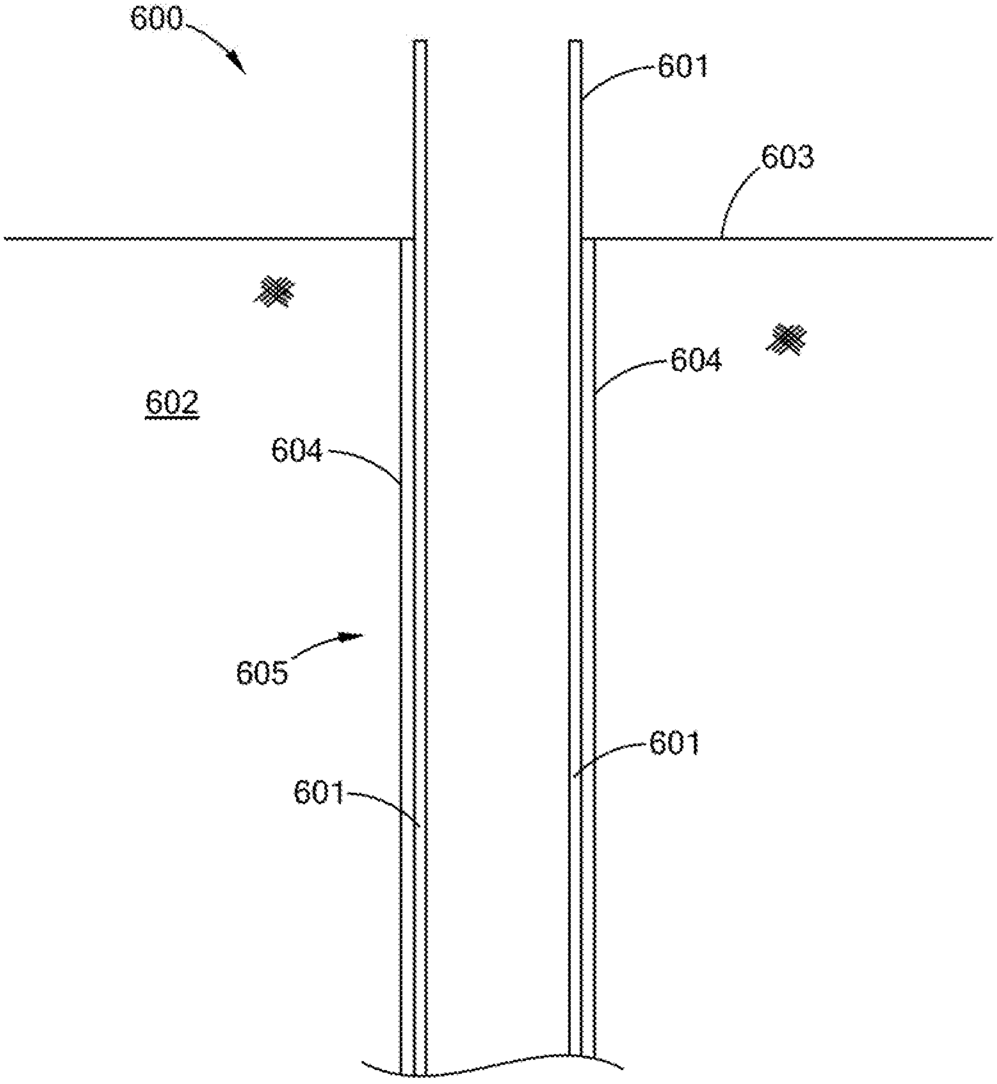
FIG. 6 is a cross sectional view of an embodiment of a well site in accordance with the present inventions.

Turning to FIG. 6 there is shown a cross sectional view of a well site 600, having a tubular 601 that extends above and below the surface 603 of the earth 602. The tubular 601 is within a borehole 604. Cement 604 fills the area between the borehole 605 and the outer surface of the tubular 601. The tubular may be open as shown in the embodiment of FIG. 6 or it may have a well head, Christmas tree or other flow control related device on it. As long as this device provides sufficient access for lowering the laser tool, it typically will not need to be removed.

Figure 6A:
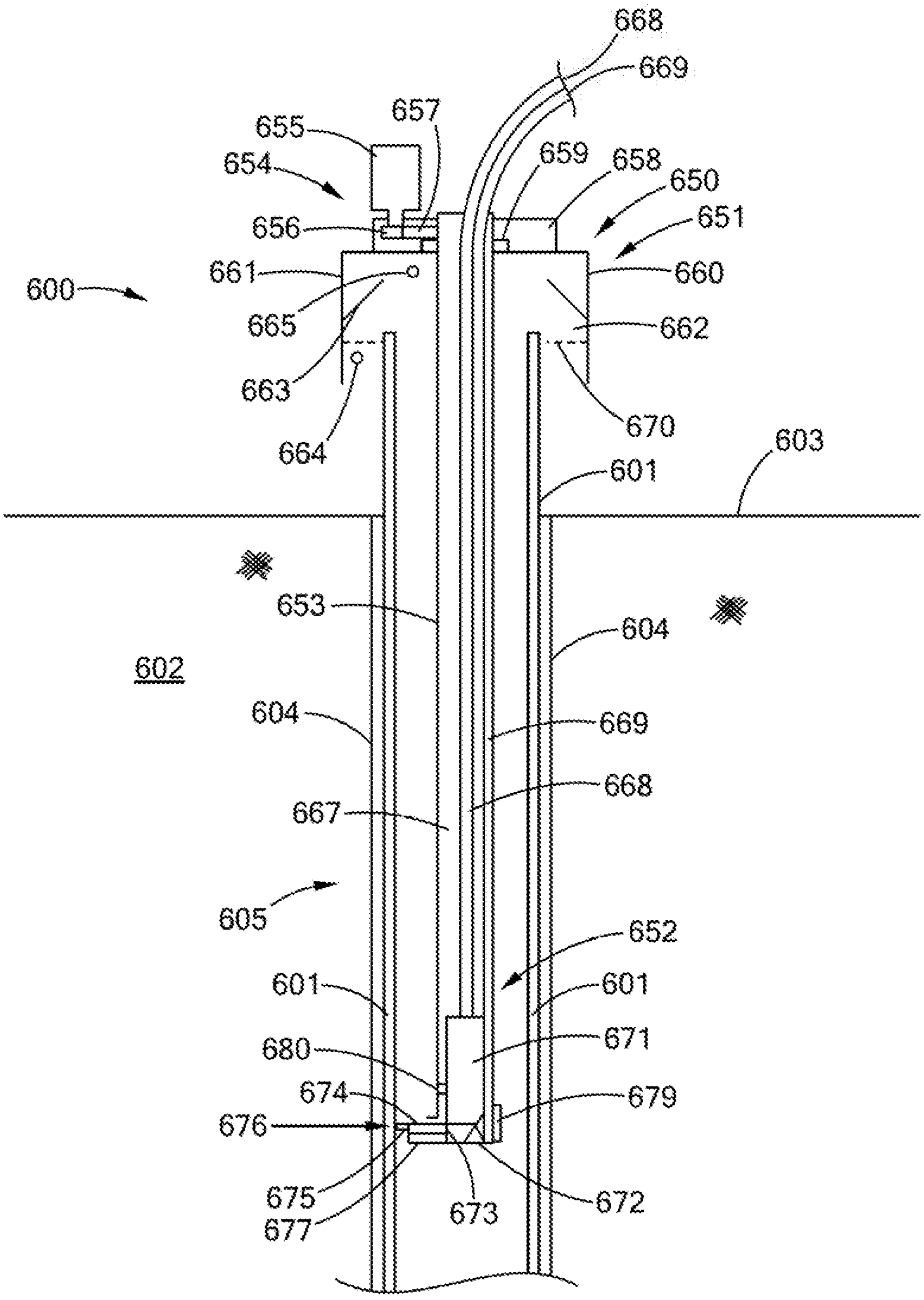
FIG. 6A is cross sectional view of an embodiment of a laser decommissioning tool in accordance with the present inventions.

Turning to FIG. 6A there is shown an embodiment of a laser decommissioning tool 650 positioned in the tubular 601. The laser decommissioning tool 650 has an upper section 651 and a lower section 652. The upper section 651 is configured to be located above the surface 603, outside of and, preferably on, the tubular 601. The lower section 652 is configured to extend down into the borehole 605 and tubular 601 to the intended depth at which the laser cut is to be made to sever the tubular 601 for subsequent pulling from the earth 602. The lower section and the upper section are connected by laser spar or spar 651.

In this embodiment the upper section 651 has a rotation assembly 654, which includes a motor 655, a gear box 656, and a drive mechanism 657 engages the spar 653 and rotates it. The upper section has a base 658 that supports and may partially house, the rotation assembly 654. Bearings and seals, e.g., 659 provide for the rotation of the spar 653 with respect to the upper section 651. The upper section 651 has a hood assembly 660. The hood assembly 660 is supported by and attached to the base 658. It being understood that the source for rotation may be any type of motor, or other types of mechanisms, e.g., a torsional "clock" spring, or a hand crank; and that the gear box and drive mechanism can be any type of rotational driving configurations such as, e.g., a transmission, a gear box, gears, a chain drive, a belt drive, a direct drive, etc.

The hood assembly 660 has an outer body or sleeve 661. The sleeve 661 contains passage 662, which in this embodiment is an annular passage, for the release or discharge of the laser fluid and any gases or debris generated by the laser cutting operation. Preferably the passage 662 directs the flow downward in the general direction of the surface 603. The passage may be a single channel, or multiple channels, it may contain or have its flow associated with filters, holding containers, monitoring systems, exhaust lines, and noise suppression devices. Preferably the passage 662 has laser energy suppression devices 663. The laser energy suppression devices 663 may be baffles, a tortuous path, a beam dump material, a material to block back reflections, or other devices or systems to prevent any laser energy from leaving the borehole or tubular. Monitors or sensors 665, 666, which can detect the presence of laser energy, e.g., the laser beam, reflections or back reflections from the laser beam, are located within the hood assembly 660. Sensor 665 is preferably located nearer to the spar 653 and above the opening of the tubular 601, which will provide information about a possible break of the laser fiber in the spar, as well as, provide information about the laser beam coming back up out of the tubular. Sensor 666 is preferably located at or near to the opening of the passage 662 to the environment, and thus will detect the presence of any laser energy that could escape, e.g., be propagated outside of, the hood assembly 660. Preferably, the optical fiber has a break detection system associated with it. The fiber break detection system, and the laser monitors 665, 666 are then part of a laser control system, which can shut the laser and system down if need be. Examples of break detection and control systems are found in US Patent Publication Nos. 2012/0248078 and 2012/0273269, the entire disclosures of each of which are incorporated herein by reference. Further, it is preferable that appropriate sensors and interlocks be utilized so that prior to, or more preferably in order for, operation the system determines that all shielding or laser isolations means are properly positioned and engaged.

Embodiments of the decommissioning tools and systems may have an assembly to control the bending for the fiber from the laser field unit to the borehole, thus in some embodiments the fiber may have to transition and thus bend from essentially horizontal to essentially vertical. Preferably this transition is in a manner that adequately supports the optical fiber while minimizing bending loses in the fiber, and more preferably this transition is accomplished by using an optical block, e.g., wheel assembly or goose neck assembly, of the type disclosed and taught in US Patent Application Publication No. 2012/0068086 and Ser. No. 14/105,949 the entire disclosures of each of which are incorporated by reference. Laser field units of the type disclosed and taught in in US Patent Application Publication No. 2012/0068086 and Ser. No. 14/105,949, the entire disclosures of each of which are incorporated by reference, may preferably be used with the laser decommissioning tools and systems.

The upper section 651 preferably has a latching mechanism 670 (shown as dashed lines, to indicate that it is partially in the passage 662, for this embodiment, but does not block the flow). The latching mechanism 670 attaches and holds the laser tool 650 in place on the tubular during laser operations. The latching mechanism 670 may also have centering and positioning devices, and in this manner serve as a landing and centering mechanism for the placement of the tool 650 in and on the tubular 601. The laser tool may have a centering device, a positioning device, a latching devices and combinations and variations of these.

It being understood that the base 658, rotation assembly 654 and hood assembly 660 can be integral, or affixed in any manner that is suitable for the conditions of use, such as welding, bolts, nuts, treaded components, pressure fits, and screws. Further, components of the rotation assembly may also make up some or all of the base, and components of the hood assembly may also make up some or all of the base, and similarly, components of the rotation assembly may also make up some or all of the hood, and vice versa.

Preferably, spar 651 is made from a strong material such as metal, steel, structural plastic, or composite, such as a carbon fiber composite. The spar 653 preferably has a cavity 667 that contains the high power optical fiber 668 and the conveyance line 669 for the laser fluid (the cavity 667 may also serve, in whole or in part as the laser fluid conveyance line). The spar may also preferably contain data, information, and control lines, e.g., wires and data transmission optical fibers. In some situations and for some data and information there may also be wireless communication links. The spar and the tool may also contain other sensor or monitoring devices, such as temperature, pressure, optical video, IR video, laser radar, cut verification means, and other types of sensor and monitoring apparatus and devices.

The lower section 652 of tool 650 preferably contains the laser optics assembly or package 651, which has beam shaping and directing optics which can include a direction changing member 672 such as a TIR (total internal reflection) prism, or a mirror. The laser optics assembly 651 has or is associated with a laser nozzle 673 through which the laser beam 674 and fluid jet are launched along a laser beam path 675 to the target 676, which in this situation is the tubular 601. Examples of laser optics assemblies, nozzles and packages are found in US Patent Publication Nos. 2012/0275159, 2012/0267168, 2012/0074110, and 2013/0319984, the entire disclosures of each of which are incorporated herein by reference. It should further be understood that the motor may be placed at or near the lower section or in between the lower and the upper sections of the tool. There is also a stand-off member 677 to protect the nozzle 673, and a guide 679, which may be a low friction plate, a roller, or a mechanism that extends out and engages the inner wall of the tubular.

Preferably the lower section 652 has an explosive gas detector, e.g., a methane detector, so that a build up of gas can be observed and appropriate mitigation steps taken. This detector can be integrated into the control system.

Figure 6B:
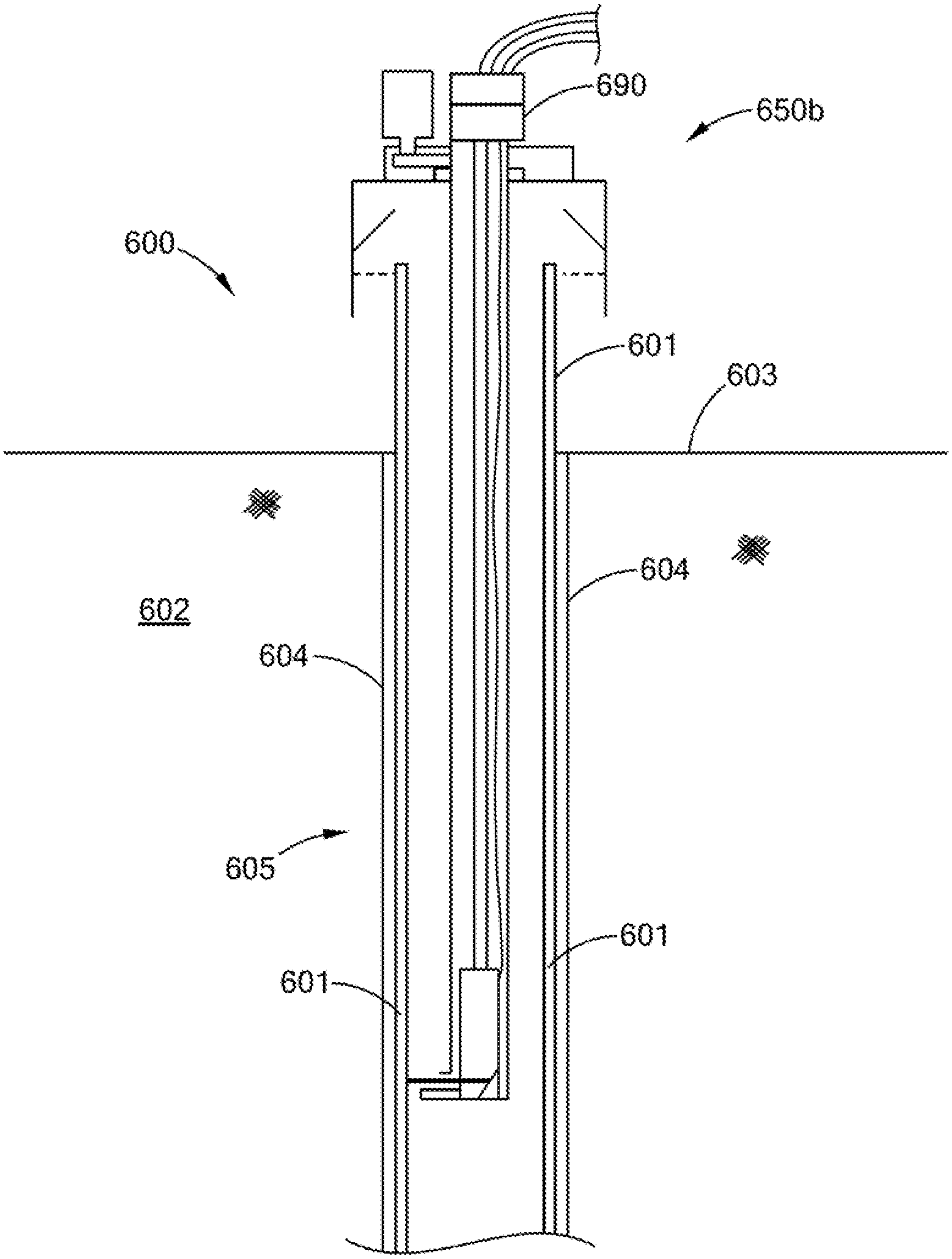
FIG. 6B is a cross sectional view of an embodiment of a laser decommissioning tool in accordance with the present inventions.

Turning to FIG. 6B there is shown the well site 600 of FIG. 6 (like numbers indicate like structures). The laser tool 650*b*, is similar to the laser tool 650 of the embodiment of FIG. 6. The laser tool 650 does not have a guide 679. The laser tool 650*b* has an optical rotational transition device 690, e.g., an optical slip ring (OSR) attached to it. The OSR 690 provides for the transition of the laser beam and laser beam path, as well as the laser fluid across a rotating/non-rotating junction. Examples of optical rotational transition devices are provided in US Patent Publication Nos. 2010/0044106, 2010/0044103, and 2013/0266031, the entire disclosures of each of which are incorporated herein by reference.

In the embodiment of FIG. 6 as the spar is rotated the fiber will be twisted, and thus, the rotation of the spar should be limited to a few rotations in a first direction, e.g., clock wise, and then then a few rotation in the opposite direction e.g., counter clock wise to prevent undo bending and tension from being placed on the high power laser fiber, which could adversely affect the fibers performance. Preferably, the spar is rotated slightly more than 360 degrees in the first direction and than back slightly more than 360 degrees in the other direction to assure a complete cut of the tubular.

In the embodiment of FIG. 6B, because the high power optical fiber will not be twisted by the rotation of the spar, the spar can be rotated any number of times in any direction.

Figure 7A:
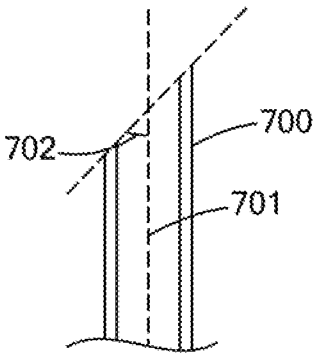
FIGS. 7A to 7E are views of embodiments of laser cuts in accordance with the present inventions.
Figure 7B:
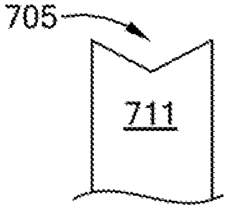
Figure 7C:
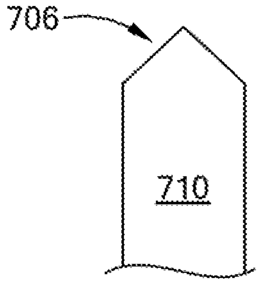
Figure 7D:
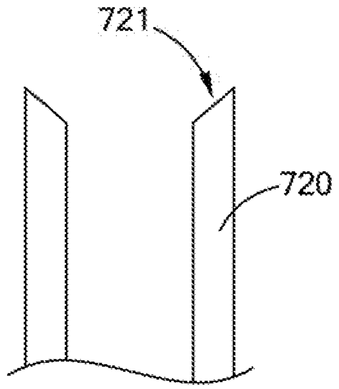
Figure 7E:
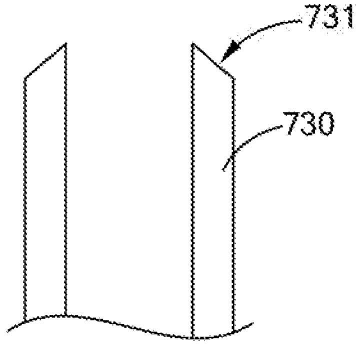

It should be noted that while a normal, i.e., 90° to the longitudinal axis of the tubular, cut is shown in FIG. 2B, the cut may be at any angle, shape, or orientation with respect to the vertical axis of the tubular. Thus, the cut could be at about 15°, at about 30°, at about 45°, and at about 60°. Additionally, the cut does not have be planar. It could provide a peeked or trough laser cut surface. Additionally, the cut may be tapered inwardly or tapered outwardly. Turning to FIG. 7A there is shown a cross sectional view of an embodiment of a tubular 700 having a longitudinal axis 701 that has a planar laser cut at about 45° (as shown by angle 702, to the axis 701). In FIG. 7B there is shown a plan view of an embodiment of a tubular 711 have a trough shaped 705 laser cut; and in FIG. 7C there shown a plan view of an embodiment of a tubular 710 having a peeked shaped 706 laser end cut. Turning to FIG. 7D there is shown a cross sectional view of an embodiment of a tubular 720 having an inwardly tapering 721 laser cut. In FIG. 7E there is shown an embodiment of a tubular 730 having an outwardly tapering end cut 731.

Figure 8:
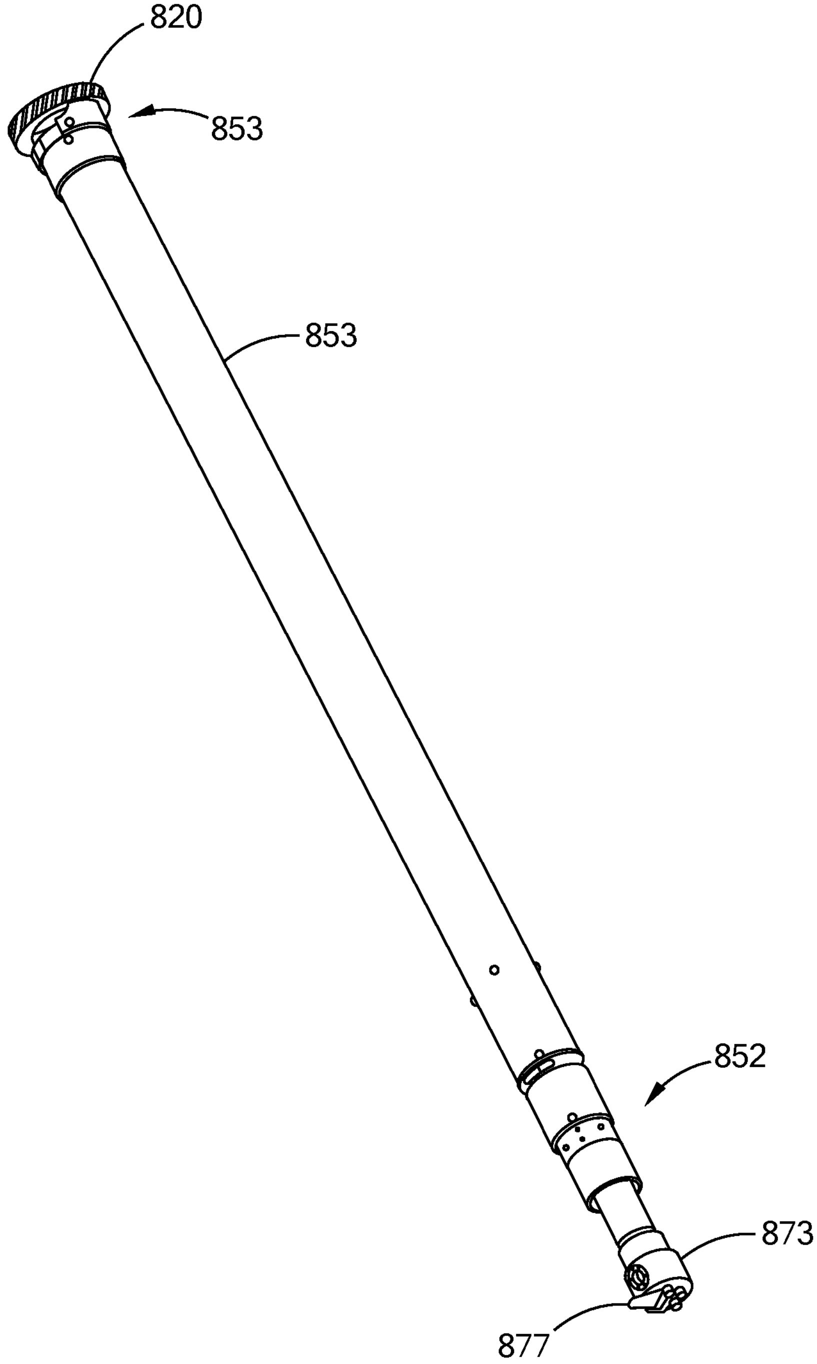
FIG. 8 is a perspective view of an embodiment of a laser tool in accordance with the present inventions.

Turning to FIG. 8 there is show a perspective view of an embodiment of a spar 853 and lower section of a laser tool 852. The spar 853 has a drive gear 820 attached to its upper or proximal end 853*a*. (Unless specified otherwise, proximal and distal are relative terms, with proximal indicating a location closer to the laser along the laser beam path, and distal indicating a location further away from the laser a long the laser beam path.) The lower section 852 has a nozzle assembly 873 and a stand off bar 877.

In the embodiment of FIG. 8 a guide (e.g., FIG. 6, guide 679) is not needed, because the strength, e.g., structural integrity, of the spar with respect to its length, e.g., about 15 feet, is such that the spar will not unduly bend or wobble during the laser cutting operation. If the spar is longer, or if is made more flexible, perhaps to get around a bend or down a branch in the borehole, then one or more guides may be necessary. Further, depending upon these and other factors, a down hole rotation assembly may be needed or beneficial to rotate the nozzle, either in conjunction with the up hole motor, or as the sole source of rotation.

Figure 8A:
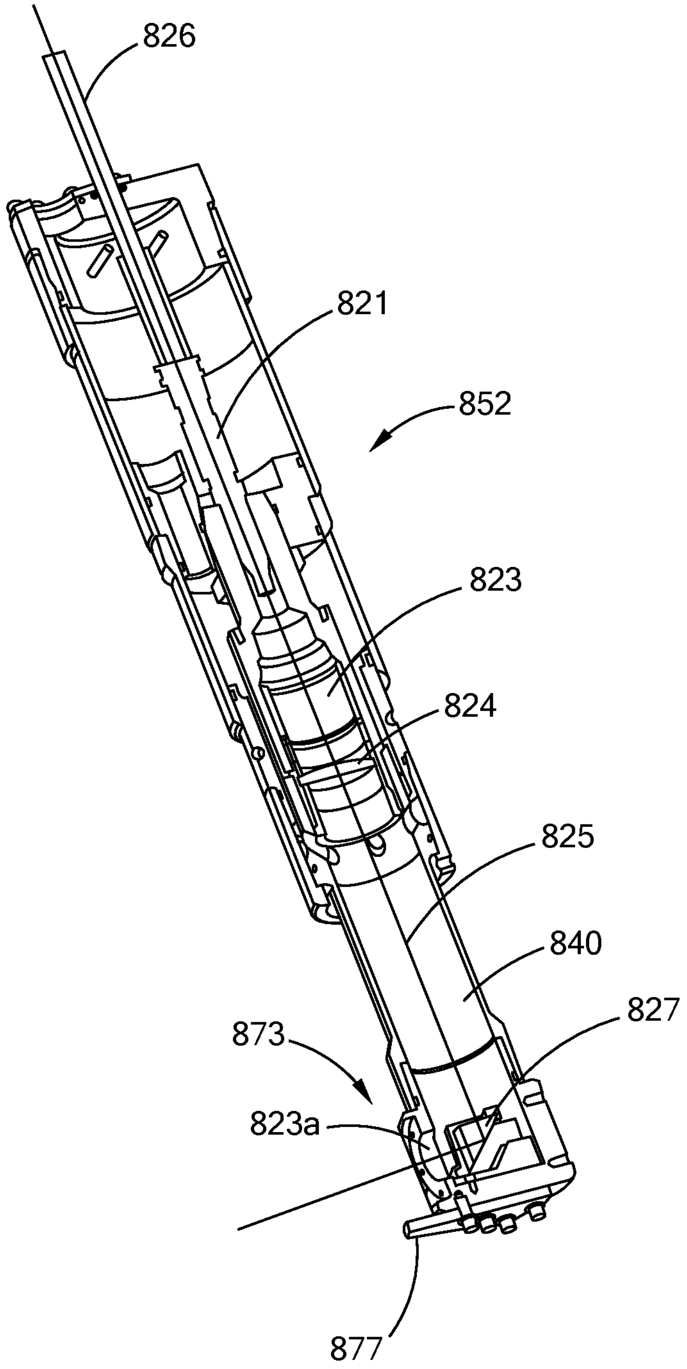
FIG. 8A is a cross sectional perspective view of the lower portion of the embodiment of FIG. 8.

Turning to FIG. 8A there is shown an enlarged cross sectional perspective view of the laser tool lower section 852 of the embodiment of FIG. 8. The high power optical fiber 826 enters the laser tool section 852 at the proximal end of that section. The optical fiber is attached to an optical connector 821 (for example, a connector of the type taught and disclosed in US Patent Publication No. 2013/0011102, the entire disclosure of which is incorporated herein by reference. The lower section 852 has a cavity 823 for holding the optics (not shown) that is sealed with a window 824. The laser beam path 825 is shown traveling through the fiber 825, into and through the connector 821, into and through the optics (not shown) in cavity 823, into and through window 824, through free space 840 into the nozzle assembly 873, where prism 827 redirects the beam path 825 by about 90 degrees to travel through the opening 873*a* and exit the nozzle assembly 873.

The spar may also be located within, or engaged to the drive assembly in a manner in which the length of the spar below the drive assembly can be adjusted and then locked in place. In this manner the exact location of the cut, below the top of the tubular, conductor, casing, etc., can be predetermined. Thus, the length of the spar between the lower section and the upper section is fixedly adjustable. Any type of manual or automatic adjustment and locking devices may be used, including clamps, wedges, keys, bolts, pins, slips, etc.

Figure 9:
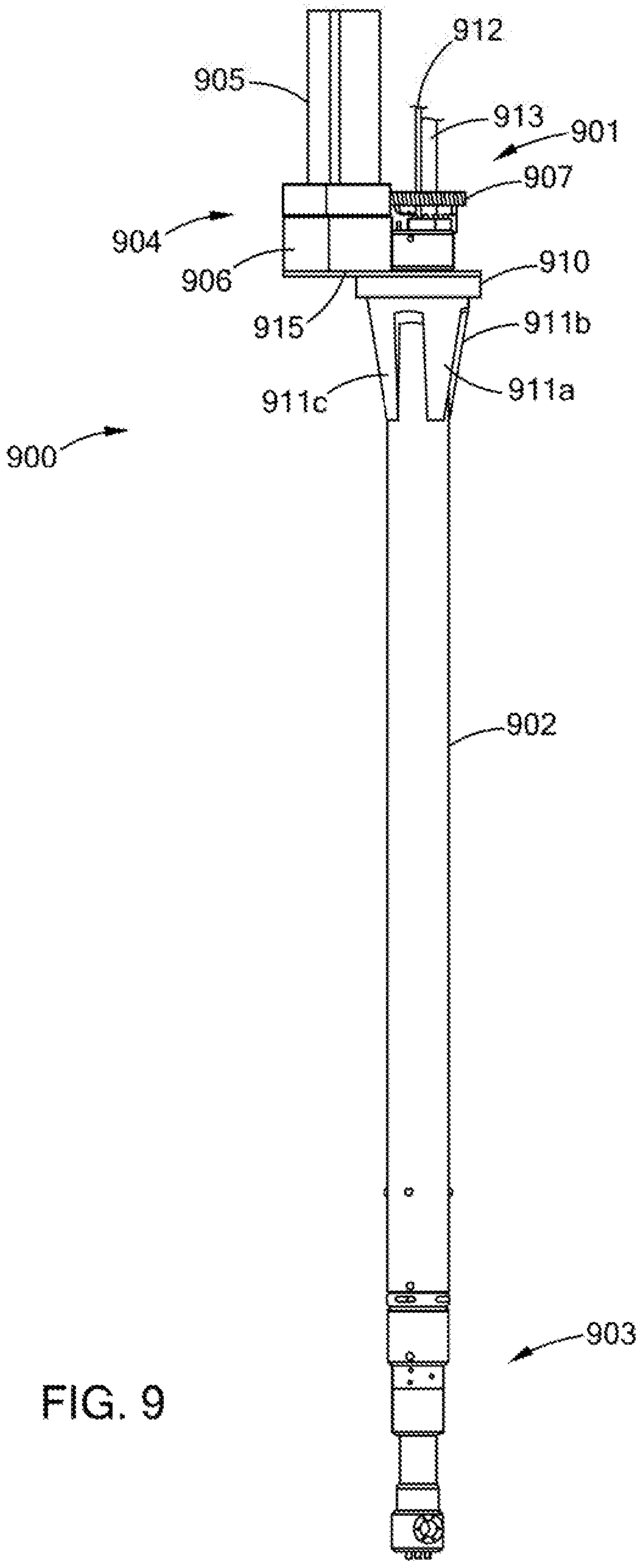
FIG. 9 is a perspective view of an embodiment of a laser tool in accordance with the present inventions.

Turning to FIG. 9 there is shown a perceptive view of an embodiment of a laser decommissioning tool 900. The tool 900 has an upper section 901, a spar 902 (which in this embodiment makes up the middle section of the tool 900) and a lower section 903. The tool 900 has a rotational assembly 904. The tool 900 has a motor 905, a transfer assembly (e.g., transmission, gear box, gears, chain drive, etc.) 906 and a drive gear 907, which is attached to the spar 902. Thus, the motor 905 through the transfer assembly 906 and drive gear 907 can rotate the spar 902 and through the spar 902 rotate the lower section 903. A platform or base plate 915 supports the transfer assembly 906. A clamp or placement and locking device 910 is attached around the spar 902. This device has four wedge like members, 911*a*, 911*b*, 9121*c* (the four not being seen in this view of the embodiment). The wedge like members, wedge (e.g., drive, exert force) against the inside of the inner most tubular to be cut when the tool is lowered into position. It being understood that there could be three, five, six or more wedges or wedge like members. The tool 901 has a high power laser fiber 912 and laser fluid, e.g., nitrogen supply line 913.

In addition to and in combination with the wedges the locking device can me any type of mechanical engagement device that attached to the tubular or other structure to be cut and holds the tool in place during operation. Preferably, this device has the ability to, or is otherwise associated with a device that enables the tool to be positioned in the tubular, e.g., coaxially with the tubular axis, i.e., centered, off axis, adjacent a side wall. In general, it is preferable to have the tool centered in the tubular to be cut. These engagement devices can include, for example: holes being place in the wedges of the embodiment of FIG. 9 and bolts, pins or other mechanical fixing devices inserted into the holes and engaging the tubular; band type device that are tightened around the tubular; clamps; bolts: inflatable devices along the lines of a packer; expanding or contracting mechanical fingers or members that engage the tubular; a tack weld, and other types of engagement and fixing devices. Preferably, the engagement device grabs or holds the tubular to be cut with sufficient force that the tool will not become dislodged, and more preferably not move at all, (until the engagement device is disengaged), if there was for example a sudden increase in pressure within the pipe, e.g., a natural gas pocket explosion, or if the tubular shifts position.

Figure 9A:
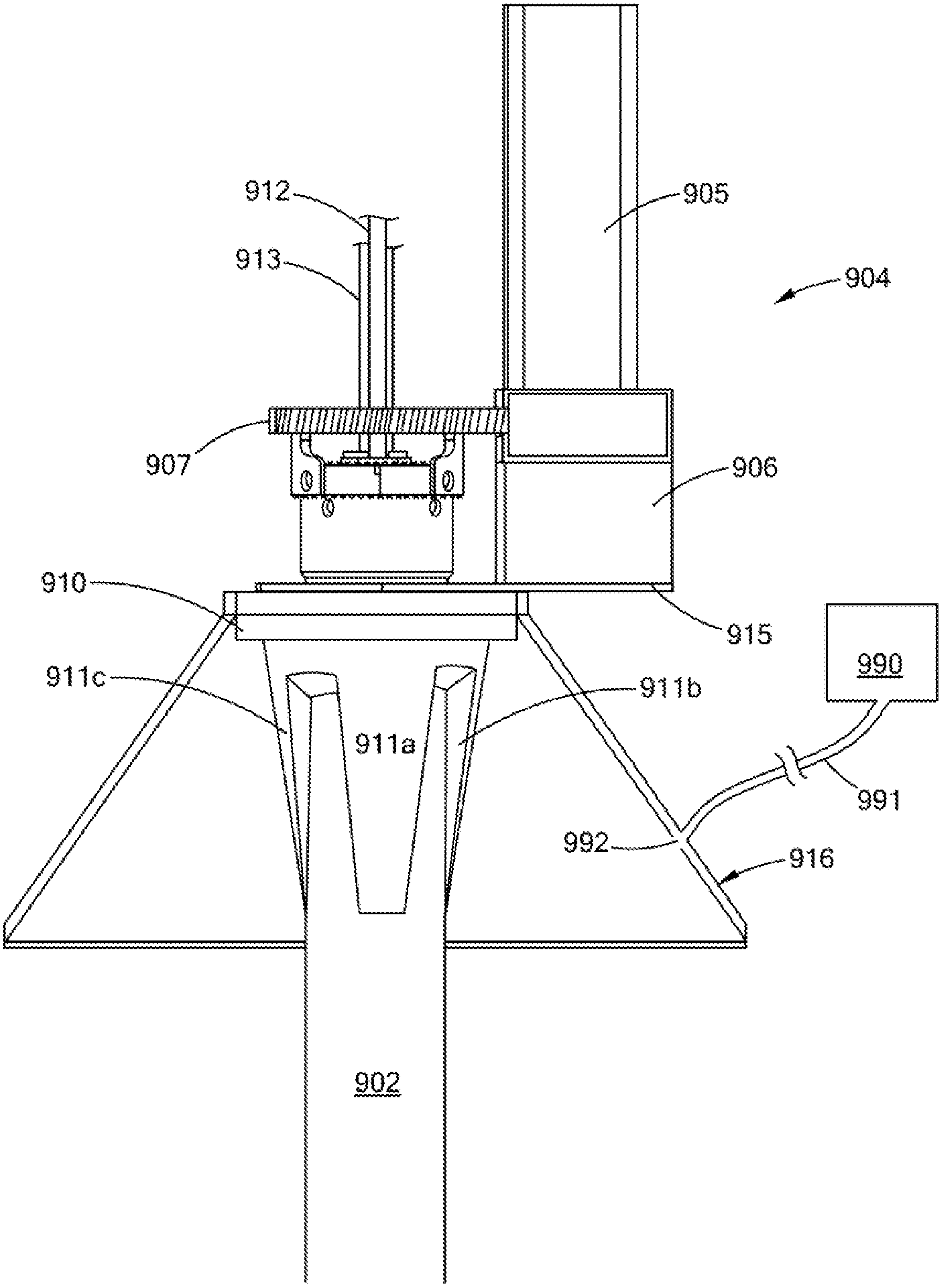
FIG. 9A is a perspective and cross sectional view of an embodiment of a laser tool in accordance with the present inventions.

Turning to FIG. 9A there is shown an enlarged cross sectional view of the upper section 901 of tool 900. A hood or cap 916 (shown in cross sectional view) has been attached to the tool, and in this embodiment is fixed against the base plate 915.

Figure 9B:
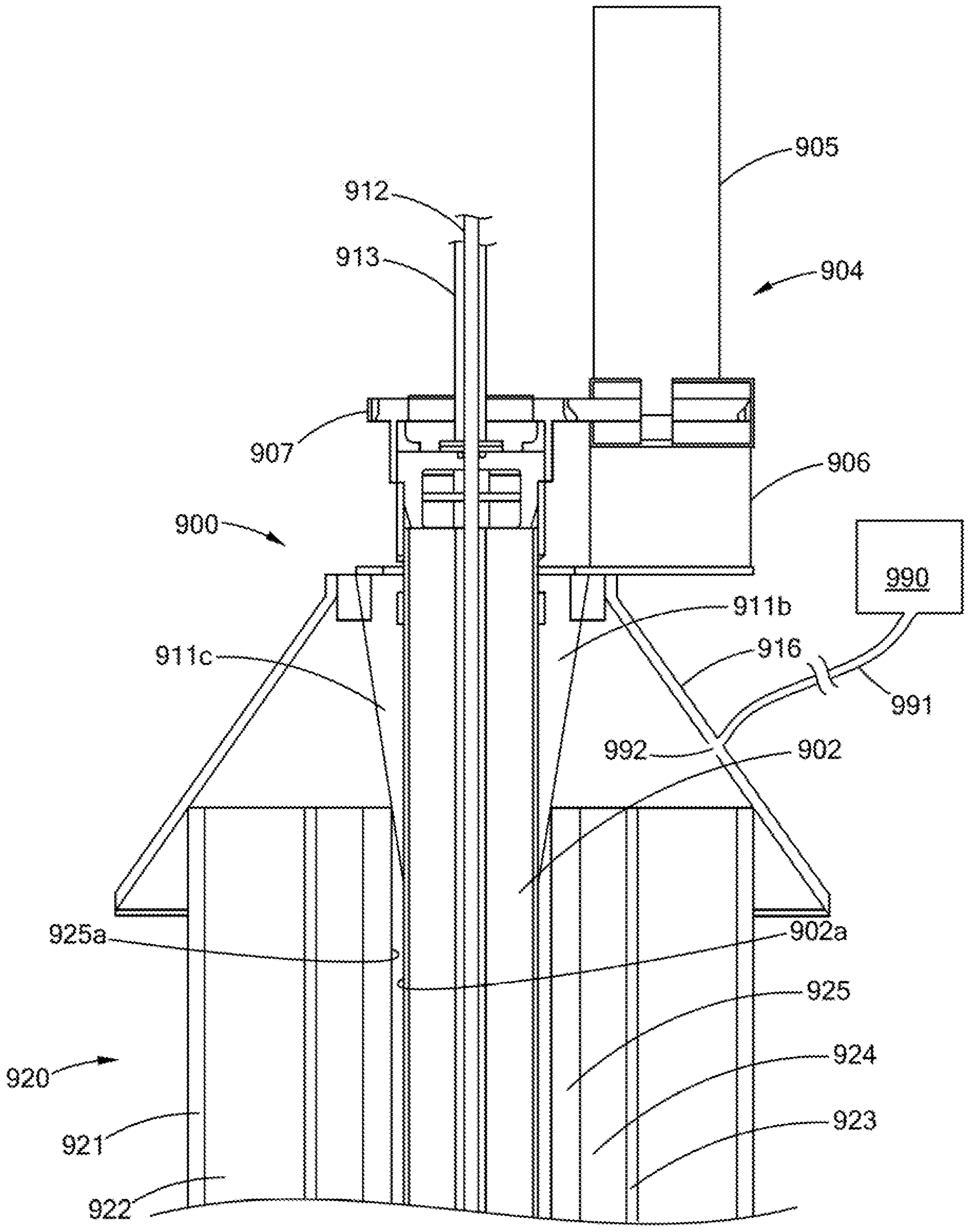
FIG. 9B is a cross section view of the tool of FIG. 9A as deployed in accordance with the present inventions.

Turning to FIG. 9B there is shown a cross sectional view of the tool 900 positioned in and on a multistring tubular configuration 920 for cutting. The multistring configuration 920 has an outer tubular 921, an annular space 922 between the outer tubular 921, and a middle tubular 923. An annular space 924 is formed between middle tubular 923 and inner most tubular 925. Annular spaces 922 and 924 preferably are filled with cement, however, this may not necessarily be the case. As the tool is lowered into place the wedges, e.g., 911*b*, 911*c*, are forced against the inner wall 925*a* (of the inner most tubular 925) and against the outer surface 902*a* of the spar 902. In this manner the wedges center and hold the spar in position within the multistring configuration 920.

The cap 916 has an opening 992 that places the inside of the cap in fluid communication with a tubing 991, e.g., hose, flexible tube, pipe, conduit, etc. The tubing 991 connects the opening 992 to a filtration device 990. In this manner the gasses on the inside of the cap 916 are in fluid communication with the tubing 991 and the filter device 990, while also being isolated from the outside environment. As laser cutting operations create an exhaust gas material, which can be made up of particulates, harmful or undesirable vapors, gases and combinations of these, a stream of the exhaust material, e.g., an exhaust gas stream, is contained and carried by tube 991 to filter device 990. Filter device 990 most preferably removes essentially all materials that are classified as pollutants from the exhaust gas stream before that stream is released into the environment.

It is understood that the wedges would operate similarly on a single string configuration and on multistring configurations have more or less tubular than shown in the embodiment of FIG. 9B. Further, although FIG. 9C shows the tubulars to be concentric, it is understood that in the field eccentricities and irregularities may be present in decommissioning wells, especially in older and very old wells. The laser tool can cut through the entirety of these multistring configurations, but care should be taken as cutting rates may vary depending upon the configuration.

Cut verification technology may also be utilized with the laser decommissioning tool. While not as important in the single string configuration, when dealing with multi string and damaged wells cut verification can be a useful tool to save time and avoiding difficulty in pulling the strings from the ground. Examples of cut verification systems are taught and disclosed in US Patent Publication Nos. 2013/0319984 and 2012/00074110, the entire disclosures of each of which are incorporated herein by reference.

Figure 10:
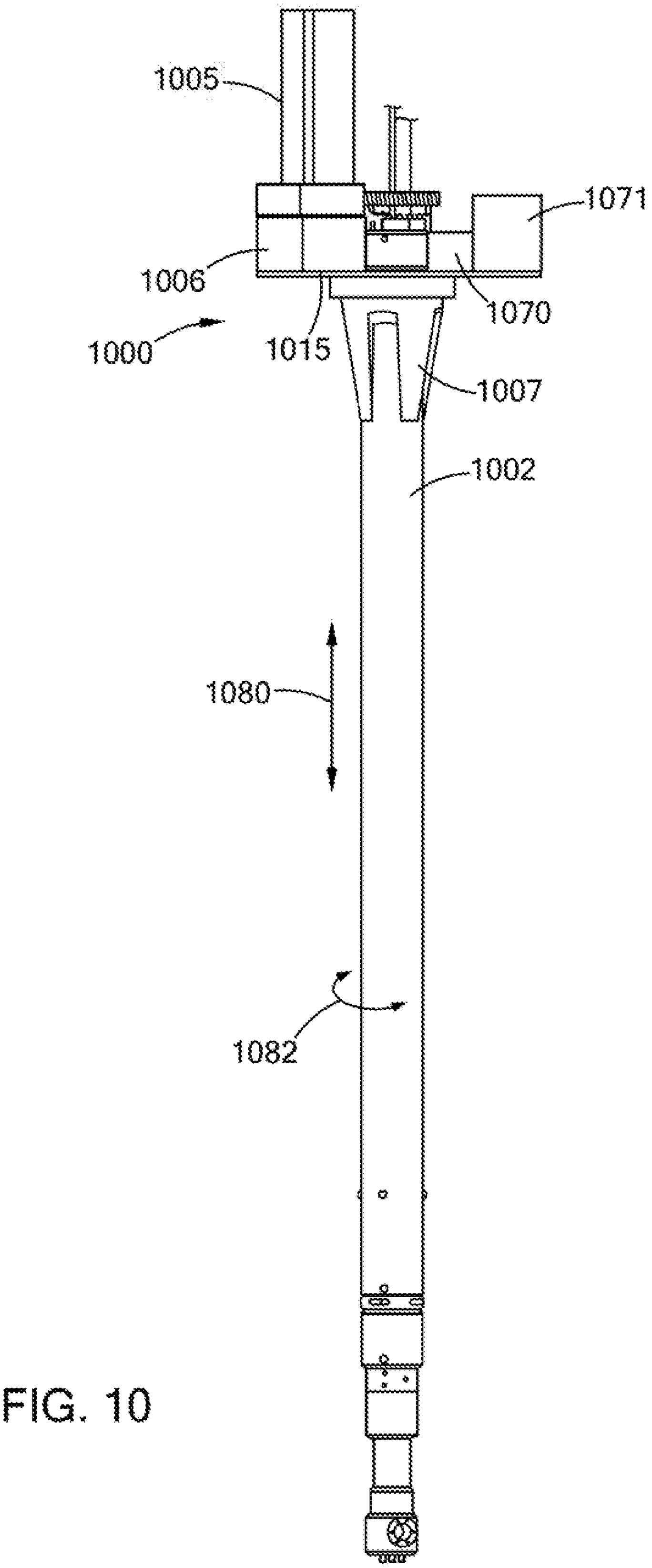
FIG. 10 is a perspective view of an embodiment of a laser tool in accordance with the present inventions.

Turning to FIG. 10 there is shown a perspective view of a laser tool 1000. The tool 1000 has a wedge assembly 1007 for centering and fixing the tool 1000 in a tubular. The tool has a first motor 1005 and drive assembly 1006 for rotating the spar 1002 as shown by arrow 1082. The tool 1000 has a second motor assembly 1071 and drive assembly 1070 for raising and lowering the spar 1002 in the axial direction as shown by arrow 1080. A base plate 1015 supports both motor assembles and the wedge assembly, while permitting the spar to move. In this manner the spar can be moved axially, e.g., raised and lowered, within the tubular to make an axial, or longitudinal cut, in the tubular. Further, a spiral cut could be made if the tool was rotated and moved axial simultaneously during laser cutting.

The wedge assembly may also have the ability to be adjusted vertically. In this manner the vertical position of the tool, and the depth at which the laser cut will be made can be adjusted. The vertical adjustment can be made by, for example: threaded members moving the position of the wedge relative to upper section of the tool; hydraulic systems that move the position of the wedges relative to the upper section of the tool; cleats that engage and hold the wedges at different positions; can be made by changing the size or slope of the wedge faces which will determine how deep into a tubular the wedges can go; and other devices and assemblies to adjust the location and position of a wedge, engaging or locking member with respect to the tool, and in particular the upper section of the tool.

Laser welding techniques may be useful in many varied situations, and in particular where welding is needed in hazardous and difficult to reach locations, such as in a ships hull, a nuclear reactor, in a borehole, or in a pipe line. Laser welding operations may be used in conjunction with decommissioning, exploration or production activities, to name a few. Generally, laser welding may also include laser hybrid welding where electrical current is used in conjunction with a laser beam to provide more rapid feed of filler material on welding deep materials such as ship hulls and caissons. Laser welding can be autogenous which means only the base material is used and is common in keyhole welding, lap welding, filet welding and butt welding. Laser welding can be non-autogenous where a filler material is added to the melt puddle to "fill" the gap or to create a raised bead for strength in the weld. Laser Hybrid welding is by definition non-autogenous.

Laser welding of thick cross sections typically can be done by keyhole welding techniques if the part fit up is good, or it can be "V" cut and then filled with filler material using either a laser process or a hybrid process. Either process can be applied in a straight line or using a weave to maximize filling of the grow and maximizing strength of the weld.

Preferably, in some embodiments active weld monitors can be used to check the quality of the weld on the fly.

Typically seam trackers are beneficial, and at times often needed, when performing lap or butt welds. Keyhole welds that are also butt welds typically require a seam tracker, however Keyhole welds that penetrate both parts in a lap geometry generally do not need to track a seam.

Laser cladding is a process where a material is injected into a laser beam by either a coaxial gas/powder jet, a lateral gas/powder jet, a strip feeder, a wire feeder or preplaced powder. The laser preheats the surface while simultaneously melting the feed material, the material is then melted into the surface by the laser beam during the process. Generally, laser cladding processes provide superior processes for minimizing dilution of the base material while producing a strong metallurgical bond between the clad material and the substrate.

Typically laser welding uses a very low flow of gas to keep the optics clean, an air knife to keep the optics clean or an inert environment to keep the optics clean. Laser welding can be performed in air or an inert environment.

Typically, laser welding underwater requires a water free cavity to be placed over the region to be welded or cladded which is then backfilled with inert gas to keep the water out of the region. Or a packer can be used to isolate the area for the case where flow can be stopped or does not exist.

Generally, down hole and field welds and repairs can preferably take place under controlled environments, e.g., under argon. Further temperature of the welding location may also be desirable to be controlled. Nitrogen and other gasses may also be used but in general are not preferred. A packer or other type of isolation device in the tubular or area where the welding is to take place may be utilized.

Preferably, when the laser tool is configured for performing a laser operation on a target material the laser beam path from the front of the tool to the surface of target material should be isolated. This may be accomplished by the use of a barrier, housing hood, and the borehole walls, to prevent the laser light from escaping or from reaching the location where personnel may be present. For example the laser beam path may be isolated by using a light weight metal tube, having an internal diameter that is large enough to not interfere with the laser beam, that is optically sealed to the laser tool, i.e., no laser light can escape, and that extends from the laser tool to the work surface, where it is optically sealed to the work surface. It may be isolated by using a temporary, semi-permanent or permanent shielding structure, e.g., stands holding welding blankets or other light blocking materials, a scaffold supporting light blocking materials, a telescoping or extendable housing that is placed over the beam path or more preferably the tool and the beam path. It may also be isolated by constructing a temporary, semi-permanent or permanent barrier to optically isolate the beam path, and more preferably to isolate the tool, the work surface and the target material from personnel, e.g., a temporary barrier in or over the borehole, or optically sealing against the tubular walls. Laser curtains, such as those available from BEAMSTOP'R®, may be used to isolate the laser beam and laser beam path.

Preferably, the laser tools, systems and equipment will meet the requirements of 21 C.F.R. § 1040.10 (Revised as of Apr. 1, 2012), the entire disclosure of which is incorporated herein by reference, to be considered Class III, more preferably Class II, and still more preferably Class I.

As used in this specification a "Class I product" is equipment that will not permit access during the operation of the laser to levels of laser energy in excess of the emission limits set forth in Table I. Thus, preferably personnel operating, and in the area of operation, of the equipment will receive no more than, and preferably less than, the following exposures in Table I during operation of the laser equipment.

TABLE I

CLASS I ACCESSIBLE EMISSION LIMITS FOR LASER RADIATION

| Wavelength | Emission duration | Class I-Accessible emission limits | | |
|---|---|---|---|---|
| (nanometers) | (seconds) | (value) | (unit) | (quantity)** |
| ≥180 | ≤3.0 × $10^4$ | 2.4 × $10^{-5}k_1k_2$* | Joules(J)* | radiant energy |
| but | >3.0 × $10^4$ | 8.0 × $10^{-10}k_1k_2$* | Watts(W)* | radiant power |
| ≤400 | | | | |

TABLE I-continued

| CLASS I ACCESSIBLE EMISSION LIMITS FOR LASER RADIATION | | | | |
|---|---|---|---|---|
| Wavelength | Emission duration | Class I-Accessible emission limits | | |
| (nanometers) | (seconds) | (value) | (unit) | (quantity)** |
| >400 | $>1.0 \times 10^{-9}$ to $2.0 \times 10^{-5}$ | $2.0 \times 10^{-7} k_1 k_2$ | J | radiant energy |
| but | $>2.0 \times 10^{-5}$ to $1.0 \times 10^{1}$ | $7.0 \times 10^{-4} k_1 k_2 t^{3/4}$ | J | radiant energy |
| ≤1400 | $>1.0 \times 10^{1}$ to $1.0 \times 10^{4}$ | $3.9 \times 10^{-3} k_1 k_2$ | J | radiant energy |
| | $>1.0 \times 10^{4}$ | $3.9 \times 10^{-7} k_1 k_2$ | W | radiant power |
| | and also (See paragraph (d)(4) of this section) | | | |
| | $>1.0 \times 10^{-9}$ to $1.0 \times 10^{1}$ | $10 k_1 k_2 t^{1/3}$ | $Jcm^{-2}sr^{-1}$ | integrated radiance |
| | $>1.0 \times 10^{1}$ to $1.0 \times 10^{4}$ | $20 k_1 k_2$ | $Jcm^{-2}sr^{-1}$ | integrated radiance |
| | $>1.0 \times 10^{4}$ | $2.0 \times 10^{-3} k_1 k_2$ | $Wcm^{-2}sr^{-1}$ | radiance |
| >1400 | $>1.0 \times 10^{-9}$ to $1.0 \times 10^{-7}$ | $7.9 \times 10^{-5} k_1 k_2$ | J | radiant energy |
| but | $>1.0 \times 10^{-7}$ to $1.0 \times 10^{1}$ | $4.4 \times 10^{-3} k_1 k_2 t^{1/4}$ | J | radiant energy |
| ≤2500 | $>1.0 \times 10^{1}$ | $7.9 \times 10^{-4} k_1 k_2$ | W | radiant power |
| >2500 | $>1.0 \times 10^{-9}$ to $1.0 \times 10^{-7}$ | $1.0 \times 10^{-2} k_1 k_2$ | $Jcm^{-2}$ | radiant exposure |
| but | $>1.0 \times 10^{-7}$ to $1.0 \times 10^{1}$ | $5.6 \times 10^{-1} k_1 k_2 t^{1/4}$ | $Jcm^{-2}$ | radiant exposure |
| $\leq 1.0 \times 10^{6}$ | $>1.0 \times 10^{1}$ | $1.0 \times 10^{-1} k_1 k_2 t$ | $Jcm^{-2}$ | radiant exposure |

*Class I accessible emission limits for wavelengths equal to or greater than 180 nm but less than or equal to 400 nm shall not exceed the Class I accessible emission limits for the wavelengths greater than 1400 nm but less than or equal to $1.0 \times 10^{6}$ nm with a $k_1$ and $k_2$ of 1.0 for comparable sampling intervals.
**Measurement parameters and test conditions shall be in accordance with paragraphs (d)(1), (2), (3), and (4), and (e) of this section.

As used in this specification a "Class IIa product" is equipment that will not permit access during the operation of the laser to levels of visible laser energy in excess of the emission limits set forth in Table II-A; but permit levels in excess of those provided in Table I.

TABLE II-A

| CLASS IIa ACCESSIBLE EMISSION LIMITS FOR LASER RADIATION CLASS IIa ACCESSIBLE EMISSION LIMITS ARE IDENTICAL TO CLASS I ACCESSIBLE EMISSION LIMITS EXCEPT WITHIN THE FOLLOWING RANGE OF WAVELENGTHS AND EMISSION DURATIONS: | | | | |
|---|---|---|---|---|
| Wavelength | Emission duration | Class IIa-Accessible emission limits | | |
| (nanometers) | (seconds) | (value) | (unit) | (quantity)* |
| >400 but ≤710 | $>1.0 \times 10^{3}$ | $3.9 \times 10^{-6}$ | W | radiant power |

*Measurement parameters and test conditions shall be in accordance with paragraphs (d)(1), (2), (3), and (4), and (e) of this section.

As used in this specification a "Class II product" is equipment that will not permit access during the operation of the laser to levels of laser energy in excess of the emission limits set forth in Table II; but permit levels in excess of those provided in Table II-A.

TABLE II

| CLASS II ACCESSIBLE EMISSION LIMITS FOR LASER RADIATION CLASS II ACCESSIBLE EMISSION LIMITS ARE IDENTICAL TO CLASS I ACCESSIBLE EMISSION LIMITS EXCEPT WITHIN THE FOLLOWING RANGE OF WAVELENGTHS AND EMISSION DURATIONS: | | | | |
|---|---|---|---|---|
| Wavelength | Emission duration | Class II-Accessible emission limits | | |
| (nanometers) | (seconds) | (value) | (unit) | (quantity)* |
| >400 but ≤710 | $>2.5 \times 10^{-1}$ | $1.0 \times 10^{-3}$ | W | radiant power |

*Measurement parameters and test conditions shall be in accordance with paragraphs (d)(1), (2), (3), and (4), and (e) of this section.

As used in this specification a "Class IIIa product" is equipment that will not permit access during the operation of the laser to levels of laser energy in excess of the emission limits set forth in Table III-A; but permit levels in excess of those provided in Table II.

TABLE III-A

| CLASS IIIa ACCESSIBLE EMISSION LIMITS FOR LASER RADIATION CLASS IIIa ACCESSIBLE EMISSION LIMITS ARE IDENTICAL TO CLASS I ACCESSIBLE EMISSION LIMITS EXCEPT WITHIN THE FOLLOWING RANGE OF WAVELENGTHS AND EMISSION DURATIONS: | | | | |
|---|---|---|---|---|
| Wavelength | Emission duration | Class IIIa-Accessible emission limits | | |
| (nanometers) | (seconds) | (value) | (unit) | (quantity)* |
| >400 but ≤710 | $>3.8 \times 10^{-4}$ | $5.0 \times 10^{-3}$ | W | radiant power |

*Measurement parameters and test conditions shall be in accordance with paragraphs (d)(1), (2), (3), and (4), and (e) of this section.

As used in this specification a "Class IIIb product" is equipment that will not permit access during the operation of the laser to levels of laser energy in excess of the emission limits set forth in Table III-B; but permit levels in excess of those provided in Table III-A.

TABLE III-B

| CLASS IIIb ACCESSIBLE EMISSION LIMITS FOR LASER RADIATION | | | | |
|---|---|---|---|---|
| Wavelength | Emission duration | Class IIIb-Accessible emission limits | | |
| (nanometers) | (seconds) | (value) | (unit) | (quantity)* |
| ≥180 | $\leq 2.5 \times 10^{-1}$ | $3.8 \times 10^{-4} k_1 k_2$ | J | radiant energy |
| but | $>2.5 \times 10^{-1}$ | $1.5 \times 10^{-3} k_1 k_2$ | W | radiant power |
| ≤400 | | | | |
| >400 | $>1.0 \times 10^{-9}$ to | $10 k_1 k_2 t^{1/3}$ | $Jcm^{-2}$ | radiant exposure |
| but | $2.5 \times 10^{-1}$ | to a maximum | $Jcm^{-2}$ | radiant exposure |
| ≤1400 | $>2.5 \times 10^{-1}$ | value of 10 | W | radiant power |
| | | $5.0 \times 10^{-1}$ | | |

TABLE III-B-continued

| CLASS IIIb ACCESSIBLE EMISSION LIMITS FOR LASER RADIATION | | | | |
|---|---|---|---|---|
| Wavelength | Emission duration | Class IIIb-Accessible emission limits | | |
| (nanometers) | (seconds) | (value) | (unit) | (quantity)* |
| >1400 but $\leq 1.0 \times 10^6$ | $>1.0 \times 10^{-9}$ to $1.0 \times 10^1$ | 10 | $Jcm^{-2}$ | radiant exposure |
| | $>1.0 \times 10^1$ | $5.0 \times 10^{-1}$ | W | radiant power |

*Measurement parameter and test conditions shall be in accordance with paragraphs (d)(1), (2), (3), and (4), and (e) of this section.

The values for the wavelength dependent correction factors "k1" and "k2" for Tables I, IIA, II, IIIA, IIIB are provided in Table IV.

TABLE IV

| VALUES OF WAVELENGTH DEPENDENT CORRECTION FACTORS $k_1$ AND $k_2$ | | | | |
|---|---|---|---|---|
| Wavelength (nanometers) | $k_1$ | $k_2$ | | |
| 180 to 302.4 | 1.0 | 1.0 | | |
| >302.4 to 315 | $10^{[\frac{\lambda-302.4}{5}]]}$ | 1.0 | | |
| >315 to 400 | 330.0 | 1.0 | | |
| >400 to 700 | 1.0 | 1.0 | | |
| >700 to 800 | $10^{[\frac{\lambda-700}{515}]}$ | if: $t \leq \frac{10100}{\lambda - 699}$ then: $k_2 = 1.0$ | if: $\frac{10100}{\lambda - 699} < t \leq 10^4$ then: $k_2 = \frac{t(\lambda - 699)}{10100}$ | if: $t > 10^4$ then: $k_2 = \frac{\lambda - 699}{1.01}$ |
| >800 to 1060 | $10^{[\frac{\lambda-700}{515}]}$ | if: $t \leq 100$ then: $k_2 = 1.0$ | if: $100 < t \leq 10^4$ then: $k_2 = \frac{t}{100}$ | if: $t > 10^4$ then: $k_2 = 100$ |
| >1060 to 1400 | 5.0 | | | |
| >1400 to 1535 | 1.0 | 1.0 | | |
| >1535 to 1545 | $t \leq 10^{-7}$ $k_1 = 100.0$ $t > 10^{-7}$ $k_1 = 1.0$ | 1.0 | | |
| >1545 to $1.0 \times 10^6$ | 1.0 | 1.0 | | |

Note:
The variables in the expressions are the magnitudes of the sampling interval (t), in units of seconds, and the wavelength (λ), in units of nanometers.

The measurement parameters and test conditions for Tables I, IIA, II, IIIA, and IIIB, which are referred to by paragraph numbers of "this section," are as follows, and are provided with their respective paragraph numbers "b" and "e" as they appear in 21 C.F.R. § 1040.10 (Revised as of Apr. 1, 2012):

(b)(1) Beam of a single wavelength. Laser or collateral radiation of a single wavelength exceeds the accessible emission limits of a class if its accessible emission level is greater than the accessible emission limit of that class within any of the ranges of emission duration specified in tables I, II-A, II, III-A, and III-B.

(b)(2) Beam of multiple wavelengths in same range. Laser or collateral radiation having two or more wavelengths within any one of the wavelength ranges specified in tables I, II-A, II, III-A, and III-B exceeds the accessible emission limits of a class if the sum of the ratios of the accessible emission level to the corresponding accessible emission limit at each such wavelength is greater than unity for that combination of emission duration and wavelength distribution which results in the maximum sum.

(b)(3) Beam with multiple wavelengths in different ranges." Laser or collateral radiation having wavelengths within two or more of the wavelength ranges specified in tables I, II-A, II, III-A, and III-B exceeds the accessible emission limits of a class if it exceeds the applicable limits within any one of those wavelength ranges.

(b)(4) Class I dual limits. Laser or collateral radiation in the wavelength range of greater than 400 nm but less than or equal to 1,400 nm exceeds the accessible emission limits of Class I if it exceeds both: (i) The Class I accessible emission limits for radiant energy within any range of emission duration specified in table I, and (ii) The Class I accessible emission limits for integrated radiance within any range of emission duration specified in table I.

(e)(1) Tests for certification. Tests shall account for all errors and statistical uncertainties in the measurement process. Because compliance with the standard is required for the useful life of a product such tests shall also account for increases in emission and degradation in radiation safety with age.

(e)(2) Test conditions. Tests for compliance with each of the applicable requirements of paragraph (e) shall be made during operation, maintenance, or service as appropriate: (i) Under those conditions and procedures which maximize the accessible emission levels, including start-up, stabilized emission, and shut-down of the laser product; and (ii) With all controls and adjustments listed in the operation, maintenance, and service instructions adjusted in combination to result in the maximum accessible emission level of radiation; and (iii) At points in space to which human access is possible in the product configuration which is necessary to determine compliance with each requirement, e.g., if operation may require removal of portions of the protective housing and defeat of safety interlocks, measurements shall be made at points accessible in that product configuration; and (iv) With the measuring instrument detector so positioned and so oriented with respect to the laser product as to result in the maximum detection of radiation by the instrument; and (v) For a laser product other than a laser system, with the laser coupled to that type of laser energy source which is specified as compatible by the laser product manufacturer and which produces the maximum emission level of accessible radiation from that product.

(e)(3) Measurement parameters. Accessible emission levels of laser and collateral radiation shall be based upon the following measurements as appropriate, or their equivalent: (i) For laser products intended to be used in a locale where the emitted laser radiation is unlikely to be viewed with optical instruments, the radiant power (W) or radiant energy (J) detectable through a circular aperture stop having a diameter of 7 millimeters and within a circular solid angle of acceptance of $10^{-3}$ steradian with collimating optics of 5 diopters or less. For scanned laser radiation, the direction of the solid angle of acceptance shall change as needed to maximize detectable radiation, with an angular speed of up to 5 radians/second. A 50 millimeter diameter aperture stop with the same collimating optics and acceptance angle stated above shall be used for all other laser products. (ii) The irradiance ($W/cm^2$) or radiant exposure ($J/cm^2$) equivalent to the radiant power (W) or radiant energy (J) detectable through a circular aperture stop having a diameter of 7 millimeters and, for irradiance, within a circular solid angle of acceptance of $10^{-3}$ steradian with collimating optics of 5 diopters or less, divided by the area of the aperture stop ($cm^2$). (iii) The radiance ($W/cm^2$ steradian) or integrated radiance ($J/cm^2$ steradian) equivalent to the radiant power (W) or radiant energy (J) detectable through a circular aperture stop having a diameter of 7 millimeters and within a circular solid angle of acceptance of $10^{-5}$ steradian with collimating optics of 5 diopters or less, divided by that solid angle (sr) and by the area of the aperture stop ($cm^2$).

In general, for embodiments of surface and near surface laser decommissioning tools and systems they may have, and it is preferable that embodiments include, for example, protective housings or shields, safety interlocks, remote interlock connectors, key controls, emission indicators, beam attenuators, remote controls, remote camera and display systems for viewing the laser and laser-mechanical operations and work zones, scanning safeguards, warning signs, stickers and designations and combinations and variations of these. Examples of some embodiments of control and monitoring systems for high power laser systems and operations are disclosed and taught in Published U.S. Patent Application Publication Numbers: 2012/0248078 and 2012/0273269, the entire disclosures of each of which are incorporated by reference herein.

The protective housing or shielding may be of an expandable or deployable nature, or it may be fixed. If deployable, it may be expanded or positioned, against the earth, tubular walls, or well structure or other structure such that it substantially optically seals the area of laser operation. In this manner the shield prevents excess laser light form escaping the shield, and optically contained area, where the laser operation is being performed. These shields may be made out of composite materials, metal and carbon fiber bases materials to name a few. It is preferred that the materials that are used have a high absorption for the wavelength(s) of laser energy that are being used, have sufficient durability and heat resistance that they are not quickly (instantly) destroyed if the laser beam should strike them, and they should be durable enough and conformable enough to form optical seals against the surrounding material. In the expandable type of shield, for example, they could be made from an expandable skirt, such as the skirts that are used in hovercraft. They may also be made from material and technology used in oil field packers, and packer systems; if they are inflated with a fluid, expanded, or if internal void spaces are present, they may be preferably be filled with fluid, or other material that is absorbent, and more preferably highly absorbent to the laser wavelengths being used. They may be made out of steel, metal, carbon-based material and may be multi-layer and multi-material based.

In an embodiment the cutting unit may include all of the necessary equipment to safely and efficiently perform the well casing cut at about 3 ft or more below ground level, at about 5 ft or more below ground level, and at about 10 ft or more below ground level, and preferably without the need for excavation. Embodiments of these cutting units can include, for example, a generator to power all necessary equipment, for example a 100 kW generator, a 150 kw generator a 200 kW generator or more, which provides the necessary power to preferably power all required equipment, a laser generation unit, a nitrogen storage and vaporization system, operator control cabin, a smoke and particulates emission control unit, and a suite of laser cutting tools with their deployment mechanism. Embodiments of these cutting units is designed to operate in a very tight well spacing environment, with the ability to cut a well located either directly behind the unit or on either side of the rear of the unit. These tight cutting units can preferably be equipped with sufficient consumables (including diesel and nitrogen) to be self contained and cut 5 wells or more without the need to result consumables, cut 7 wells or more without the need to result consumables, and cut 10 wells or more without the need to result consumables. More preferably, these cuts can be made in a single day.

In an embodiment of the present inventions, there is an auxiliary unit, that can be used for site preparation, casing stub removal, topping off with cement, welding the identification plate on the cut casing stub, and backfilling the casing hole with dirt. The auxiliary unit can work independently of, in parallel with, and serially with embodiments of the laser cutting units. Activities associated with laser remover of structures can included, for example, conducting underground surveys for electrical lines and pipelines, a site survey which can among other things provide information data for the pre-job design including cutting parameters and the post-cut materials required. These activities can be conducted in conjunction with the auxiliary unit, with the laser unit, with combinations of these, and independently of these.

There is provided a high power laser tool having: a first assembly, and a second assembly; a spar having a length, the spar mechanically and rotationally associating the second assembly and the first assembly; the second assembly having a housing, the housing having an optics assembly and a laser beam exit port; the optics assembly having a lens and a beam path angle changing optical member, whereby the optics assembly provides for a laser beam path through the lens, making about a right angle bend at the beam path angle changing optical member, and exiting the housing through the laser beam exit port; and, a laser beam isolation means, wherein the tool as deployed has equal to or lower than a Class I accessible emission limit.

Moreover, there is provided the tools, systems and methods that may include one or more of the following features: wherein the accessible emission limit is equal to or less than about $2.0\times10^{-3}k_1k_2$ $Wcm^{-2}$ $sr^{-1}$ radiance; wherein the laser beam isolation means has a conical shield optically sealing the first assembly against the tubular when deployed; wherein the laser beam isolation means has a conical shield optically sealing the first assembly against the tubular when deployed; wherein the laser beam isolation means has a hood; wherein the laser beam isolation means has a hood; wherein the laser beam isolation means has a hood and a laser energy suppression device; wherein the laser beam isolation means has a hood and a laser energy suppression device; wherein the laser beam isolation means has a hood and a laser monitor; wherein the tool as deployed during normal operation has an accessible emission limit of $2.0\times10^{-3}k_1k_2$ $Wcm^{-2}$ $sr^{-1}$ radiance or less and wherein the engagement device has a wedge; wherein the tool as deployed during normal operation has an accessible emission limit of $2.0\times10^{-3}k_1k_2$ $Wcm^{-2}$ $sr^{-1}$ radiance or less and wherein the first assembly has an optical slip ring; wherein the tool as deployed during normal operation has an accessible emission limit of $2.0\times10^{-3}k_1k_2$ $Wcm^{-2}$ $sr^{-1}$ radiance or less and wherein the high power optical fiber extends through the first assembly and is located within the spar; wherein the tool as deployed during normal operation has an accessible emission limit of $2.0\times10^{-3}k_1k_2$ $Wcm^{-2}$ $sr^{-1}$ radiance or less and wherein the first assembly has an optical slip ring and wherein the high power optical fiber is in optical communication with the optical slip ring and wherein the high power optical fiber is located within the spar; and wherein the tool as deployed during normal operation has an accessible emission limit of $2.0\times10^{-3}k_1k_2$ $Wcm^{-2}$ $sr^{-1}$ radiance or less and wherein the engagement device has a centering device and wherein the spar is at least about 10 feet long.

Still further, there is provided the tools, systems and methods that may include one or more of the following features: wherein the means for rotating the spar has a device selected from the group consisting of an electric motor, a DC electric motor, a pneumatic motor, a step motor, a gear box, a torsional device and a transmission; wherein the means for rotating the spar has a device selected from the group consisting of an electric motor, a hand crank, a gearbox, a transmission and a belt drive, and wherein the engagement device has a centering device; wherein the means for rotating the spar has a device selected from the group consisting of an electric motor, a hand crank, a gearbox, a transmission and a belt drive, and wherein the first assembly has an optical slip ring and wherein the high power optical fiber is in optical communication with the optical slip ring and wherein the high power optical fiber is located within the spar; and wherein the means for rotating the spar has a device selected from the group consisting of an electric motor, a DC electric motor, a pneumatic motor, a step motor, a gear box, a torsional device and a transmission, and wherein the spar is at least about 5 feet long.

Furthermore, there is provided a high power laser tool for deployment in a tubular to be cut, the tool having: a first assembly, and a second assembly; a spar having a length and mechanically and rotationally associating the second assembly and the first assembly, thereby defining a distance between the second assembly and the first assembly; and, whereby the second assembly is rotatable with respect to the first assembly; the second assembly having a housing, the housing having an optics assembly in optical communication with a high power optical fiber and a laser beam exit port, wherein the optics assembly defines a laser beam path exiting the housing through the laser beam exit port; and, the first assembly having a means for rotating the spar and an engagement device, wherein upon deployment of the tool the first assembly is capable engaging the tubular and rotating the spar and the second assembly to cut the tubular with a laser beam at a predetermined depth.

Yet further, there is provided the tools, systems and methods that may include one or more of the following features: wherein the engagement device has a wedge; wherein the engagement device has a centering device; wherein the first assembly has an optical slip ring; wherein the high power optical fiber extends through the first assembly and is located within the spar; wherein the first assembly has an optical slip ring and wherein the high power optical fiber is in optical communication with the optical slip ring; wherein the first assembly has an optical slip ring and wherein the high power optical fiber is in optical communication with the optical slip ring and wherein the high power optical fiber is located within the spar; wherein the spar is at least about 5 feet long; wherein the spar is at least about 15 feet long; wherein the spar is at least about 20 feet long; where in the spar is at least about 40 feet long; wherein the spar is at least about 50 feet long; wherein the engagement device has a centering device and wherein the spar is at least about 10 feet long; wherein the first assembly has an optical slip ring and wherein the spar is at least about 10 feet long; wherein the high power optical fiber extends through the first assembly and is located within the spar and wherein the spar is at least about 10 feet long; wherein the first assembly has an optical slip ring and wherein the high power optical fiber is in optical communication with the optical slip ring and wherein the spar is at least about 10 feet long; wherein the length of the spar is adjustable, whereby the distance between the first assembly and the second assembly can be changed; and wherein the tool as deployed during normal operation has an accessible emission limit of $2.0\times10^{-3}k_1k_2$ $Wcm^{-2}$ $sr^{-1}$ radiance or less; wherein the tool as deployed during normal operation has an accessible emission limit of $2.0\times10^{-3}k_1k_2$ $Wcm^{-2}$ $sr^{-1}$ radiance or less and wherein the engagement device has a wedge; and wherein the means for rotating the spar has a device selected from the group consisting of an electric motor, a DC electric motor, a pneumatic motor, a step motor, a gear box, a torsional device and a transmission, and wherein the first assembly has an optical slip ring.

Additionally, there is provided a high power laser tool having: a first assembly, and a second assembly; a spar having a length, the spar mechanically and rotationally associating the second assembly and the first assembly; the second assembly having a housing, the housing having an optics assembly and a laser beam exit port; the optics assembly having a lens and a beam path angle changing optical member, whereby the optics assembly provides for a laser beam path through the lens, making a bend at the beam path angle changing optical member, and exiting the housing through the laser beam exit port; and, the high power optical fiber located within the spar.

In addition, there is provided the tools, systems and methods that may include one or more of the following features: having a laser beam isolation means, wherein the tool has equal to or lower than a Class I accessible emission limit; wherein the accessible emission limit is equal to or less than about $2.0\times10^{-3}k_1k_2$ $Wcm^{-2}$ $sr^{-1}$ radiance; wherein the tool as deployed has equal to or lower than a Class I accessible emission limit; and wherein the first assembly has an optical slip ring; wherein the accessible emission limit is equal to or less than about $2.0\times10^{-3}k_1k_2$ $Wcm^{-2}$ $sr^{-1}$ radiance; and having a means for rotating the spar attached to the first assembly and a laser beam isolation means, wherein the tool as deployed has equal to or lower than a Class I accessible emission limit and wherein the first assembly has an optical slip ring.

Still moreover there is provided a high power laser tool having: a first assembly, and a second assembly; a spar having a length, the spar mechanically and rotationally associating the second assembly and the first assembly; the second assembly having a housing, the housing having an optics assembly and a laser beam exit port; the optics assembly having a lens and a beam path angle changing optical member, whereby the optics assembly provides for a laser beam path through the lens, making a bend at the beam path angle changing optical member, and exiting the housing through the laser beam exit port; and, a laser beam isolation means, wherein the tool has equal to or lower than a Class I accessible emission limit.

In addition, there is provided the tools, systems and methods that may include one or more of the following features: wherein the accessible emission limit is equal to or less than about $2.0\times10^{-3}k_1k_2$ $Wcm^{-2}$ $sr^{-1}$ radiance; wherein the laser beam isolation means has a conical shield optically sealing the first assembly against the tubular when deployed; wherein the laser beam isolation means has a hood; wherein the laser beam isolation means has a hood and a laser energy suppression device; wherein the laser beam isolation means has a hood and a laser monitor; wherein the laser beam isolation means has a hood and a sensor; wherein the laser beam isolation means has a hood and an interlock.

Furthermore, there is provided a high power laser system having a high power laser tool for deployment in a structure to be cut, the system having: a high power laser field unit having a high power laser and a laser umbilical, the laser umbilical having a high power laser optical fiber, the high power laser optical fiber having a distal end, a proximal end, and defining a length there between, the proximal end of the optical fiber in optical communication with the high power laser; the distal end of the optical fiber in optical communication with a high power laser tool; the high power laser tool having: an upper section, and a lower section; a spar having a length, the spar mechanically and rotationally associating the upper section and the lower section, whereby the lower section is rotatable with respect to the upper section; the lower section in optical association with the optical fiber, the lower section having a housing, the housing having a laser beam exit port and a laser beam path, wherein the laser beam path exits the housing through the laser beam exit port; and, a means to provide optical shielding, wherein the tool has equal to or lower than a Class I accessible emission limit.

Still further there is provided a Class I high power laser tool for surface and near surface deployment in a tubular to be cut, the tool having: a first assembly, and a second assembly; a spar having a length, the spar mechanically associating the second assembly and the first assembly, whereby the second assembly is located about the length of the spar from the first assembly; the second assembly having a housing, the housing having an optics assembly in optical communication with a high power optical fiber and a laser beam exit port, wherein the optics assembly defines a laser beam path exiting the housing through the laser beam exit port; and, the first assembly having a means for shielding the laser beam path, whereby the tool has equal to or lower than a Class I accessible emission limit.

Yet moreover, there is provided a high power laser decommissioning tool for performing a laser decommissioning operation on a structure, the tool having: an upper section, having a base plate; a middle section, having a spar having a length of at least about 5 feet; and a lower section, having a laser cutter; whereby the middle section connects the upper and lower sections; a rotational assembly, having a motor and a transfer assembly; the rotational assembly mounted on the base plate and rotationally associated with the spar, whereby the rotational assembly is capable of rotating the spar; and, an engagement and locking device, whereby when the tool is deployed the tool is held in place during laser operations.

In addition, there is provided the tools, systems and methods that may include one or more of the following features: wherein the engagement and locking device has a wedge; wherein the engagement and locking device has a plurality of wedges; wherein the engagement and locking device is attached to the base plate; wherein the beam path angle changing optical member, has a mirror; and wherein the beam path angle changing optical member, has a TIR prism; wherein the beam of the beam path is about 90 degrees.

Moreover there is provided a method of removing a structure located in the earth including: positioning a laser decommission systems in the area of a structure to removed from the ground, the laser decommissioning system having a high power laser and a laser decommissioning tool; the structure at least partially located in the earth, having an exterior surface, and extending down under a surface of the earth for at least 50 feet; the structure having an opening at or near the surface of the earth; placing the laser decommissioning tool in optical association with the structure, whereby a laser beam path from the laser beam tool is located at a depth below the surface of the earth; delivering the laser beam along the laser beam path to the structure in a laser beam pattern, wherein the accessible emission limit is equal to or lower than a Class I, and whereby the structure is cut; and, removing the structure above the cut from the earth.

In addition, there is provided the tools, systems and methods that may include one or more of the following features: wherein the laser beam is at least about 5 kW; wherein the laser beam is at least about 15 kW; wherein the structure is a tubular and the area is a hydrocarbon well site to be decommissioned; wherein the structure is a conductor and the area is a hydrocarbon well site to be decommissioned; wherein the structure is a multistring conductor and the area is a hydrocarbon well site to be decommissioned; wherein the decommissioning tool is at least partially within the structure and the laser cut is an inside to outside cut; wherein the earth remains adjacent to the outer surface of the structure while the structure is in the earth; wherein the earth is removed from the exterior of the structure to at or below the depth, thereby creating a space, defining a distance, between the earth and the exterior of the structure; wherein the distance is less than about 10 feet; wherein the distance is less than about 5 feet; and wherein the distance is less than about 1 foot.

Still further there is provided a method of performing down hole high power laser welding operations on a target structure within a borehole in the earth, including: optically associating a high power laser tool with a source of a high power laser beam, whereby the laser tool can deliver a high power laser beam along a beam path; operationally associating the laser tool with a target structure in a borehole in the earth; whereby the laser beam path is through a free space partially defined by a distance between the laser beam tool to the target structure; providing a controlled and predetermined atmosphere in the free space; and, propagating the laser beam through the controlled and predetermined atmosphere and performing a laser welding operation on the target structure.

Still additionally, there is provided the tools, systems and methods that may include one or more of the following features: wherein the target structure is a patch covering a damaged section of a tubular; wherein the target structure is a casing junction in a multi-junction well configuration; and wherein the laser welding operation is selected from the group consisting autogenous welding, laser-hybrid welding, keyhole welding, lap welding, filet welding, butt welding and non-autogenous welding.

EXAMPLES

The following examples are provided to illustrate various devices, tools, configurations and activities that may be performed using the high power laser tools, devices and system of the present inventions. These examples are for illustrative purposes, and should not be view as, and do not otherwise limit the scope of the present inventions.

Example 1

Figure 4A:
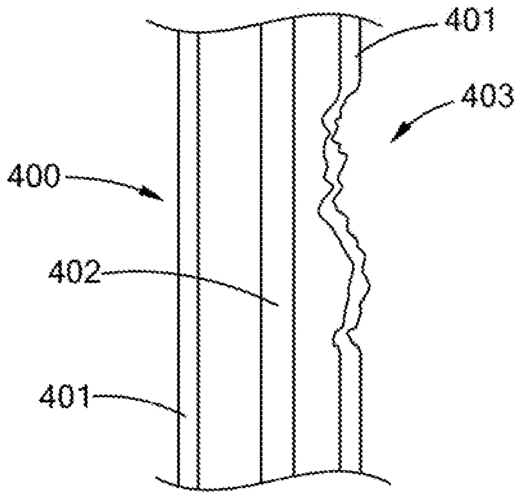
FIG. 4A is a cross sectional view of a damaged down hole section of a well.
Figure 4B:
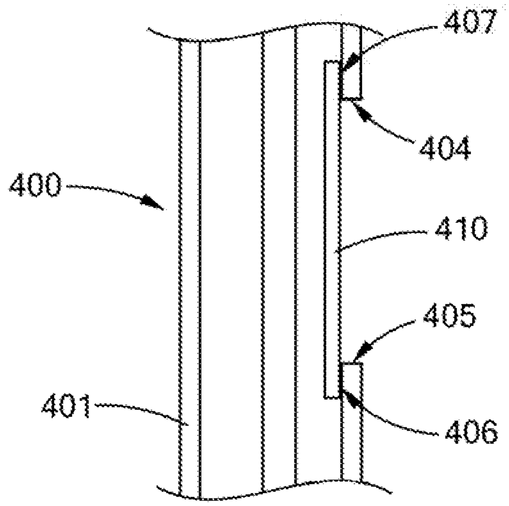
FIG. 4B is a cross sectional view of the damaged section of FIG. 4A showing an embodiment of a laser weld and repair in accordance with the present inventions.

In a situation where there is a damage pipe in a well, the damaged section of the pipe may be removed, by laser milling, mechanical milling, water jet or a combination of both. A plate may then be laser welded in place. Preferably, this may be accomplished without the removal of the production tubing. FIGS. 4A and 4B shows a graphic representation of this process. Thus, a borehole 400 has a casing 401 and a production tubing 402. The casing 401 has a damaged area 403. The laser tool is positioned in the space between the production tubing 402 and the casing 403 and removes the damaged area, providing clean and predetermined laser cut surfaces. A patch or plate 410 is positioned over the open area of the casing and laser welded in place 406, 404. If need be or desirable, the formation in the damaged area can be removed.

Example 2

Two tubulars are positioned end-to-end, about 5,000 feet in a borehole and welded using a key hole laser weld.

Example 3

Two conductor pipes are positioned in a butt-to-butt overlaying arrangement and laser welded. Preferably using a key hole welding technique.

Example 4

Flow lines, or pipe lines are repaired, built with laser welding using a laser welding barge.

Example 5

FOSP risers are laser welded in the field with a laser welding system.

Example 6

Laser cladding of down hole structures, damage pipes, and other locations where metal needs to be added or deposited in a controlled and predetermined manner. For example, damaged conductors, risers, tubulars could be repaired or rebuilt using down hole laser cladding methods.

Example 7

Hangers for casing may be supplemented or eliminated by down hole laser welding of the inner and outer strings. Further, cement sealing between inner and outer strings of tubulars may be supplemented by welding forming a complete weld between and along their respective inner and outer diameters.

Example 8

Figure 5:
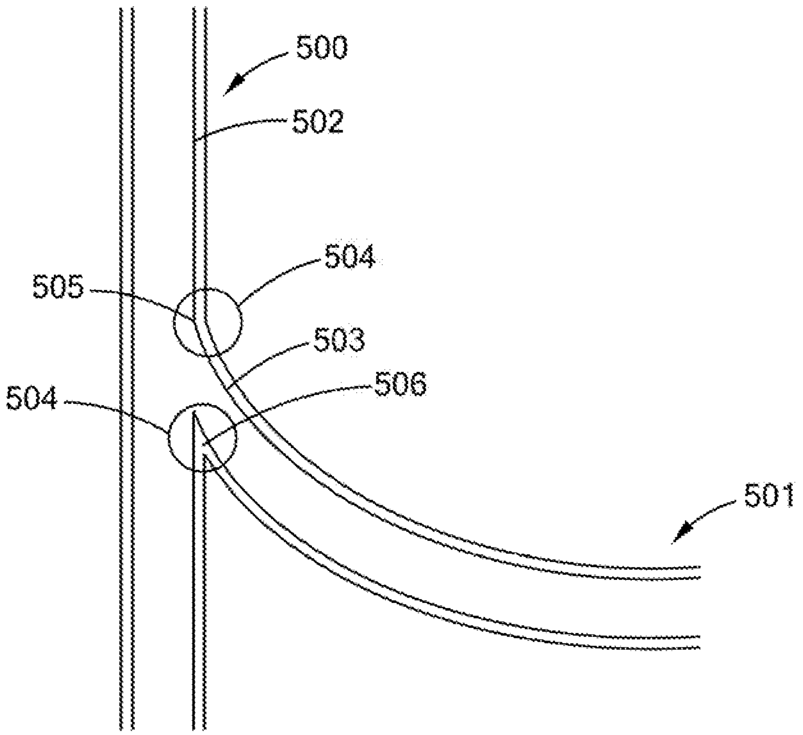
FIG. 5 is a cross sectional view of an embodiment of a laser reinforced multilateral junction borehole configuration in accordance with the present inventions.

Turning to FIG. 5 there is provided an embodiment of a multi-junction well configuration. The primary borehole 500 has a branch 501. At the junction 504, 506 of the casing 502 for the primary borehole 500 and the casing 503 for branch 501, laser welds 505, 506 are utilized. These laser welds can replace in whole or in part the hangers, and other down hole connectors that are presently needed to insure structural and pressure integrity of the casing. These laser welds are less obstructive to the borehole, leave greater area for tools, and production tubing, to name a few things.

Example 9

The laser tool of the embodiment of FIGS. 9 and 9A is optically associated with a 20 kW laser, through the laser umbilical. The tool is used to perform a decommission activity in accordance with the following embodiment of a decommissioning operational plan.

| Step | Operation |
|---|---|
| 1. | All wells must be clean of debris in order for internal laser cutting tools to function properly.<br>Contractor is to use API sized drifts and properly drift the innerstring of the multistring well prior to the arrival of the laser cutting system. |
| 2. | Laser delivery package arrives onsite preset on truck and trailer combo.<br>Equipment will be rigged up according to deck spot plan and procedure for rigging.<br>Any needed lifting operations require a good communication between crew, deck foreman and crane operator to avoid any hazardous situation (hanging load, correct rigging, etc.) |
| 3. | Hook-up of umbilical's and hoses.<br>Hook-up of equipment shall commence as soon as the positioning of the truck in correct location relative to well bore to be severed.<br>Escape routes shall be identified and marked.<br>Hook up fiber optics, hydraulics, water and air hoses. Focus on routing of hoses to minimize trip hazards. Route fiber optic lines in a manner that minimizes exposure to personnel. Focus on isolation of equipment to prevent release of stored energy. |

-continued

| Step | Operation |
|---|---|
| 4. | Verify well is free of hydrocarbons by scanning area around well bore for explosive gases with LEL metering equipment. Also if present, open annulus wing valves to vent all annulus. If explosive gas is present, notify field superintendent and stand down for further instructions. |
| 5. | Client has filled out and reported the correct cutting depth from top of the multistring to 5' BML NOTE: Depth is to include an additional distance from mean gradient to top of well head |
| 6. | Install the upper tool extension sub over the umbilical package before stabbing the laser connector into the connector receptacle located on the upper portion of the tool. |
| 7. | Connect laser cutting tool to the laser cutting umbilical (includes fiber optic line, hydraulic lines, pneumatic hoses, and electrical cables) and slide the upper tool extension sub back down and secure to the connector housing. Using measured distance from Step 4, slide down the Wedge and Motor Assembly onto the upper extension sub and secure the assembly to the tool package using clamps provided. The distance from the lower edge of the wedge to the center point of the nozzle should equal the number on the "Depth Verification Report" |
| 8. | Before running the Internal Laser Cutting Tool down hole, follow deployment checklist and operation procedures for pre-deployment. Laser/Optics Package is declared ready for operations |
| 9. | Install umbilical bend limiter and hose/fiber sealing grommet onto top of tool and secure with provided bolts Utilizing the crane, hoist the laser tool and umbilical over to the top of the well bore. Slower lowering the tool down into the top of the well innerstring until the Wedge assembly bottoms out onto the top lip of the innermost string. |
| 10. | Once the top of the tool is safely set inside the well bore, secure the tool wedge (swivel bolts provided by Foro) to the outer well head or outermost casing, whichever provides the best securing point. |
| 11. | Install the light containment device around the area surrounding the wedge and external portion of the well bore. The beam stop cone will act to divert any light emitted back down into the wellbore or ground as well as prevent any gas from escaping vertically. Install the active gas monitoring device into the light containment device port and connect into the control room. This will allow for real-time monitoring of gas should explosive gas migrate thru existing wellbore cement plugs. If the gas is detected the laser interlock will activate and shutdown the operation. |
| 12. | Initiate gas flow thru the umbilical from the laser surface spread compressor, this will allow for gas to open the cutting nozzle orifice and flow evenly over the optic components as well as provide a proper laser waveguide for efficient internal to external multistring cutting. NOTE: Do not allow for the gas to shutdown on the surface at anytime as this will cause debris and sediment to enter into the optic assembly of the tool and cause failure. |
| 13. | Start the laser from the laser control container located on the back of the truck/trailer combo and monitor laser, optics, housing temperatures during cutting process |
| 14. | Confirm laser penetration thru the wall of the multistring into the seafloor by cooling gas flow increase |
| 15. | Start laser cutting tool head rotation at pre-specified speed (based on project engineer supplied cutting times versus multistring outer diameter, number of strings and wall thickness) |
| 16. | Complete 360 degree rotation and confirm the cut by crane or pulling device. IF not fully severed continue cutting with laser power at full levels until full severance occurs. Once multistring has been verified fully severed, stop the rotation of the tool and unsecure the tool's wedge from the well. Securely hoist the tool back to the storage area for maintenance and down-rig all umibilicals, hoses and supporting equipment |
| 17. | Reconnect the crane or articulating arm to the tools lifting eyes and retrieve the laser cutting tool until it reaches the top of the multistring. Gas flow should still be flowing out of the cutting head nozzle orifice in order to ensure proper optic cleanliness. |
| 18. | Connecting the crane or pulling device to the well bore, via chain or lifting straps, pull the severed well section from the ground and lay down in pre-designated scrap area. Due to some wells having cement vaults around the outer casing, the pull may require a larger than well weight strain to pull out of ground. If unsuccessful in pulling due to excessive cement to soil friction, project would resort to small excavator for breaking the well bore loose of the soil. NOTE: Well may have cement vault around the outermost string and pulling up thru compact ground may result in crane shock load, therefore preset pulling levels must be set as to avoid equipment or personnel damage. |
| 19. | Once well is pulled and laid down, utilize the crane to install a, similar outer well casing diameter, casing overshot down into the exposed hole. This will keep the hole open for regulatory bodies to examine top plug location and fully severed well bore. Upon regulatory body sign-off for completing abandonment program, the overshot will allow for identification plate welding onto innermost string. |
| 20. | After identification plate has been welded onto the well below ground level, an excavator team would back fill the hole with soil. |
| 21. | If additional wells are within reach of tool and umbilical lengths not restraining, repeat Steps 4-20. |

Example 10

A mobile high power laser system for welding, decommissioning, and repairing including: a laser housing; a handling apparatus; a high power laser capable of generating at least a 10 kW laser beam within the laser housing; a conveyance structure including a high power optical fiber, a passage, a line and a support structure, wherein the high power optical fiber having a core diameter of at least about 100 μm and a minimum bend radius; and, an optical block having a radius of curvature, wherein the optical block radius of curvature is greater than, equal to, or within 5% less than the radius of curvature of the high power optical fiber.

Example 11

A mobile high power laser system for welding, decommissioning, and repairing including: a base; the base having a laser housing, an operator housing and a handling apparatus; a chiller, a storage tank, and a laser capable of generating at least a 10 kW laser beam being associated with the laser housing; a conveyance structure including a high power optical fiber, a passage, a line and a support structure, wherein the high power optical fiber has a minimum bend radius; and, an optical block having a radius of curvature, wherein the optical block radius of curvature is greater than or substantially equal to the radius of curvature of the high power optical fiber.

Example 12

A mobile high power laser system for decommissioning, welding and repairing having a conveyance structure that is at least 5,000 feet long, which has an optical fiber who's core has a diameter of at least about 100 μm. The system also having a means for suppressing non-linear effects.

Example 13

A Class I mobile high power laser decommissioning system including at least 500 feet of conveyance structure and where the core diameter may be at least about 450 μm, a high power laser is capable of generating a laser beam of at least 10 kW, and a laser tool, shielding and control system to direct the laser beam in a predetermined manner and contain the laser beam.

Example 14

A Class I mobile high power laser decommissioning system including at least 500 feet of conveyance structure and where the core diameter may be at least about 100 μm, a high power laser is capable of generating a laser beam of at least 10 kW, and a laser tool, shielding and control system to direct the laser beam in a predetermined manner and contain the laser beam Example 15

A Class I mobile high power laser decommissioning system including at least 500 feet of conveyance structure and where the core diameter may be at least about 550 μm, a high power laser is capable of generating a laser beam of at least 10 kW, and a laser tool, shielding and control system to direct the laser beam in a predetermined manner and contain the laser beam.

Example 16

A Class II mobile high power laser decommissioning system including at least 500 feet of conveyance structure and where the core diameter may be at least about 450 μm, a high power laser is capable of generating a laser beam of at least 10 kW, and a laser tool, shielding and control system to direct the laser beam in a predetermined manner and contain the laser beam.

Example 17

A Class I mobile high power laser system for decommissioning, welding and repairing having a conveyance structure that is at least 1,000 feet long, which has an optical fiber who's core has a diameter of at least about 300 μm. The system also having a means for suppressing non-linear effects.

Example 18

The embodiment of FIG. 1 being a Class I system.

Example 19

The embodiment of FIG. 3 being a Class I system.

Example 20

The embodiment of FIG. 6A being a Class I system.

Example 21

The embodiment of FIG. 6B being a Class I system.

Example 22

The embodiment of FIG. 9A being a Class I system.

Example 23

An embodiment of a laser decommissioning tool is deployed internal to the wellbore and the laser beam is propagated a long a laser beam path downwardly, generally along the axis of the wellbore, to remove any cement, debris, or obstructions that are internal of the innermost string. Depending upon the selected beam pattern and nature of the material to be cleared, the entire spar or just the lower optics housing may be rotated.

Example 24

Figure 11A:
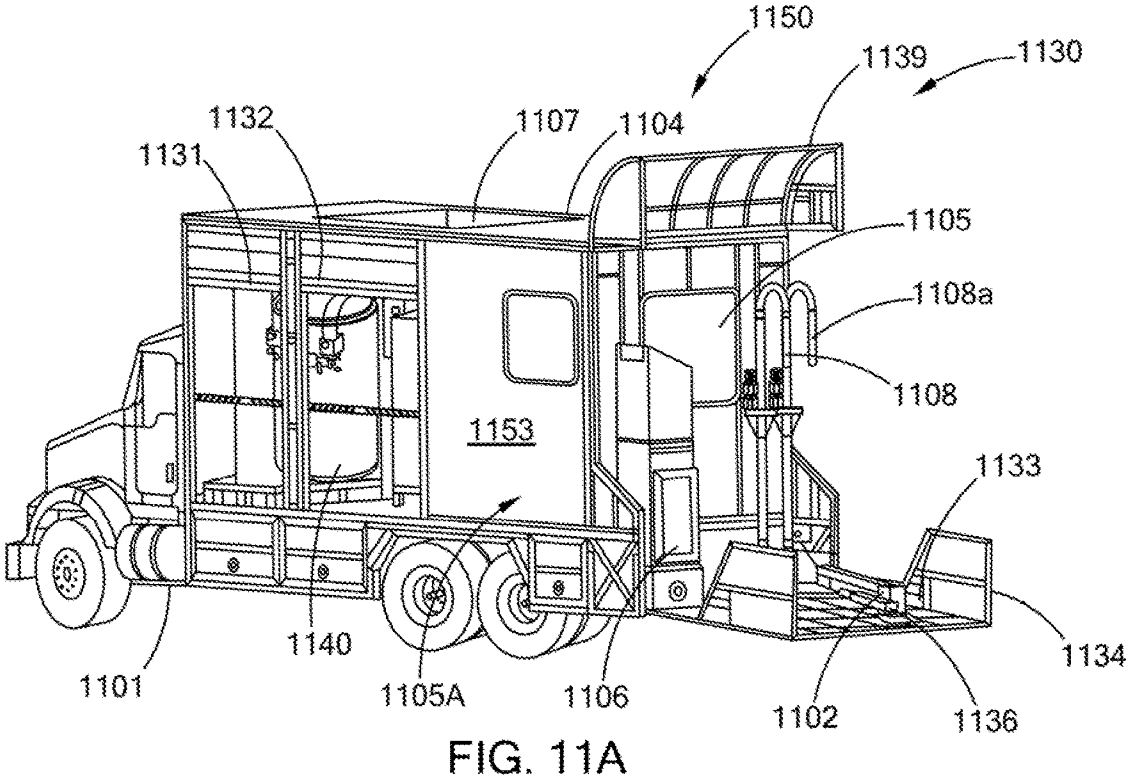
FIG. 11A is a perspective view of the embodiment of FIG. 11 with the rear section open.
Figure 11:
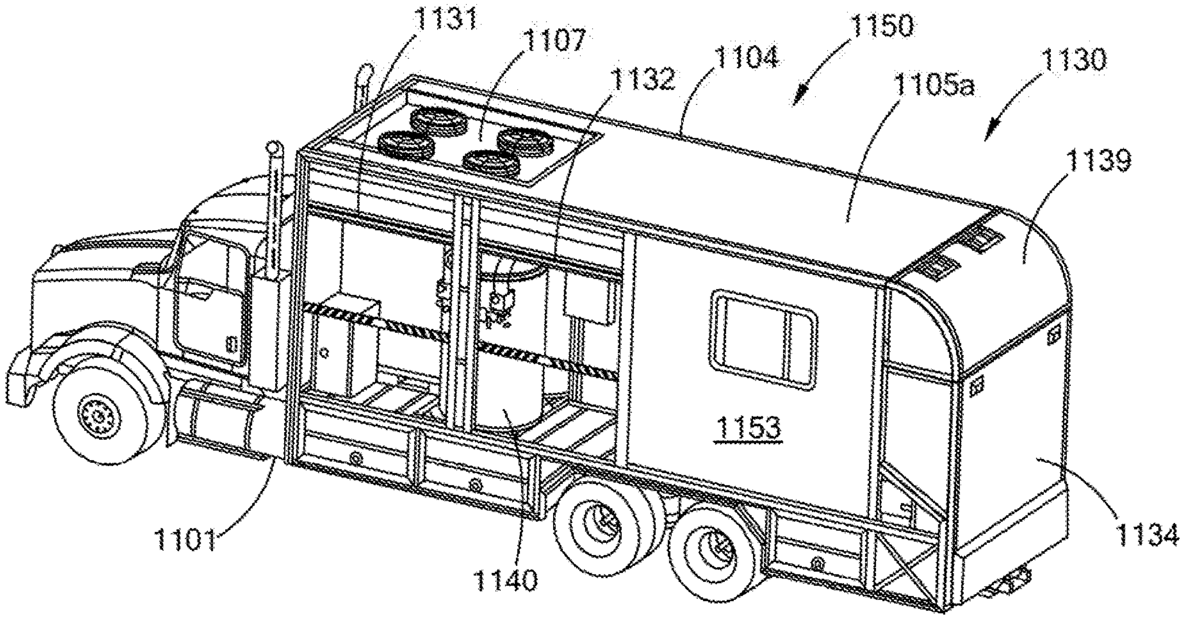
FIG. 11 is a perspective view of an embodiment of an embodiment of a laser decommissioning system in accordance with the present inventions.
Figure 11B:
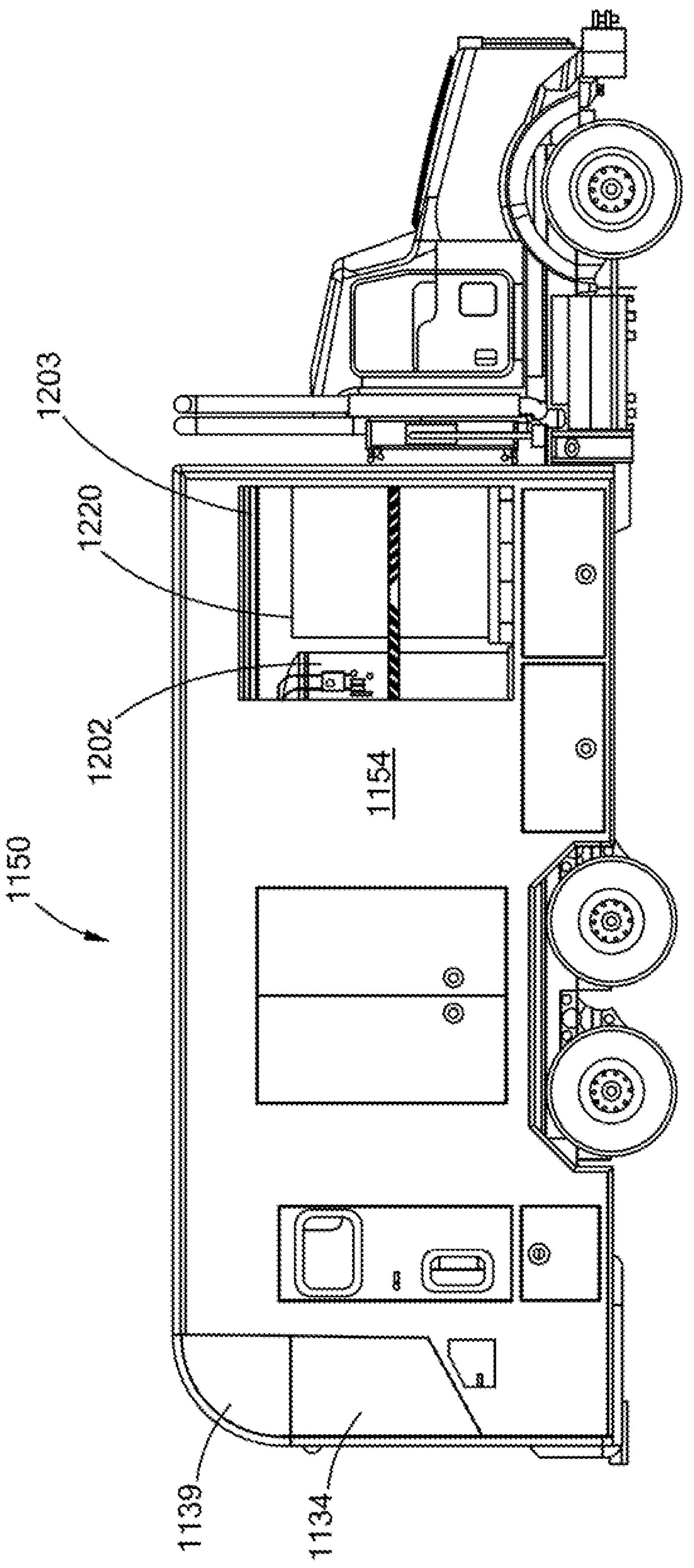
FIG. 11B is a side view of the embodiment of FIG. 11.
Figure 11C:
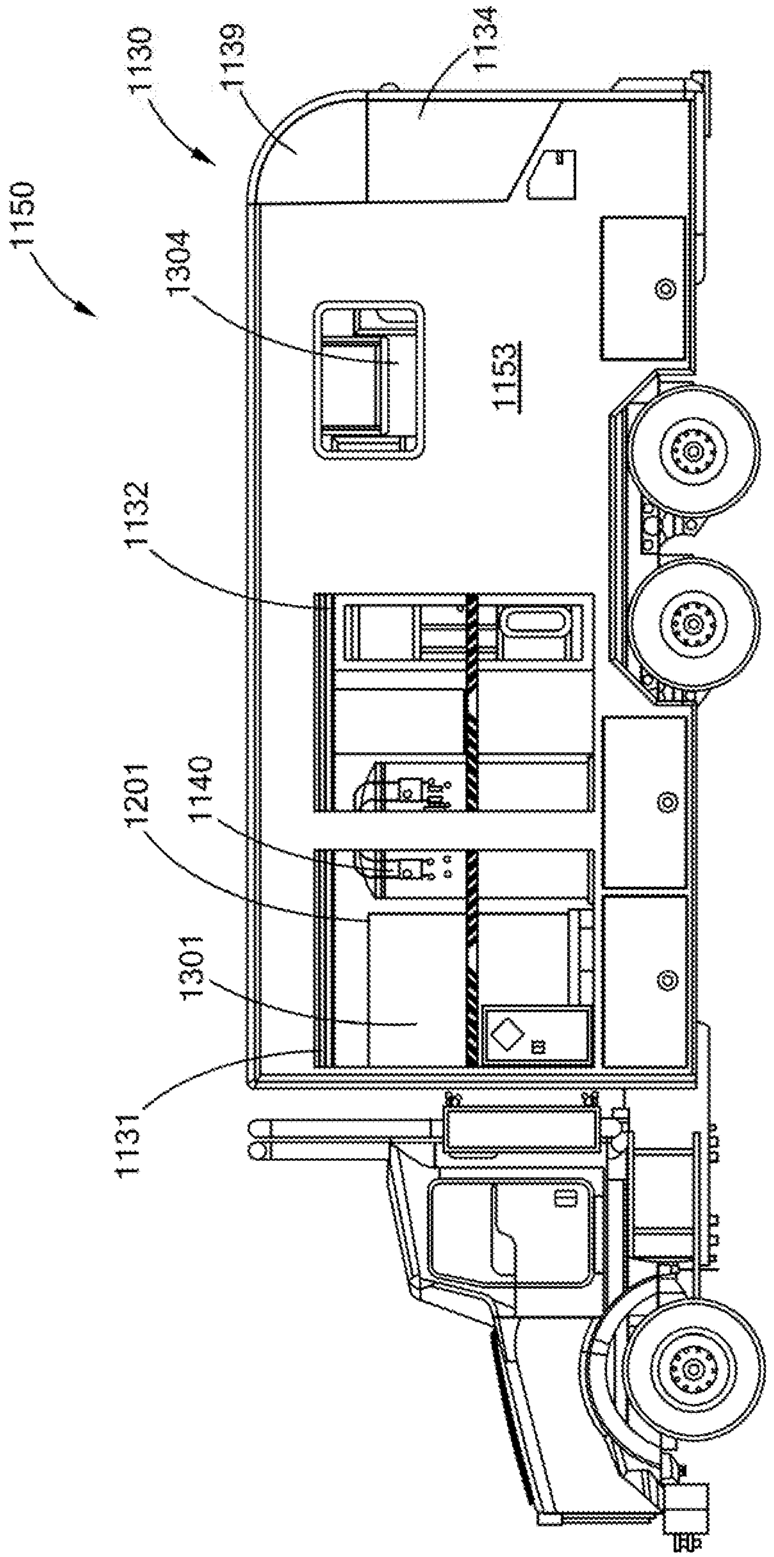
FIG. 11C is a side view of the embodiment of FIG. 11.
Figure 11D:
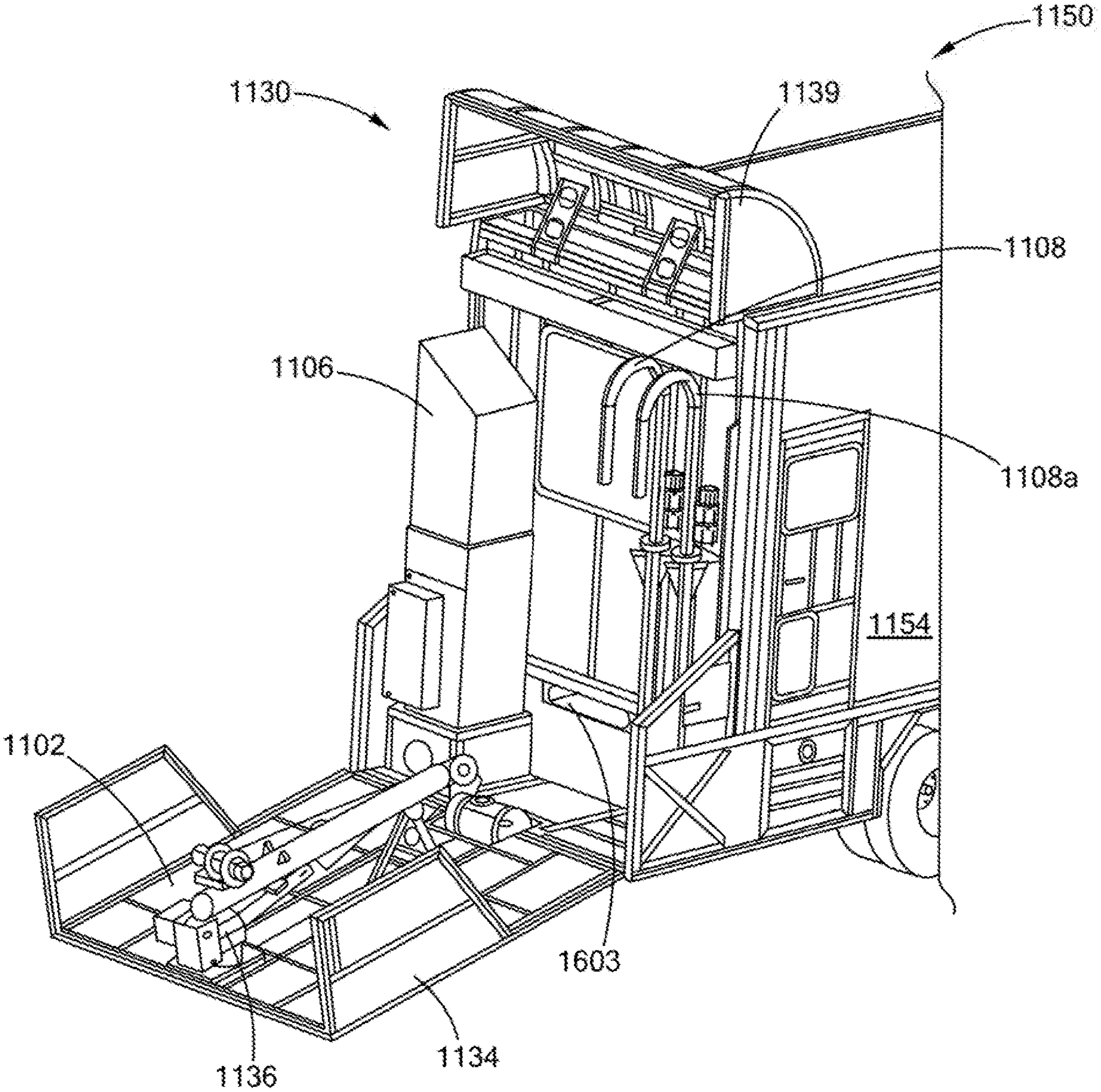
FIG. 11D is a perspective view of the open rear section of the embodiment of FIG. 11.
Figure 11E:
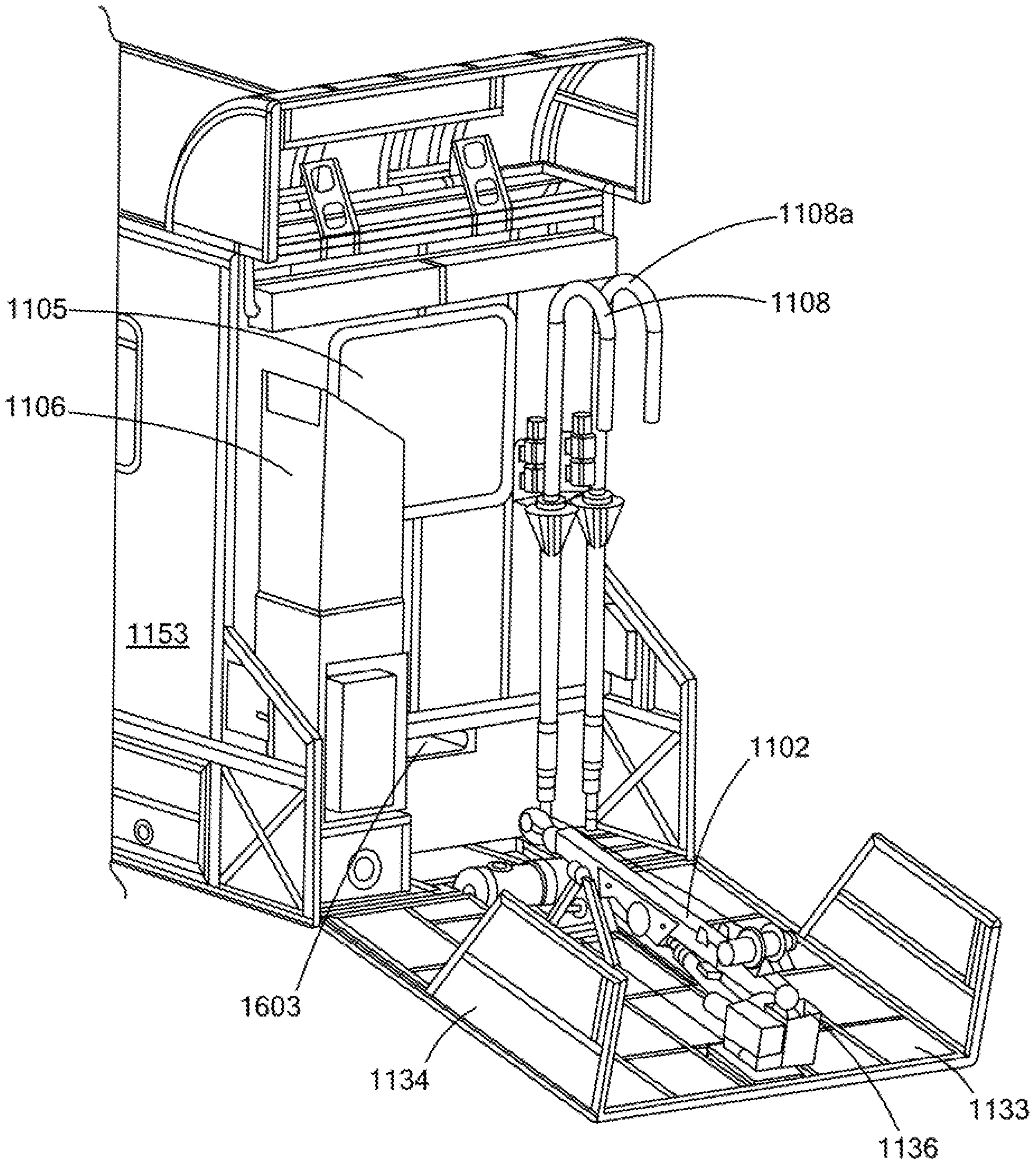
FIG. 11E is a perspective view of the open rear section of the embodiment of FIG. 11.
Figure 11F:
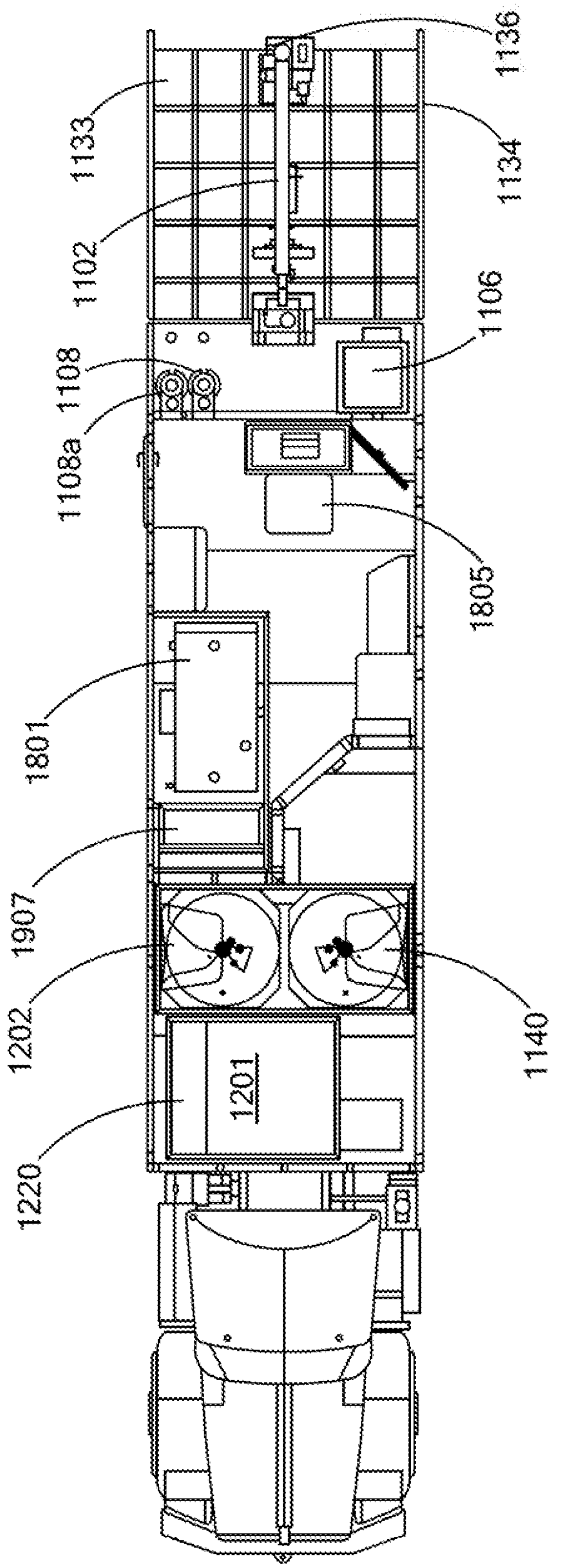
FIG. 11F is a top plan view of the embodiment of FIG. 11, with the rear section open.

An embodiment of a mobile field laser unit, is provided in FIGS. 11-11F. Although this unit is preferably deployed for land based decommissioning, it is understood that it can be placed on a barge, platform, derrick, drill ship or other offshore type structure or vessel and perform laser operations offshore, or perform laser operations on land from an offshore position. Further, although particular figures may be discussed in detail with respect to one component or another, it should be understood that similar lead line numbers correspond to similar components throughout FIGS. 11-11F.

Turning to FIGS. 11 AND 11A there is shown perspectives views of a mobile field laser unit 1150. In FIG. 11 the rear section 1130 is closed, e.g., for transport or traveling, and in FIG. 11A in the rear section 1130 is opened, e.g., for deployment or for commencing laser decommissioning operations. Thus, FIG. 11 shows the unit 1150 in an un-deployed or transport configuration; and FIG. 11A shows unit 1150 in a deployed, or operational configuration. Left side 1153 access doors, 1131, 1132 of the container 1104 of unit 1150 are open, as shown in the figures.

The mobile field laser unit 1150, has a container 1104, that houses the laser, control room, support gas, chiller and other equipment. In this embodiment the container 1104 is mounted on a truck chassis 1101. In a preferred embodiment the truck can be about 36 feet in length and 13 feet, 4 inches in height. In being understood that the laser system, for example the container 1104, can be mounted on a sled, in a shipping container type structure, on a semi-trail, a rail car or other movable, and semi-movable enclosures or structures. The laser system and supporting equipment, e.g., lifting devices, rotary slip ring, laser tools, exhaust gas cleaning and filtering systems can be in a single container, or can be in multiple container.

Turning to FIG. 11A, the rear section 1130 has a crane or lifting device 1102, two laser cutting tools 1108, 1108*a* (in their respective racks, or holding devices), a window 1105 that provides views from the control cabin, in control cabin section 1105*a*. There is also a filtration system 1106. The crane 1102 is mounted to the inner face 1133 of the tailgate door 1134 of container 1104. In this manner when the unit 1150 is in the deployed configuration the crane 1102 can be raised from the door 1134, by a rotational unit 1136, while remaining attached to and supported by the door 1134. The crane 1102 can be used to steady members as they are being laser cut or sectioned, as well as, pulling, removing or lifting sectioned members, such as casing, from the well.

The container 1104, preferably contains the laser and all support equipment and systems needed to perform high power laser cutting operations. Thus, through the open door 1132, there is seen a supporting gas holding tank 1140, which in a preferred embodiment is a liquid nitrogen tank, preferably about a 500 gal. capacity. The container 1104 in this embodiment has a roof mounted fan assembly 1107 for chiller 1201. The chiller components 1201 are in fluid and thermal communication with the unit's roof-mounted fan cooing unit 1107. In a preferred embodiment the chiller 1201 can have a 20-ton capacity. Preferably control cabin section 1105*a*, is separate, or partially or completely isolated from the tanks and chiller. In an embodiment the control section 1105*a* contains a control system, operator terminals and monitors, and umbilicals. An access port 1603 (see FIGS. 11D and 11E) is provided for the umbilical to be feed out of the control cabin section 1105*a* and connected to a tool, e.g., 1108.

The truck further comprises a laser cutting exhaust handling and filtration system, 1106, e.g., a filtration system for the removal of gases and particles that may be generated during laser decommissioning operations. The umbilical, has a return line, or a separate return line can be used. The return line is connected to the filter system to capture, control and clean any gases or particulates that may be generated during laser decommission operations.

FIG. 11B shows a side view, of side 1154, of the unit 1150. This is the other side of the truck as seen in FIGS. 11 and 11A. In this view side access door 1203 is open. Any of the access door on the unit can be used to provide maintenance and utility access to equipment and components in the unit 1150, such as, e.g., generator 1220, chiller 1201, and second fluid tank 1202, preferably a 500 gal. liquid nitrogen tank. Any of the access doors may also provide emergency access to these components in case an emergency shutdown is required. Generator 1220 can have hookups for power lines to power components both inside and outside of the truck. Any of the access doors may remain open to allow for power lines to run outside of the truck during operation. The truck may also have external power boxes with various electrical connectors and power supplies for providing power to outside devices, e.g., during operation, to avoid running cables out of an open access door.

FIG. 11C shows a side view, of side 1153, of unit 1150. Access doors 1131, 1132 are open and provide access to the side 1301 of chiller 1201 and fluid tank 1140. Components of the control cabin can be seen through side control cabin window 1304. The rear section 1130 has a door 1134, which is a lower section of the rear section 1130, and an upper hatch or door 1139.

The generator 1220 has a power conditioner 1907 that conditions the electrical power for use by the laser 1801. The generator 1220 may also have a hook-up cabinet, or external outlets which can be on either side, 1153, 1154 of the unit 1150. Preferably, in an embodiment the hook-up cabinet allows connectors, preferably electrical power cables, or other means, to connect the generator to tools, computers, compressors, or other devices useful in decommissioning operations. The power conditioning unit conditions the electrical supply to the high power laser, to make certain that it is within the power requirements for the laser.

FIGS. 11D and 11E are perspective views of the rear section 1130 of the mobile laser unit 1150 from side 1154 and side 1153, respectively. The rear gate 1134 and hatch 1139 are open. The deployment crane 1102 is mounted to the upper section of the gate 1134. In this manner the rotation unit 1136 is furthers from the unit when the gate 1134 is fully opened, e.g., deployed. The rotation unit 1136, has a joint that permits the crane boom to be raised and rotated, hydraulic cylinders and electric motors can be used for moving and positioning of the crane. The crane 1102 is swingable and has an extendable boom that is capable of reaching and handing laser tools 1108, 1108*a*, as well as, the removal of sectioned materials, e.g., tubulars, casing, from the decommissioned well. Crane 1102 may then access a well to perform laser operations on the well or peripheral equipment placed near the mobile laser unit or the well. Laser tool umbilicals are accessible by a port 1603 leading into the unit 1150. This umbilical port 1603, allows for an umbilical that is in fluid communication with the working fluid, preferably liquid nitrogen, is in optical communication with the laser source, preferably with an optical fiber for transmitting a high power laser beam from the laser to laser cutting tool assembly, e.g., 1108. Additionally, the umbilicals may include control and data lines for keeping the tool in data and control communication with a control system (not shown) in a control cabin. The rear of the truck also features a filtration system 1106. Filter system 1106 handles return gas, removing problematic materials that may be generated by laser cutting applications. Preferably, filter system 1106 handles, e.g., removes or mitigates, VOCs, particulates, HAPs, TAPs and other problematic materials, and in particular removes, or reduces the presence of, all problematic materials required to meet environmental standards.

FIG. 11F shows a cutaway, top-down view of a mobile laser unit. The tail gate 1134 is open. The high power laser 1801, which preferably is at least a 5 kW, preferably at least a 10 kW and more preferably a 20 kW fiber laser, is positioned in the control cabin section of the unit, adjacent to the power conditioning unit 1907 and separated from the liquid nitrogen tanks 1140, 1202, and the generator 1220. A control terminal 1805 is located in the control room, and provides a view through window 1105 to decommissioning operations. Preferably, the laser 1801 and control panel 1805 are separated from the tanks and generator by an insulated aluminum wall. Decommissioning operations are controlled by control terminal 1805, which may control one or more of the laser 1801, the crane 1102 and the cutting tool, e.g., 1108, 1108*a*, once deployed, as well as other equipment and components in the unit 1150. The power conditioner 1907 is in electoral connection with the generator 1220.

Example 25

In an embodiment of the mobile laser system of FIGS. 11-11F, the truck is preferably adheres to all National and California regulations—DOT, EPA etc. The truck chassis from Peterbilt or Kenworth, 22 ft chassis is presently preferred length. 300 HP minimum. Class 8 chassis. Remote connections panel on both sides of truck to contain 2× Ethernet socket connected to Laser control panel, 2×110 v power, 2×220 v power. Panels to have lockable waterproof lids. Cabin air conditioning—overhead 2 units. Laser warning beacon on top of truck at rear. Laser alarm speaker at rear of truck. P.A. system, external speaker on rear of truck. Hanger rack in chiller compartment. 20 ton chiller, preferably with vents with replaceable dust filters mounted such that they can be easily replaced. Access ports for access to chiller valving and connections. 20 kw Laser, preferably access on all sides of the Laser. Rear of Laser to have an access door to allow maintenance and removal of the Laser with a forklift to support the chassis. Laser to be mounted on coiled wire for shock mounting. Power conditioner, access required on all sides. 2×279 gal Nitrogen tanks, access doors required on both sides to allow easy access to valves, fill ports, etc., Liftmoore Crane/tool lift system rear bumper mounted. Smoke filter system.

Example 26

Figure 12:
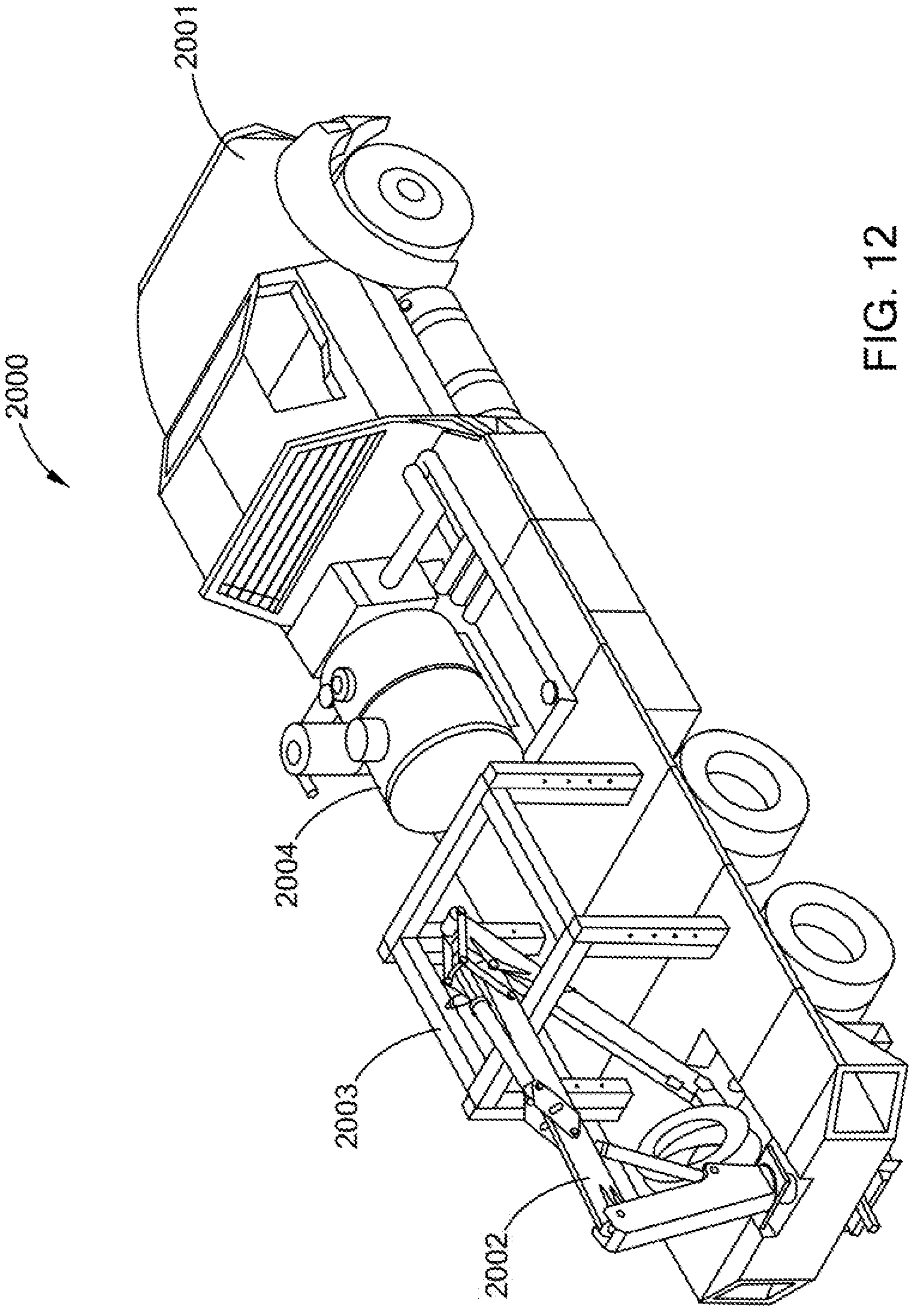
FIG. 12 is a perspective view of an embodiment of a mobile auxiliary lifting unit system for a laser decommissioning system in accordance with the present inventions.

In an embodiment of the system of FIG. 12 there is provided a mobile auxiliary decommissioning unit 2000. This unit 2000 may work in conjunction with mobile laser unit represented in the embodiments of the system in FIGS. 11-11F. In this embodiment, the mobile auxiliary decommissioning unit is on a truck 2001, preferably a flatbed truck. The mobile auxiliary decommissioning unit features a lifting unit 2002, preferably a knuckle boom crane. This crane may be used to move lifting frame 2003 for placement above a wellhead. The system further features pumping system 2004. The pumping system may be used to pump cement to plug the well. It may be used to remove material from the well site. The mobile auxiliary decommissioning unit may assist with site preparation, casing stub removal, plugging a well, welding of steel lid plates, or the backfilling of a hole with soil or sand.

Figure 13:
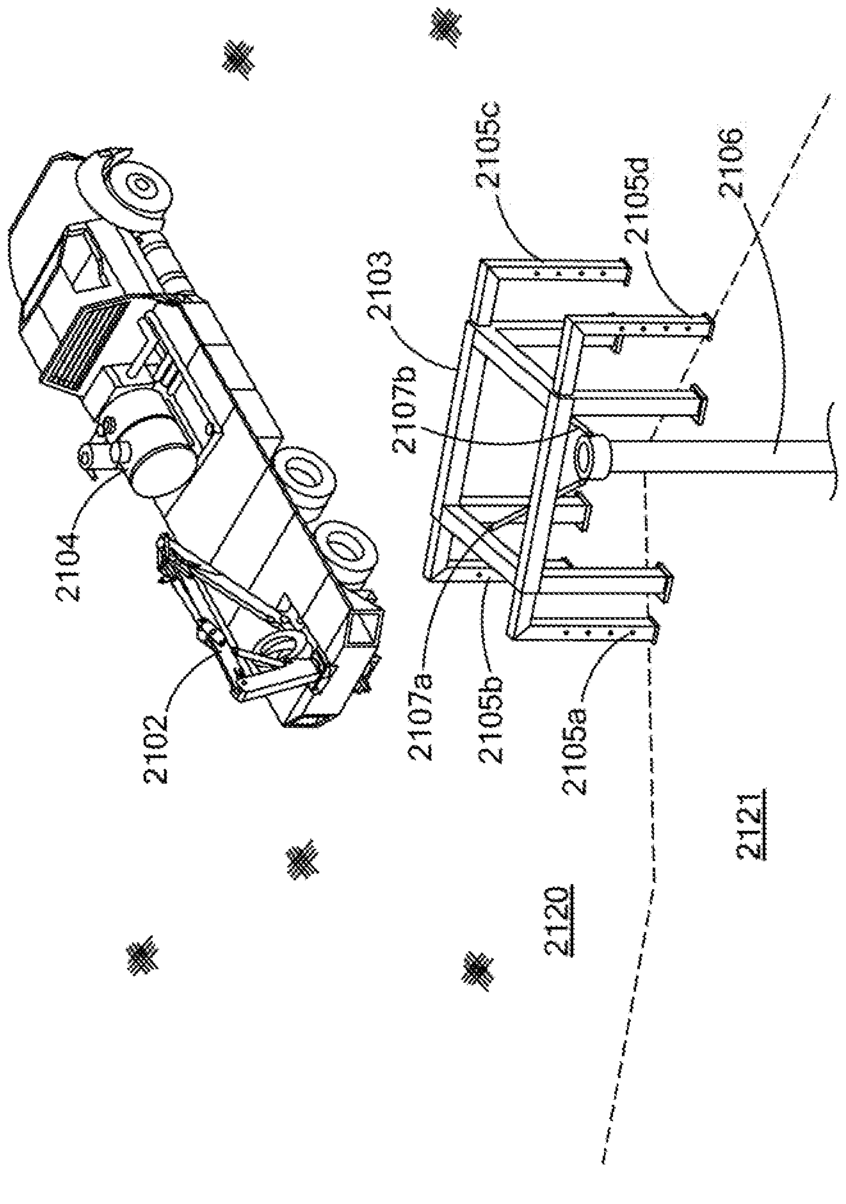
FIG. 13 is a perspective view, with a cut away view of the earth, of a deployed system at a well site in accordance with the present inventions.

FIG. 13 shows an embodiment of the system in use at a wellsite. The surface 2120 of the earth is shown cut away to reveal the ground 2121 below the surface at the well site. Pumping system 2104 has prepared the site for laser decommissioning, and crane 2102 has deployed lifting frame 2103 above the well. In this instance, soil conditions, e.g., sanding soil make it preferable to deploy extension legs 2105*a*, 2105*b*, 2105*c*, and 2105*d* to keep lifting frame 2103 stable, e.g., from sinking, shifting or tilting. Lifting frame 2013 includes pulling devices 2107*a*, 2107*b* for use in lifting well casing 2106, once is has been cut by the laser tool. In this embodiment the well casing 2106 has only been minimally separated from the ground 2121. For instance, by use of pumping system creating a small space between the exterior of the casing 2016 and the ground 2121. Thus, in this instance, after an internal laser cut is made, sectioning the casing 2016, the lifting frame 2013 can pull the sectioned casing from the ground 2121. In this manner the use of an inside to outside cut, allows a below grade removal of the casing, with only above grade non-laser activity, and personal. This minimizes the need for earth moving around the well, and reduces, and preferably prevents the need to lower personnel or equipment into a hole surrounding the well.

Example 27

In an embodiment of a laser decommissioning system there is provided a system that can arrive on a well site, via a truck, e.g., 16 ft stake bed truck (7,600 payload), after multistring severing at for example −5 ft below soil gradient has been performed. A chain tieback from the outer casing string is used to connect the hydraulic cylinder clevis and firmly secure the outer casing string for lifting after laser cutting. Other means of attachment can be used, such as chokers, cleats, grasping arms, ratcheting devices and the like. With system attached to the casing, a small hydraulic power pack would supply up to 3000 psi pressure to the hydraulic cylinders and retract until the casing has been pulled up thru the soil (i.e. 1-2 ft vertical). Larger and smaller lifting capacity cylinders may be used. One, two, three four or more lifting devices may be used, in embodiments of the lifting frame. They living device would include gear type, cables, and ratchet type lifting or pulling devices to name a few. Upon casing verification, e.g., confirmation that the laser cut has been complete and that the casing can be readily removed from the ground, the casing would then be released back down into the soil at which point the lifting unit is demobilized back to the truck bed and moved to the next location. And a crane of other pulling device is used to completely remove the casing. In embodiments of the lifting device the device can completely remove the casing.

| Features of an Embodiment of a Lifting Unit | |
|---|---|
| Pulling Capacity (Retract) | 50 Tons (Combined Pull Capacity)-Two-5" Bore × 1.5" Rod Double Acting Cylinders |
| Department of Transportation Requirements | California DoT<br>Design Constraint = <(6'L × 6'W × 4'H) |
| Outriggers | needed based on surface soil condition |
| Lifting | Padeyes, 4 Part Sling |
| Hydraulic Pressure/Flow | <3000 psi/1-2 GPM |
| Range of Casing Sizes to Be Pulled | 5½" OD to 18⅝" |
| Cement Vaults on outside of Casing | Cement vaults up to 46" in diameter may be encountered. |

Example 28

In an embodiment of the lifting frame for sandy soil conditions, the system can have larger bases or feet, out riggers, extension legs to provide stability during hydraulic pulling operations. The well head also may sit roughly 1-3 ft above soil grade and therefore the center portion of the frame can be open to allow vertical access. Also the cylinder rods can extend down to the outermost casing due to some outer casings being buried up to 2' ft in sandy soil (the soil is removed to gain access to the casing and install lifting chains).

Figure 14:
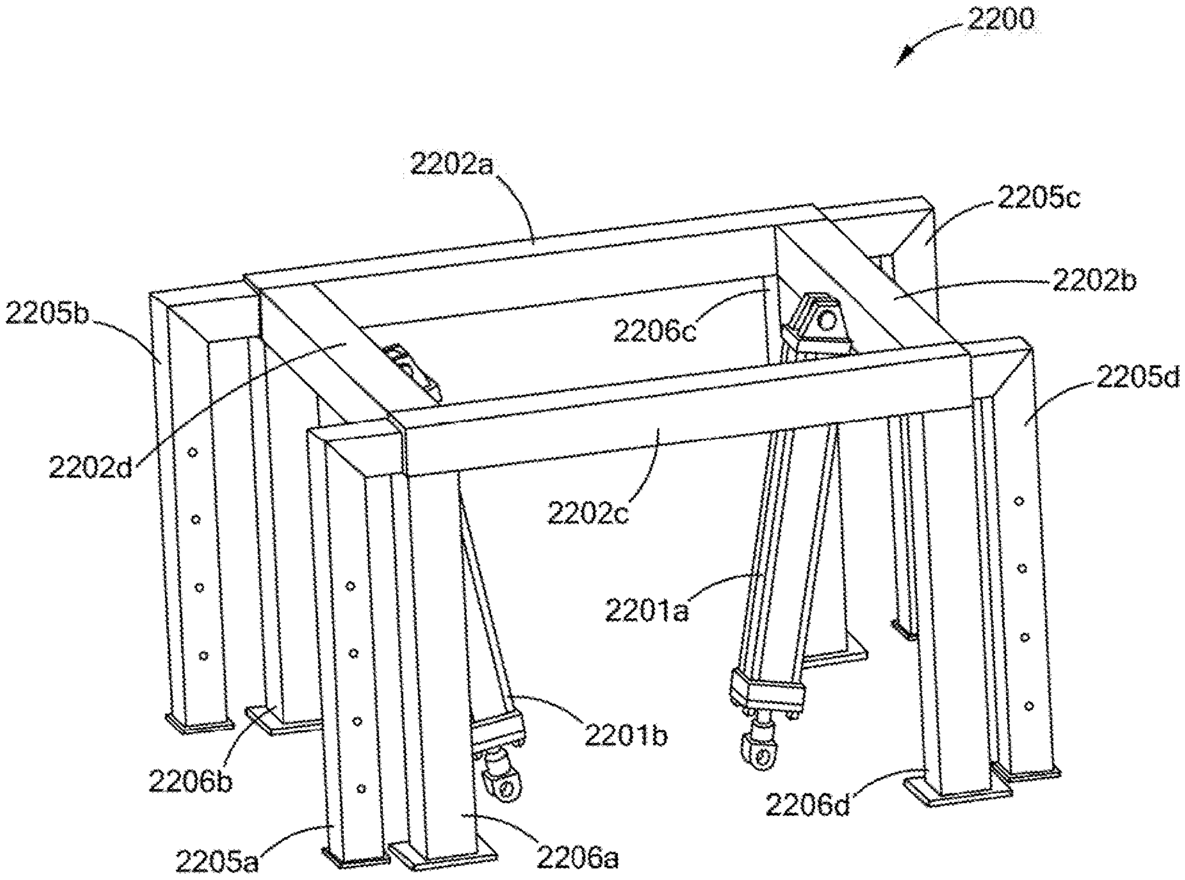
FIG. 14 is a perspective view of an embodiment of a lifting frame of a laser decommissioning system in accordance with the present inventions.
Figure 14A:
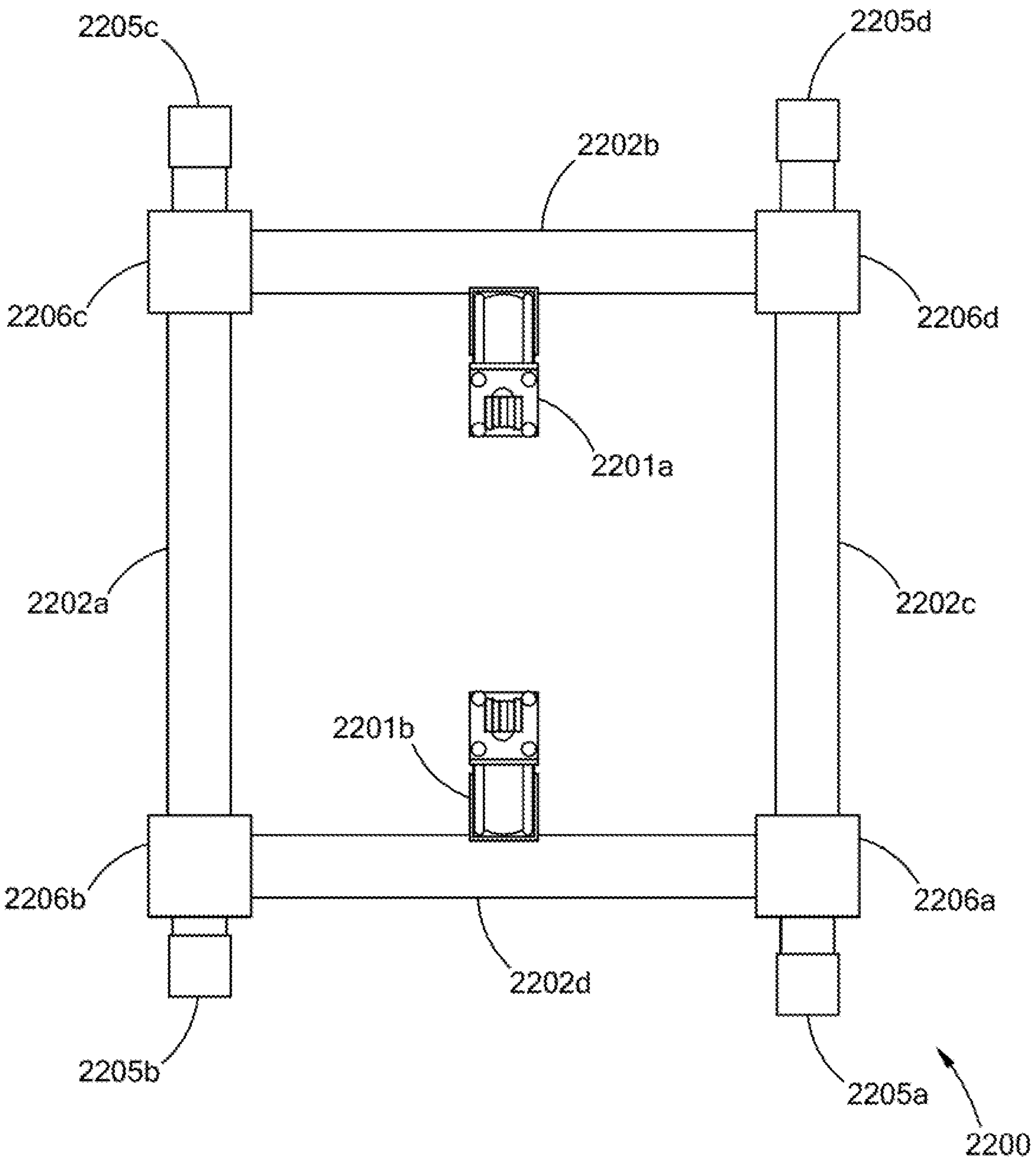
FIG. 14A is a bottom plan view of the embodiment of FIG. 14.
Figure 14B:
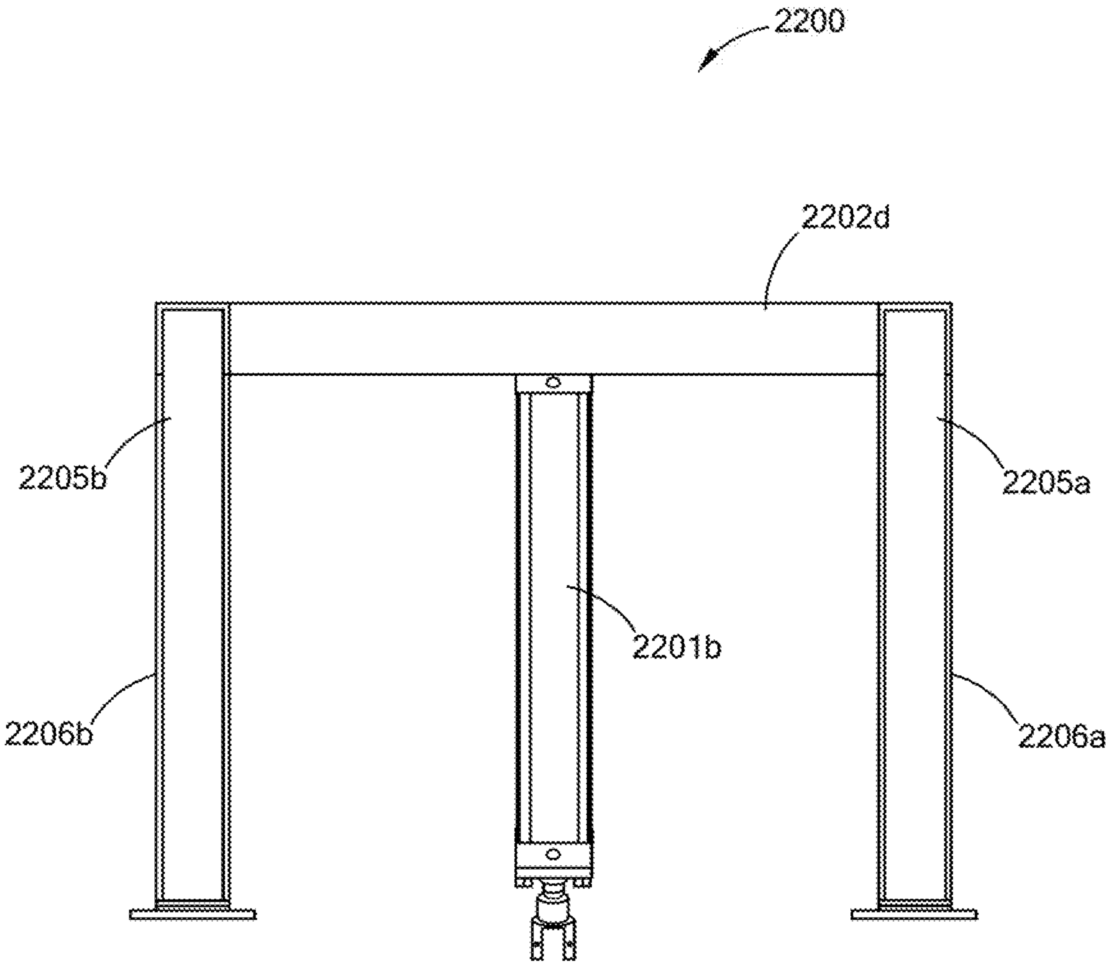
FIG. 14B is a side plan view of the embodiment of FIG. 14.
Figure 14C:
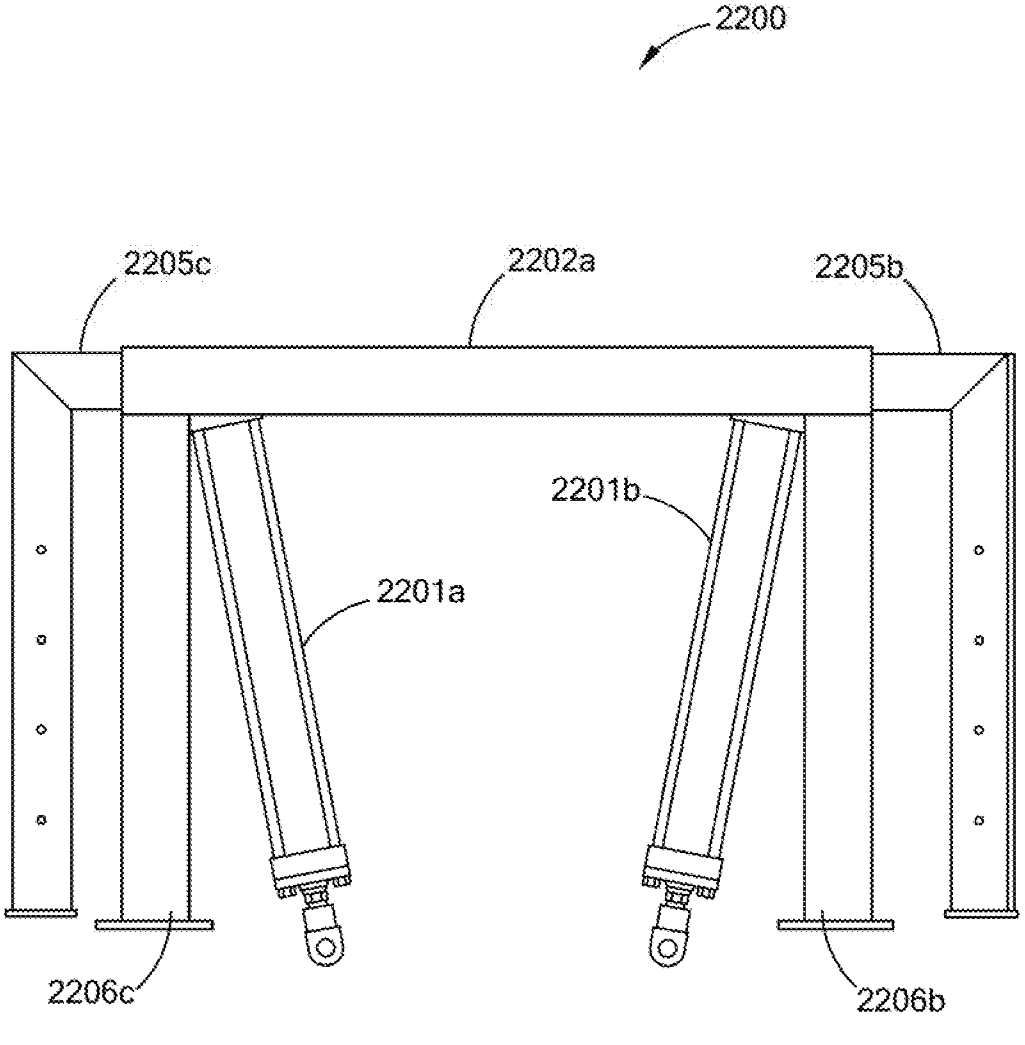
FIG. 14C is a front plan view of the embodiment of FIG. 14.

FIGS. 14-14C depict and embodiment of a lifting frame for use at a wellsite, preferably during laser decommissioning. The lifting frame 2200 comprises four cross bars 2202*a*, 2202*b*, 2202*c*, 2202*d*, that allow for an opening in the center of the frame. The lifting frame includes main legs 2206*a*, 2206*b*, 2206*c*, 2206*d*, and extension legs 2205*a*, 2205*b*, 2205*c* 2205*d*. The extension legs telescope out of the cross bars 2202*a*, 2202*c*. This allows the extension legs to be extended from the frame 2200 while remaining connected to the frame 2200. On solid earth, a pad, or rock, extension legs do not need to be extended from the frame, and may be proximate to main legs. But on sandy or sandy or loose soil, extension legs may be extended to distribute the weight of the lifting frame and thus enhance stability, e.g., keep it from sinking. The lifting frame 2200 further comprises pulling devices 2201*a*, 2201*b*, which are connect to cross bars 2202*b* and 2202*d* respectively. These pulling devices include an eyehole at the distal end, or other attachment device for linking well casings, tubulars, or other structures to the pulling devices 2201*a*, 2201*b*. For example, lifting chains can be used to lift the structures from the well, such as cut casing.

Preferably, a hydraulic power pack would supply up to 3000 psi pressure to the hydraulic cylinders, internally housed in lifting devices 2201*a* and 2201*b*. These hydraulic power packs allow the lifting devices 2201*a*, 2201*b* to retract until the structure has been pulled through the soil. Preferably, the structure may be pulled 1-5 vertical ft. Larger and smaller lifting capacities may be used. Preferably, the lifting devices may hoist at least 50 tons. As the structure is pulled from the ground though an entire stroke of the cylinders, it can be tied off, and the lifting chain reattached at the newly exposed lower portion, in this manner structures significantly longer than the height of the frame can be pulled. As such structures are pulled they may extend through the opening in the frame.

FIG. 14A shows a bottom view of lifting frame 2200. FIG. 14B shows a side view of the lifting frame of the embodiment of FIG. 14. FIG. 14C shows a side view of the lifting frame 2200 showing extension legs 2205*c*, 2205*b* partially extended from cross bar 2202*a*.

Example 29

Figure 15:
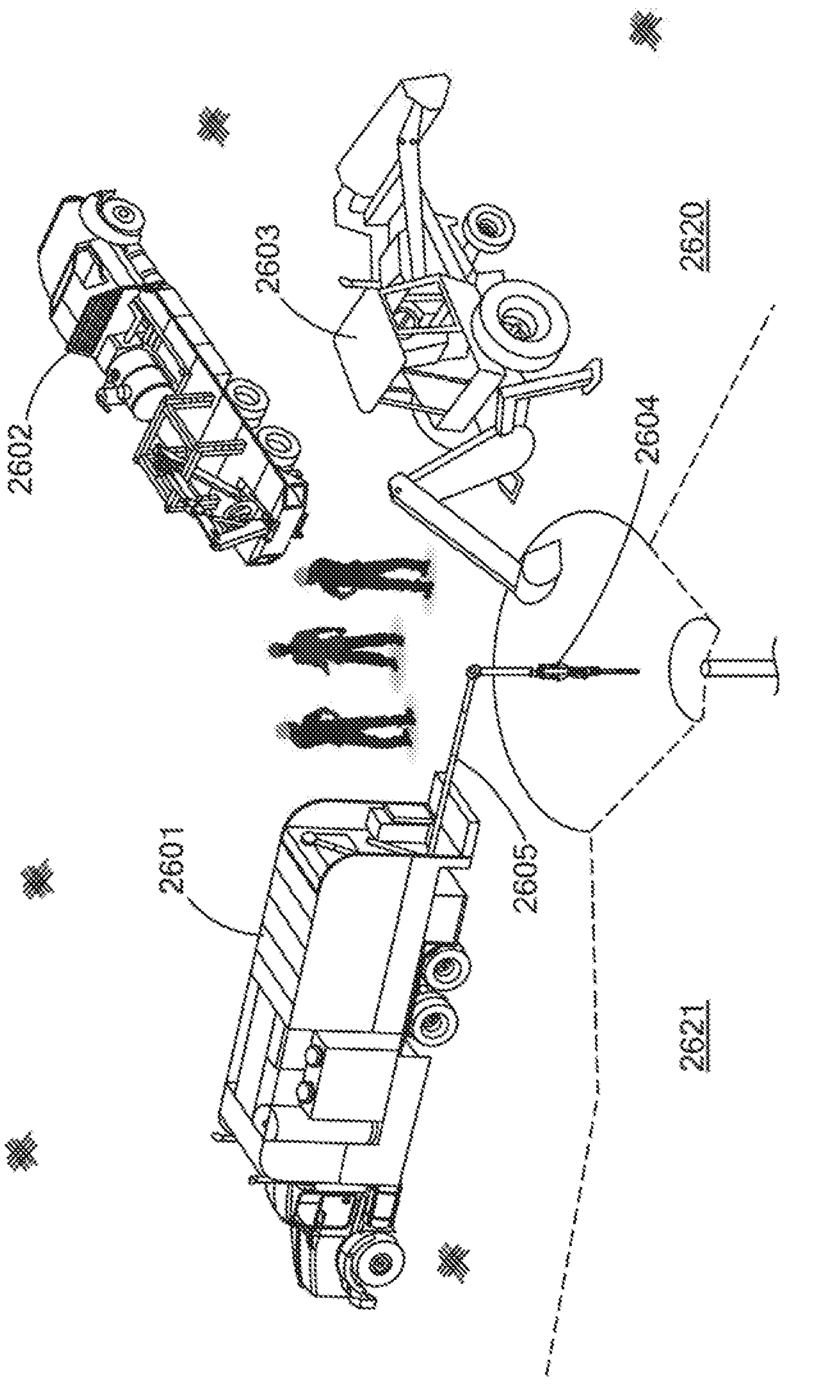
FIG. 15 is a perspective view, with a cut away view of the earth, of a deployed system at a well site in accordance with the present inventions.

FIG. 15 shows an example of an onshore well decommissioning operation featuring an embodiment of a mobile laser unit 2601, with the boom 2605 extended and the laser tool 2604 extended into a hole in the ground 2621, below the surface 25=620 of the earth. An auxiliary decommissioning unit 2602 is also on site. Additionally, a backhoe 2603 is used to excavate around wellsite. As show in the figure the casing has already been cut and removed.

Example 30

In an embodiment of a mobile laser unit system the cutting tools can be deployed without a crane. The mobile laser unit comprises generator preferably a 180 kW generator; a laser, preferably a solid state laser capable of producing at least about 15 kW of laser energy; working fluid tanks, e.g., liquid nitrogen; operator control cabin with a control terminal capable of controlling laser operations. The system also comprises a smoke and particulate emission control unit, that preferably may handle VOCs, particulates, HAPs, TAPs and other problematic materials readily understood by those skilled in the art.

Example 31

The laser decommissioning tool has a focal length for the cutting laser beam that puts the focal point, or more preferably the beam waste in the area of the casing and tubulars to be cut. More preferably the beam waste is essentially located only in the tubulars to be cut. In this manner, underground infrastructure will not be accidently cut by the laser beam during cutting, e.g., in particular during an inside to outside tubular cut. The laser beam beyond the beam waste, e.g., beyond the tubular to be cut, will be defocused significantly that it will travel less than 5 ft, less than 3 ft, and preferably less than 1 ft though the sand or soil surrounding the well to be decommissioned. In this manner the focal length and positioning of the beam waste sufficiently reduces the laser beam power per cc, to the point where surrounding underground infrastructure will not be accidentally damaged.

Figure 16:
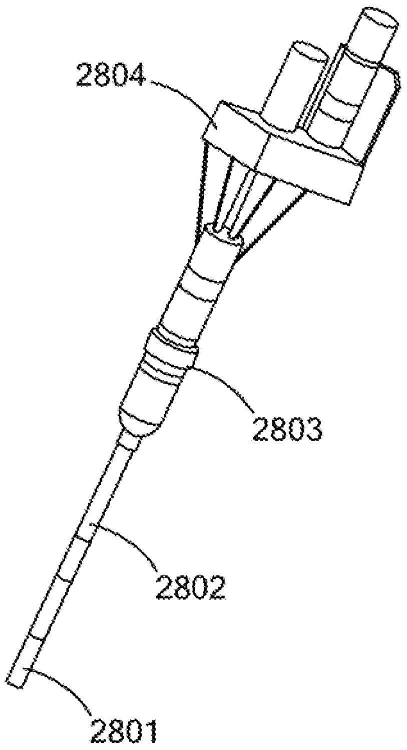
FIG. 16 is a perspective view of an embodiment of a laser cutting tool in accordance with the present inventions.
Figure 16A:
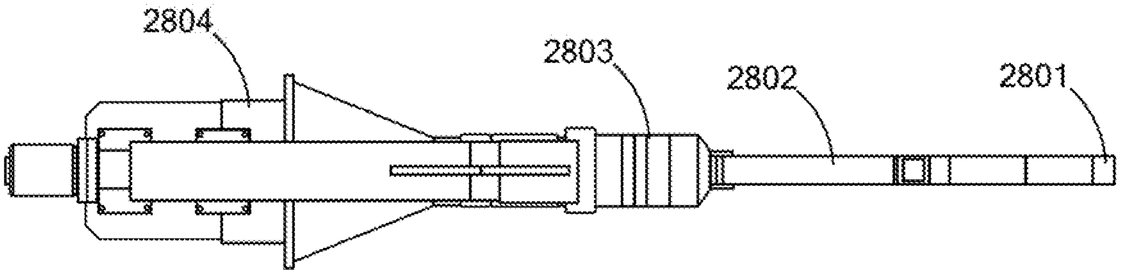
FIG. 16A is a cross sectional view of the embodiment of FIG. 15.

FIGS. 16 and 16A show a perspective and cross sectional view, respectively, of an embodiment of the laser cutting tool. The tool has an upper drive assembly 2804, laser collimator housing 2803, beam path housing 2802, and cutting head 2801. Cutting head 2801 comprises an emitter where the laser leaves the tool. The tool features a slim diameter, where at its narrowest in a preferred embodiment has an outer diameter is 1.75". This allows the tool to fit into narrow tubulars and structures, as well as damaged or partially occluded tubulars. The cutting occurs from the inside-out of the structure as the cutting head 2801 rotates around 360 degrees. Preferably, the tools is used in, and to cut, 2⅜" and 2⅞" tubing. This tool may also be used in wells having dual or multiple strings of tubulars, such as steam injector wells, where one or more of the strings is cemented.

Example 32

The laser field unit has a return gas handling system (e.g. components 992, 991, 990 of FIG. 9B) that has a filter unit an electrostatic precipitator unit to remove particulate materials and other undesirable substances from the return gas stream, e.g., exhaust materials gas stream, that is used for the laser operation. These particulates and other undesirable materials can be created by the laser beam vaporizing, spalling or otherwise creating particles and material that become suspended in the working fluid, e.g., the nitrogen stream. The return gas is captured at or near the top of the well and sent via a tube, e.g., flexible pipe or hose, to return fluid cleaning device, such as for example filters, electronic precipitators (e.g., a SMOKE-HOG from United Air Specialists Inc.). In embodiments, one, two or more of these cleaning devices can be used in serial, parallel and both manners. These cleaning devices, or filter systems can be an integral part of the laser field unit, e.g., the embodiment of FIG. 11-11F, or they can be an independent, stand alone, unit.

Example 32a

An embodiment of a decommissioning unit of the type show in FIG. 1 has a filter unit for filtering the exhaust material stream created by the laser cutting operation. The filter unit reduces the total particulates present in the exhaust material stream by at least 90%, preferably at least 95%, and more preferably at least 99.9%.

Example 32b

An embodiment of a decommissioning unit has a filter unit for filtering the exhaust material stream created by the laser cutting operation. The filter unit reduces the amount of particulates releases from the filter unit for 1 hour of laser operations to below 2 pounds, preferably below 1 pound, and more preferably below 0.5 pounds Example 32c An embodiment of a decommissioning unit has a filter unit for filtering the exhaust material stream created by the laser cutting operation. The filter unit reduces the amount of particulates releases from the filter unit for 8 hours of laser operations to below 2 pounds, and more preferably below 1 pound.

Example 32d

An embodiment of a decommissioning unit has a filter unit for filtering the exhaust material stream created by the laser cutting operation. The filter unit reduces the amount of particulates releases from the filter unit for 1 hours of laser operations to below 2 pounds, preferably below 1 pound, and more preferably below 0.5 pounds.

Example 32e

An embodiment of a decommissioning unit has a filter unit for filtering the exhaust material stream created by the laser cutting operation. The filter unit reduces the amount of HAPs (Hazardous Air Pollutants, which would include for example, material listed in section 112(b) of the US Federal Clean Air Act, and material listed in section 44321 of the California Health and Safety Code) that may be present, to the extent that the steam leaving the filter unit is under any governmental standard, industrial guideline, or regulatory requirement relating to HAPs Example 32f An embodiment of a decommissioning unit of the type show in FIG. 1 has a filter unit for filtering the exhaust material stream created by the laser cutting operation. The filter unit reduces the total HAPs present in the exhaust material stream by at least 90%, preferably at least 95%, and more preferably at least 99.9%.

Example 32g

An embodiment of a decommissioning unit of the type show in FIG. 1 has a filter unit for filtering the exhaust material stream created by the laser cutting operation. The filter unit reduces the VOCs (Volatile Organic Compounds); and thus unit can be fully VOC compliant, under any governmental standard, industrial guideline, or regulatory requirement relating to VOCs.

Example 32h

An embodiment of a decommissioning unit has a filter unit for filtering the exhaust material stream created by the laser cutting operation. The filter unit reduces the amount of TAPs (Toxic Air Pollutants); and can be fully TAP complainant, under any governmental standard, industrial guideline, or regulatory requirement relating to TAPs.

Example 32i

An embodiment of a decommissioning unit has a filter unit for filtering the exhaust material stream created by the laser cutting operation. The filter unit reduces the total TAPs present in the exhaust material stream by at least 90%, preferably at least 95%, and more preferably at least 99.9%.

Example 32j

An embodiment of a decommissioning unit has a filter unit for filtering the exhaust material stream created by the laser cutting operation. The filter unit reduces the total TAPs, VOCs and HAPs present in the exhaust material stream by at least 90%, preferably at least 95%, and more preferably at least 99.9%.

Example 33

The working fluid, e.g., nitrogen, air, argon, is flowed at about 50 scfm to about 300 scfm, more than about 100 scfm, more than about 200 scfm, and from about 100 scfm to about 200 scfm, when perform a laser cutting operation. This flow of working fluid carries away particulate and generated vapors to a filter unit, such as the unit of Example 32. The working fluid flow also, preferable serves to keep the laser beam path, and thus the laser beam, free from any debris or other material that would interfere with the transmission of the laser beam, along the beam path, to the target location, e.g., the casing to be cut.

Example 34

Using a down hole laser tool well tubulars, e.g., a conductor, a multi-string tubulars, multi-string tubulars with grout; are completely cut at about 5 feet below the surface of the ground. The cutting laser beam as delivered from the laser tool is at least about 15 kW. During the cut nitrogen is flowed into the well, and the laser beam path is through nitrogen gas to the target. The laser cut is made from the inside to the outside. Little and preferably no excavation of the tubulars is required below about 1 ft (to provide sufficient access to attaching lifting/pulling chains). After the laser cut is complete, (preferably in a single rotation of the laser tool within in the tubular, e.g. one 360° rotation of the laser beam), the lifting device of the type of FIG. 14 is used to pull the tubulars free of the earth. Preferably the lifting device has sufficient travel (about 5 ft or more) to pull the tubular completely from the earth. If the lifting device does not, it can be removed and a crane, back hoe, or other device with sufficient lifting and travel capacity can be used to pull the tubular from the earth.

Example 34a

The operation of example 34 is conducting with the use of a mechanical cutting or separating device in addition to the laser.

Example 34b

The operation of example 34 is conducting with the use of a mechanical cutting or separating device instead of the laser.

Example 34c

The operation of example 34 is conducting with the use of a fluid jet cutting or separating device in addition to the laser.

Example 34d

The operation of example 34 is conducting with the use of a fluid jet cutting or separating device instead of the laser.

Embodiments of TIR prisms in laser tools may be used with the present laser cutting and decommissioning tools, and in the present laser decommissioning system, these TIR prisms are taught and disclosed in U.S. patent applications Ser. No. 13/768,149 and Ser. No. 61/605,434, the entire disclosures of each of which are incorporated herein by reference. Thus, TIR prisms may be used at the distal end of the laser tool for the beam path to make a right angle (or greater or lesser than a right angle) direction change from the vertical.

By way of example, the types of laser beams and sources for providing a high power laser beam may, by way of example, be the devices, systems, and beam shaping and delivery optics that are disclosed and taught in the following US Patent Applications and US Patent Application Publications: Publication No. 2010/0044106; Publication No. 2010/0044105; Publication No. 2010/0044103; Publication No. 2010/0044102; Publication No. 2010/0215326; Publication No. 2012/0020631; Publication No. 2012/0068086; Publication No. 2012/0261188; Publication No. 2012/0275159; Publication No. 2013/0011102; Publication No. 2012/0068086; Publication No. 2012/0261188; Publication No. 2012/0275159; Ser. No. 14/099,948; Ser. No. 61/734,809; and Ser. No. 61/786,763, the entire disclosures of each of which are incorporated herein by reference. The source for providing rotational movement, for example may be the systems and devices disclosed and taught in the following US Patent Applications and US Patent Application Publications: Publication No. 2010/0044106, Publication No. 2010/0044104; Publication No. 2010/0044103; Ser. No. 12/896,021; Publication No. 2012/0267168; Publication No. 2012/0275159; Publication No. 2012/0267168; Ser. No. 61/798,597; and Publication No. 2012/0067643, the entire disclosures of each of which are incorporated herein by reference.

By way of example, umbilicals, high powered optical cables, and deployment and retrieval systems for umbilical and cables, such as spools, optical slip rings, creels, and reels, as well as, related systems for deployment, use and retrieval, are disclosed and taught in the following US Patent Applications and Patent Application Publications: Publication No. 2010/0044104; Publication No. 2010/0044106; Publication No. 2010/0044103; Publication No. 2012/0068086; Publication No. 2012/0273470; Publication No. 2010/0215326; Publication No. 2012/0020631; Publication No. 2012/0074110; Publication No. 2013/0228372; Publication No. 2012/0248078; and, Publication No. 2012/0273269, the entire disclosures of each of which is incorporated herein by reference, and which may preferably be used as in conjunction with, or as a part of, the present tools, devices, systems and methods and for laser removal of an offshore or other structure. Thus, the laser umbilical may be: a single high power optical fiber; it may be a single high power optical fiber that has shielding; it may be a single high power optical fiber that has multiple layers of shielding; it may have two, three or more high power optical fibers that are surrounded by a single protective layer, and each fiber may additionally have its own protective layer; it may contain other conduits such as a conduit to carry materials to assist a laser cutter, for example oxygen; it may have conduits for the return of cut or waste materials; it may have other optical or metal fiber for the transmission of data and control information and signals; it may be any of the combinations set forth in the forgoing patents and combinations thereof. Although not specifically shown in the embodiment of the figures and examples, break detection and back reflection monitory devices and systems may be utilized with, or integrated into the present tools, umbilicals, optical cables, deployment and retrieval systems and combinations and variation so these. Examples of such break detection and monitoring devices, systems and methods are taught and disclosed in the following U.S. patent application Ser. No. 13/486,795, Publication No. 2012/00074110 and Ser. No. 13/403,723, and US Patent Application Publication No. 2010/0044106, the entire disclosures of each of which are incorporated herein by reference.

By way of example, the laser systems of the present invention may utilize a single high power laser, or they may have two or three high power lasers, or more. The lasers may be continuous or pulsed (including, e.g., when the lasing occurs in short pulses, and a laser capable of continuous lasing fired in short pulses). High power solid-state lasers, specifically semiconductor lasers and fiber lasers are preferred, because of their short start up time and essentially instant-on capabilities. The high power lasers for example may be fiber lasers or semiconductor lasers having 1 kW, 5 kW, 10 kW, 20 kW, 50 kW or more power and, which emit laser beams with wavelengths in the range from about 405 nm (nanometers) to about 2100 nm, preferably in the range about 800 nm to about 1600 nm, about 1060 nm to 1080 nm, 1530 nm to 1600 nm, 1800 nm to 2100 nm, and more preferably about 1064 nm, about 1070-1083 nm, about 1360 nm, about 1455 nm, 1490 nm, or about 1550 nm, or about 1900 nm (wavelengths in the range of 1900 nm may be provided by Thulium lasers). Thus, by way of example, the present tools, systems and procedures may be utilized in a system that is contemplated to use four, five, or six, 20 kW lasers to provide a laser beam in a laser tool assembly having a power greater than about 60 kW, greater than about 70 kW, greater than about 80 kW, greater than about 90 kW and greater than about 100 kW. One laser may also be envisioned to provide these higher laser powers. Examples of preferred lasers, and in particular solid-state lasers, such as fibers lasers, are disclosed and taught in the following US Patent Applications and US Patent Application Publications: Publication No. 2010/0044106, Publication No. 2010/0044105, Publication No. 2010/0044103, Publication No. 2013/0011102, Publication No. 2010/0044102, Publication No. 2010/0215326, Publication No. 2012/0020631, Publication No. 2012/0068086; Ser. No. 14/099,948, Ser. No. 61/734,809, and Ser. No. 61/786,763, the entire disclosures of each of which are incorporated herein by reference.

Embodiments of the devices, systems, tools, activities and operations set forth in this specification may find applications in activities such as: offshore activities; subsea activities; perforating; decommissioning structures such as, oil rigs, wells, well sites, oil platforms, offshore platforms, factories, nuclear facilities, nuclear reactors, pipelines, bridges, etc.; cutting and removal of structures in refineries; civil engineering projects and construction and demolitions; concrete repair and removal; mining; surface mining; deep mining; rock and earth removal; surface mining; tunneling; making small diameter bores; oil field perforating; oil field fracking; well completion; window cutting; well decommissioning; well workover; precise and from a distance in-place milling and machining; heat treating; drilling and advancing boreholes; workover and completion; flow assurance; and, combinations and variations of these and other activities and operations.

The various embodiments of devices, systems, tools, activities and operations set forth in this specification may be used with various high power laser systems and conveyance structures and systems, in addition to those embodiments of the Figures and in this specification. The various embodiments of devices systems, tools, activities and operations set forth in this specification may be used with: other high power laser systems that may be developed in the future: with existing non-high power laser systems, which may be modified, in-part, based on the teachings of this specification, to create a high power laser system; and with high power directed energy systems. Further, the various embodiments of devices systems, tools, activities and operations set forth in this specification may be used with each other in different and various combinations. Thus, for example, the configurations provided in the various embodiments of this specification may be used with each other; and the scope of protection afforded the present inventions should not be limited to a particular embodiment, configuration or arrangement that is set forth in a particular embodiment, example, or in an embodiment in a particular Figure.

The inventions may be embodied in other forms than those specifically disclosed herein without departing from its spirit or essential characteristics. The described embodiments are to be considered in all respects only as illustrative and not restrictive.

What is claimed:

1. A laser system for surface decommission of wells, the system comprising:

a platform;

a laser unit, the laser unit comprising: a chiller; a laser source, the laser source capable of generating at least a 5 kW laser beam; a control system; and, a control console; the laser source located on the platform and inside of a laser housing;

a laser tool comprising a body, a laser delivery head, wherein in the laser delivery head is rotatable with respect to the body;

a clamp mechanically associated with the laser tool, and configured to engage a structure to be cut by a laser beam from the laser tool; and an exhaustion gas treatment assembly, wherein the assembly comprising: a cap, wherein the cap is configured for association with the laser tool during deployment; and a filtration device, wherein the filtration device is configured for fluid communication with the cap during deployment; whereby the assembly reduces the release of pollutants into the atmosphere from a laser cutting operation.

2. The system of claim 1, wherein the body comprises a high power optical fiber.

3. The system of claim 2, comprising an optical slip ring.

4. The system of claim 3, wherein the system as deployed during normal operation is classified as having an accessible emission limit of $2.0\times10^{-3}$ $k_1k_2$ $Wcm^{-2}$ $sr^{-1}$ radiance or less.

5. The system of claim 1, comprising an optical slip ring.

6. The system of claim 1, wherein the system as deployed during normal operation is classified as having an accessible emission limit of $2.0\times10^{-3}$ $k_1k_2$ $Wcm^{-2}$ $sr^{-1}$ radiance or less.

7. A laser system for surface decommission of a well, configured as deployed at a well location for performing a laser operation, the system comprising:

a platform;

a laser unit, the laser unit comprising: a chiller; a laser source, the laser source capable of generating at least a 5 kW laser beam; a control system;

and, a control console; the laser source located on the platform and inside of a laser housing;

a laser tool comprising a body, a laser delivery head, wherein in the laser delivery head is rotatable with respect to the body;

an optical fiber, wherein the optical fiber is in optical communication with the laser source and the laser tool;

a clamp engaging a structure at the well to be cut by a laser beam from the laser tool;

a collection cap; wherein the collection cap is associate with the structure to be cut and the laser tool; and, a filtration device filter; wherein the cap is in fluid communication with the collection cap; whereby the filtration device reduces the release of pollutants into the atmosphere from the laser operation.

8. The system of claim 7, comprising an optical slip ring.

9. The system of claim 8, wherein the system as deployed during normal operation is classified as having an accessible emission limit of $2.0\times10^{-3}$ $k_1k_2$ $Wcm^{-2}$ $sr^{-1}$ radiance or less.

10. The system of claim 7, wherein the system as deployed during normal operation is classified as having an accessible emission limit of $2.0\times10^{-3}$ $k_1k_2$ $Wcm^{-2}$ $sr^{-1}$ radiance or less.

11. The system of claim 10, comprising an optical slip ring.

* * * * *